(12) United States Patent
Gorbachov

(10) Patent No.: US 8,598,962 B2
(45) Date of Patent: Dec. 3, 2013

(54) COMPACT RF ISOLATION NETWORK FOR MULTI-PIN PACKAGED INTEGRATED CIRCUITS

(75) Inventor: Oleksandr Gorbachov, Irvine, CA (US)

(73) Assignee: STMicroelectronics Ltd., Tsim Sha Tsui Kowloon (HK)

( * ) Notice: Subject to any disclaimer, the term of this patent is extended or adjusted under 35 U.S.C. 154(b) by 1009 days.

(21) Appl. No.: 12/650,190

(22) Filed: Dec. 30, 2009

(65) Prior Publication Data
US 2011/0025435 A1 Feb. 3, 2011

Related U.S. Application Data

(60) Provisional application No. 61/142,106, filed on Dec. 31, 2008.

(51) Int. Cl.
*H01P 1/00* (2006.01)

(52) U.S. Cl.
USPC .................... 333/24 R; 333/134; 333/12

(58) Field of Classification Search
USPC .................... 333/134, 12, 24 R; 257/725
See application file for complete search history.

(56) References Cited

U.S. PATENT DOCUMENTS

| | | | | |
|---|---|---|---|---|
| 5,049,979 A | * | 9/1991 | Hashemi et al. | 257/723 |
| 5,528,083 A | * | 6/1996 | Malladi et al. | 257/786 |
| 6,222,260 B1 | * | 4/2001 | Liang et al. | 257/691 |
| 6,380,623 B1 | * | 4/2002 | Demore | 257/723 |
| 6,621,155 B1 | * | 9/2003 | Perino et al. | 257/686 |

\* cited by examiner

*Primary Examiner* — Robert Pascal
*Assistant Examiner* — Kimberly Glenn
(74) *Attorney, Agent, or Firm* — Seed IP Law Group PLLC

(57) ABSTRACT

Pins on an RFIC package carry RF signals between the package and a PCB. A first capacitor is coupled between a selected pin of the RFIC package near the pins carrying the RF signals and a radio-frequency ground on the PCB. A coupling between the RFIC package and the PCB is modeled, and includes modeling of the pins of interest and at least one parasitic element of the coupling. A capacitance of the first capacitor is selected based on the modeling to obtain desired performance at selected operational frequencies. A second capacitor may be coupled between the selected pin a radio frequency ground of the RFIC package. An inductor may be coupled in parallel across the first capacitor.

53 Claims, 57 Drawing Sheets

COMPACT RF ISOLATION NETWORK FOR MULTI-PIN PACKAGED INTEGRATED CIRCUITS

CROSS-REFERENCE TO RELATED APPLICATION

This application claims the benefit under 35 U.S.C. §119(e) of U.S. Provisional Patent Application No. 61/142,106 filed Dec. 31, 2008, where this provisional application is incorporated herein by reference in its entirety.

BACKGROUND

1. Technical Field

The present disclosure relates to methods and systems for providing RF isolation in multi-pin packaged integrated circuits and related articles.

2. Description of the Related Art

The performance of radio-frequency (RF) systems can be impacted by interference, not just from external sources, but also by interference between various components or modules of a system. For example, leakage of high-power transmitter energy of a transmitter into high-sensitivity receiver circuitry may degrade performance of a transceiver, and may even destroy the receiver. For this reason, steps may be taken to isolate different parts of an RF system.

Physical distance between parts of an RF system can help to reduce interference by increasing the isolation between the parts. The frequency of operation can also impact interference between circuits, with higher operating frequencies generally leading to increased interference.

In packaged radio-frequency integrated circuits (RFIC), isolating the components of the RFIC can be particularly challenging. For example, small die dimensions and couplings through substrates may impact the level of interference or isolation between components. RFICs are generally packaged in enclosures, such as plastic, ceramic, and metal enclosures. These enclosures also may impact the level of isolation between various parts of the RFIC. Some RFICs ground leads between sensitive leads of the RFIC, which can enhance isolation by a few dB.

BRIEF SUMMARY

A large portion of "parasitic" coupling in packaged RFIC devices is related to package leads and bond wires coupling the pins of the RFIC package to the integrated circuit chip, and the package body. An embodiment is configured to use these "parasitic" coupling elements together with additional elements to improve isolation between different chains (for example, receiving and transmitting modules) of the RFIC. For example, in one embodiment an external capacitor on a PCB (application level isolation improvement) is used together with parasitic coupling elements to improve isolation. In another embodiment, one external and one internal (inside RFIC) capacitor is used together with parasitic coupling elements. In yet another embodiment, one external capacitor and one external inductor are used together with parasitic coupling elements. An embodiment may resemble resonant circuits. In an embodiment, isolation between closely positioned RFIC pins can be substantially improved (by well above 10-15 dB) even for very closely placed package leads. Some embodiments may comprise an inductor in parallel with a capacitor on the RFIC chip side of a package pin.

In an embodiment, a method, comprises: modeling a first connection chain configured to carry radio-frequency signals between a first port of a radio-frequency integrated circuit package (RFIC package) and a first port of a printed circuit board (PCB), the first connection chain including a first package pin of the RFIC package; modeling a second connection chain configured to carry radio-frequency signals between a second port of the RFIC package and a second port of the PCB, the second connection chain including a second package pin of the RFIC package; modeling a third connection chain between the RFIC package and the PCB, the third connection chain including: a third package pin of the RFIC package in a vicinity of the first and second package pins; and a capacitor of the PCB coupled between the third package pin and a reference ground of the PCB; and selecting a capacitance of the capacitor of the PCB based on the modeling. In an embodiment, the third connection chain includes a micro-strip line trace on the PCB coupled between the third package pin and the capacitor of the PCB and the modeling of the third connection chain includes modeling a length and a width of the micro-strip line trace on the PCB. In an embodiment, the modeling of the third connection chain includes modeling a parasitic resistance associated with the capacitor of the PCB. In an embodiment, the length of the micro-strip line trace is less than 1.0 mm. In an embodiment, the third package pin is placed between the first and second package pins. In an embodiment, the second package pin is positioned on a first side of the first package pin and the third package pin is on a second side of the first package pin opposite from the first side of the first package pin. In an embodiment, the third connection chain includes a capacitor of the RFIC package coupled between the third package pin and a reference ground of the RFIC package, and the method further comprises: selecting a capacitance of the capacitor of the RFIC package based on the modeling. In an embodiment, the reference ground of the PCB is a radio-frequency ground of the PCB and the reference ground of the RFIC package is a radio-frequency ground of the RFIC package. In an embodiment, the modeling of the third connection chain includes: modeling a micro-strip line trace on the PCB coupled between the third package pin and the capacitor of the PCB; modeling a parasitic resistance associated with the capacitor of the PCB; modeling a coupling of the third package pin to the capacitor of the RFIC package; and modeling a parasitic resistance associated with the capacitor of the RFIC package. In an embodiment, the third connection chain further comprises a shunt across the capacitor of the RFIC package. In an embodiment, the selected capacitance of the capacitor of the RFIC package is equal to the selected capacitance of the capacitor of the PCB. In an embodiment, the third connection chain includes a coupling of the third package pin to a radio-frequency ground of the RFIC chip and the modeling of the third connection chain includes modeling the coupling of the third package pin to the radio-frequency ground of the RFIC chip as a micro-strip line trace and a parasitic resistance. In an embodiment, the modeling includes modeling parasitic elements of the third connection chain. In an embodiment, the third connection chain includes an inductor of the PCB coupled in parallel across the capacitor of the PCB and the method further comprises: selecting an inductance of the inductor based on the modeling and the selection of the capacitance of the capacitor of the PCB. In an embodiment, the third connection chain further comprises a capacitor of the RFIC package coupled between the third package pin and a radio-frequency ground of the RFIC package. In an embodiment, the capacitance of the capacitor of the PCB is selected so as to maximize isolation between the first and second connection chains above a selected frequency of operation of the first and second connection chains. In an embodiment, the first, second and third package pins of the RFIC package are each modeled as a series of segments of the respective package pin.

In an embodiment, a computer-readable memory medium's contents cause at least one processor to perform a method, the method comprising: modeling a first connection chain configured to carry radio-frequency signals between a first port of a radio-frequency integrated circuit package (RFIC package) and a first port of a printed circuit board (PCB), the first connection chain including a first package pin of the RFIC package; modeling a second connection chain configured to carry radio-frequency signals between a second port of the RFIC package and a second port of the PCB, the second connection chain including a second package pin of the RFIC package; modeling a third connection chain between the RFIC package and the PCB, the third connection chain including: a third package pin of the RFIC package in a vicinity of the first and second package pins; and a capacitor of the PCB coupled between the third package pin and a radio-frequency ground of the PCB, wherein the modeling of the third connection chain includes modeling at least one parasitic element associated with the third connection chain; and selecting a capacitance of the capacitor of the PCB based on the modeling. In an embodiment, the third connection chain includes a capacitor of the RFIC package coupled between the third package pin and a radio-frequency ground of the RFIC package. In an embodiment, the third connection chain includes an inductor of the PCB coupled in parallel with the capacitor of the PCB. In an embodiment, the at least one parasitic element comprises: a parasitic resistance of the capacitor of the PCB; a parasitic resistance of the capacitor of the RFIC package; and a parasitic resistance of the inductor of the PCB. In an embodiment, the third connection chain includes an inductor of the PCB coupled in parallel with the capacitor of the PCB. In an embodiment, the selecting is based on the modeling and an operating frequency range of the RFIC package. In an embodiment, the third package pin is placed between the first and second package pins. In an embodiment, the third package pin is placed to one side of the first and second package pins. In an embodiment, the capacitance is selected so as to maximize an isolation between the first connection chain and the second connection chain at a selected frequency of operation. In an embodiment, the capacitance is selected so as to minimize an isolation between the first connection chain and the second connection chain at a selected frequency of operation.

In an embodiment, a device comprises: a first connection chain configured to carry radio-frequency signals between a first port of a radio-frequency integrated circuit package (RFIC package) and a first port of a printed circuit board (PCB), the first connection chain including a first package pin of the RFIC package; a second connection chain configured to carry radio-frequency signals between a second port of the RFIC package and a second port of the PCB, the second connection chain including a second package pin of the RFIC package; and a third connection chain between the RFIC package and the PCB, the third connection chain including: a third package pin of the RFIC package in a vicinity of the first and second package pins; and a capacitor coupled between the third package pin and a reference voltage of the PCB, wherein the third connection chain is configured to modify an electro-magnetic field distribution in an area of the first and second package pins. In an embodiment, the third connection chain is configured to maximize an isolation between the first connection chain and the second connection chain at a selected frequency. In an embodiment, the capacitor is configured to interact with at least one parasitic element of the third connection chain. In an embodiment, the third package pin is placed between the first package pin and the second package pin. In an embodiment, the third package pin is placed to one side of the first package pin and the second package pin. In an embodiment, the third connection chain further comprises a capacitor coupled between the third package pin and a reference voltage of the RFIC package. In an embodiment, the third connection chain further comprises an inductor coupled in parallel with the capacitor coupled between the third package pin and the reference voltage of the PCB. In an embodiment, the third connection chain further comprises a capacitor coupled between the third package pin and a reference voltage on the RFIC package. In an embodiment, the capacitor coupled between the third package pin and the reference voltage of the PCB is coupled to a micro-strip line trace coupled to the third package pin and a length of the micro-strip line trace is less than 1.5 mm.

In an embodiment, a system comprises: a radio-frequency integrated chip (RFIC); a printed circuit board (PCB); means for coupling the RFIC chip to the PCB configured to: couple a first radio-frequency port of the RFIC to a first radio-frequency port of the PCB; couple a second radio-frequency port of the RFIC to a second radio-frequency port of the PCB; modify a radio-frequency coupling between the first and second radio-frequency ports of the PCB using a capacitance in conjunction with parasitic elements of the means for coupling.

DETAILED DESCRIPTION

Figure 1:
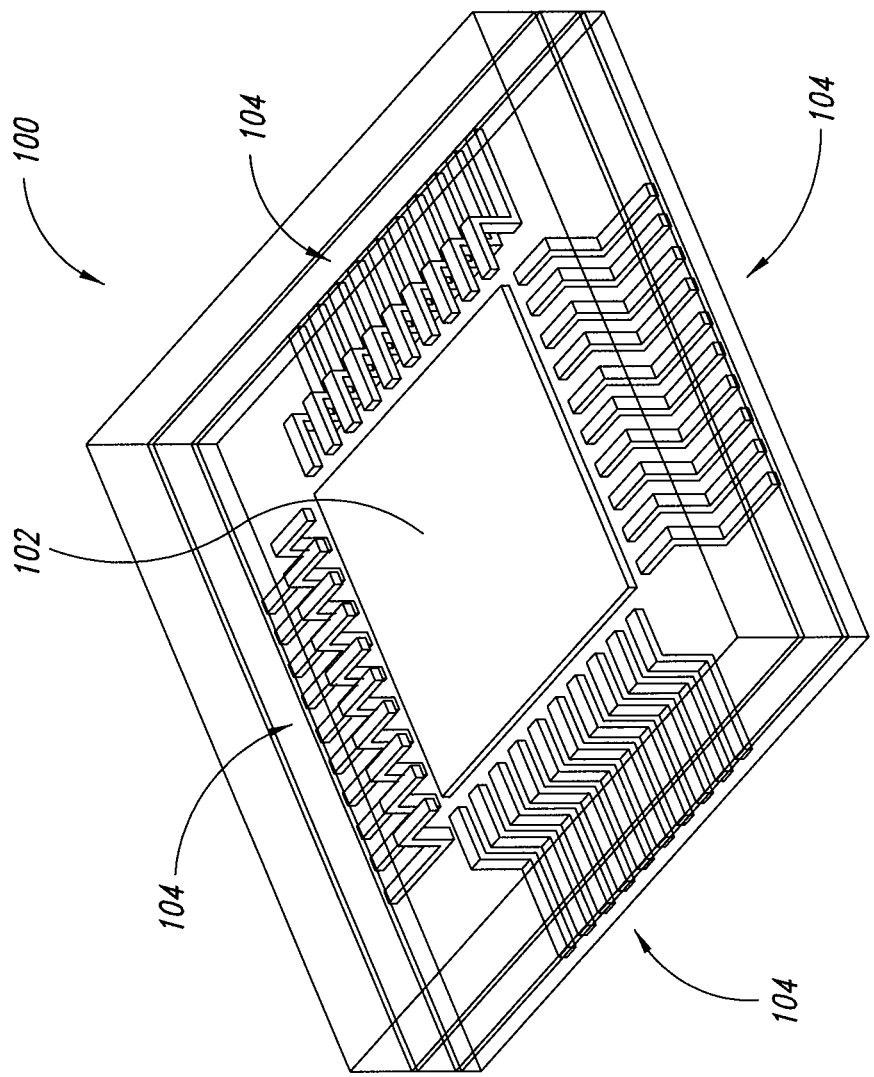
FIG. 1 illustrates an embodiment of a multi-pin lead frame package.

In the following description, certain details are set forth in order to provide a thorough understanding of various embodiments of devices, methods and articles. However, one of skill in the art will understand that other embodiments may be practiced without these details. In other instances, well-known structures and methods associated with, for example, bonding pads and wire bonding of packaged integrated circuits, have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure or the claimed invention.

The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not necessarily intended to convey any information regarding the actual shape of particular elements, and have been selected solely for ease of recognition in the drawings.

FIG. 1 shows an embodiment of a multi-pin lead frame package 100. A radio-frequency integrated circuit (RFIC) 102 is typically placed at a center of the package, and may be placed on an exposed metal plate (not shown). The RFIC 102 typically has bonding pads (see FIG. 3) coupled to package leads 104 by bonding wires (see FIG. 3). The bonding wires may typically be aluminum or gold. The RFIC 102, the bonding wires and package leads 104 are typically sealed in plastic, with a portion of the package leads exposed.

Figure 2:
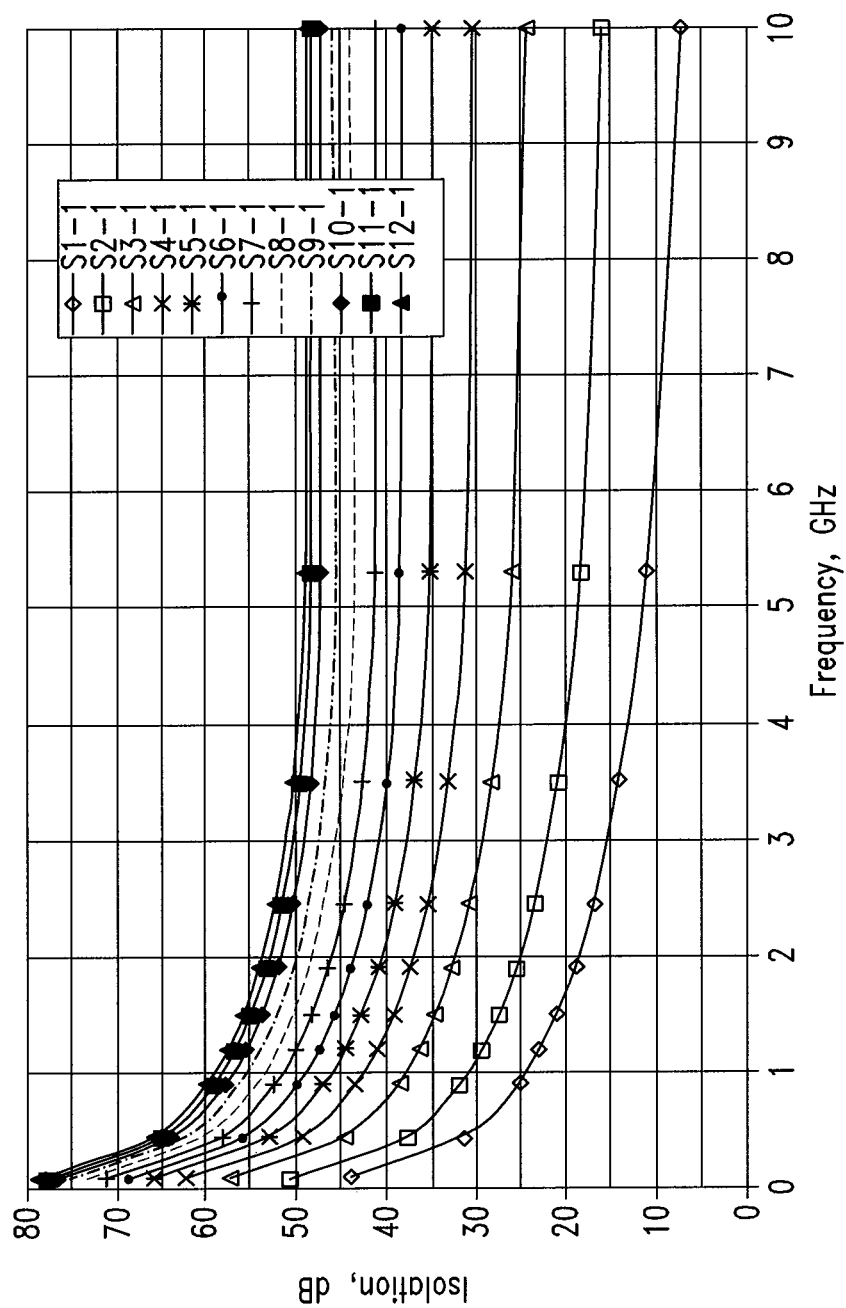
FIG. 2 is a graph illustrating simulated isolation between pins of an embodiment of a multi-pin package as the frequency is varied.

FIG. 2 is a graph illustrating a simulation of pin-to-pin isolation in dB of an RFIC package having 12 pins in a row as the frequency of operation is varied. The leads have a fixed dimension and the space between adjacent leads in the row is fixed. In the simulation, pin 1 is the drive pin and the impedance loaded on all pins is 50 Ohms. As the distance between leads increases, a higher isolation may be achieved at the same frequency. Isolation between leads decreases as the frequency is increased. As the number of leads is increased, the level of isolation goes down.

Figure 3:
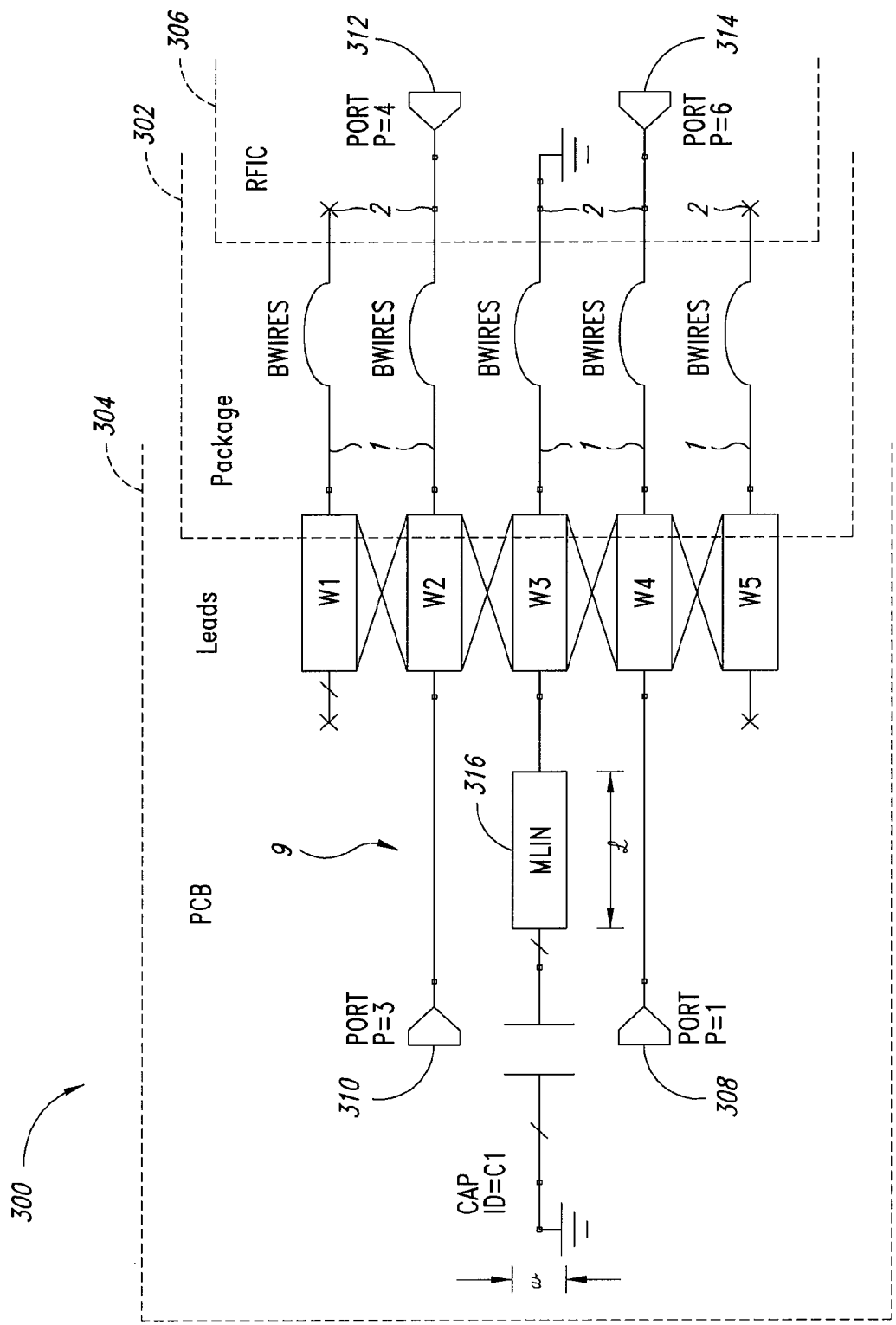
FIG. 3 is a functional block diagram of an embodiment of a system configured to isolate ports of an RFIC package.

FIG. 3 illustrates an embodiment of system 300 comprising an RFIC package 302 mounted on a PCB board 304. Additional components, such as additional packages and RFIC packages, may be mounted to the PCB 304. The RFIC package 302 comprises an RFIC chip 306. The RFIC package may be a plastic package. As illustrated, the RFIC package 302 has five package leads or pins W1-W5 configured to electrically couple the RFIC chip 306 to the PCB 304. The RFIC package may have additional leads. The five package leads W1-W5 are in a row, and as illustrated are uniformly spaced apart. The package leads W1-W5 are coupled to via bonding wires 1 to bonding pads 2 on the RFIC chip 306. The bonding pads 2 are coupled to circuitry of the RFIC chip 306.

The RFIC package 302 may be coupled to the PCB 304 using standard techniques. For example, the RFIC package 302 may be soldered to the PCB 304. Some embodiments may employ sockets on the PCB configured to receive the package leads or pins of the RFIC package 302. In some embodiments, the RFIC package 302 may be soldered to the PCB 304, and the PCB may be mounted to another PCB. For example, the PCB may have another set of pins which are configured to be received by a socket in another PCB. The connections between the RFIC package 302 and the PCB 304 may include, for example, signal, biasing, power and control connections. The PCB 304 typically has metal traces 9 that couple the connections between the RFIC package 302 and the PCB 304 to circuitry of the PCB 304.

As illustrated, four ports 308, 310, 312, 314 are configured to carry RF signals between the PCB 304 and the RFIC chip 306. The system 300 may comprise additional ports and package leads configured to carry signals between the PCB 304 and the RFIC chip 306, including additional RF ports. The connections of package leads W1 and W5 to components of the PCB 302 and of the RFIC chip 306 are not shown for ease of illustration.

A first connection chain electrically couples port 1 308 to port 6 314 through package lead W4, a bond wire 1 and a bond pad 2. A second connection chain electrically couples port 3 310 to port 4 312 through package lead W2, a bond wire 1 and a bond pad 2. Electromagnetic coupling between port 1 308 and port 3 310 may arise through the PCB, the package leads W1-W5, the bond wires 1 and the bond pads 2, particularly in view of the small dimensions of the RFIC package 302. Similarly, electromagnetic coupling between port 4 312 and port 6 314 may occur. To address this coupling, a third connection chain including a package lead W3 is placed between package lead W2 and package lead W4 and configured to reduce electromagnetic coupling. The package lead W3 is coupled to a reference voltage on the RFIC chip 306. As illustrated, the reference voltage is an RF ground. Isolation package lead W3 also is coupled through a short length of metal tracing MLIN 316 to a first end of a capacitor C1 on the PCB 304. The metal tracing MLIN 316 has a length L and a width w. The other end of the capacitor C1 is coupled to a reference voltage. As illustrated, the reference voltage is a radio frequency ground. The value of the capacitor and the length and width of the metal tracing MLIN 316 may be selected so as to minimize coupling between ports 1, 3, 4 and 6 at frequencies of interest. For example, and as discussed in more detail below, the values for desired operational frequencies or frequency ranges may be selected using electromagnetic or simplified circuit simulation. For example, physical models or modeling programs may be employed to select the values for the length and width of the metal tracing MLIN 316 and for the capacitance of the capacitor C1. For a given configuration, there will typically be an optimum capacitance value for obtaining maximum isolation at a given frequency. In addition, selecting a capacitance value improving isolation at a selected frequency will generally improve isolation for frequencies higher than the selected frequency in a frequency range. For a given frequency and configuration, a capacitance above a selected value will result in improved isolation as compared to a 50 Ohm loaded or a grounded configuration. In an embodiment, the isolation may be improved by as much as 10 dB over a wide frequency range.

Figure 4:
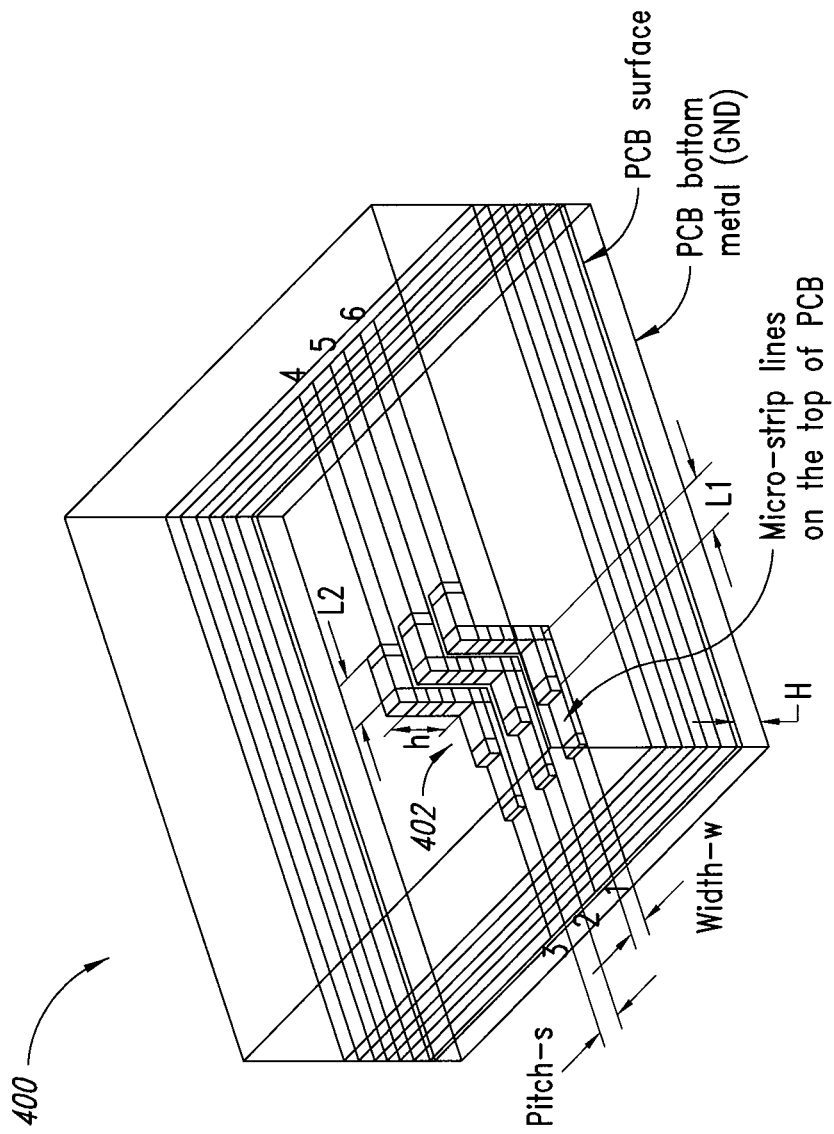
FIG. 4 is an isometric projection of an embodiment of a structural model of a multi-pin lead frame package mounted on a PCB board.

FIG. 4 illustrates a three-pin structure model 400 that may be employed in electromagnetic and circuit simulation to determine the appropriate value for a capacitor, such as capacitor C1 of FIG. 3, added to a PCB to improve isolation between RF ports connecting the PCB to an RFIC chip of an RFIC package. Micro-strip lines 1-3 represent metal traces on top of the PCB for coupling to corresponding ports. Micro-strip lines 4-6 represent metal traces inside the RFIC chip for coupling to corresponding ports. Package leads 402 couple the RFIC chip to the PCB. The package leads are bracket-shaped and have a top length L2, a height h, and a bottom length L1. Other factors that may be employed by the model include the width of the traces and package leads w, the separation or pitch between the traces and packages leads s and the height H of the PCB board.

Figure 5:
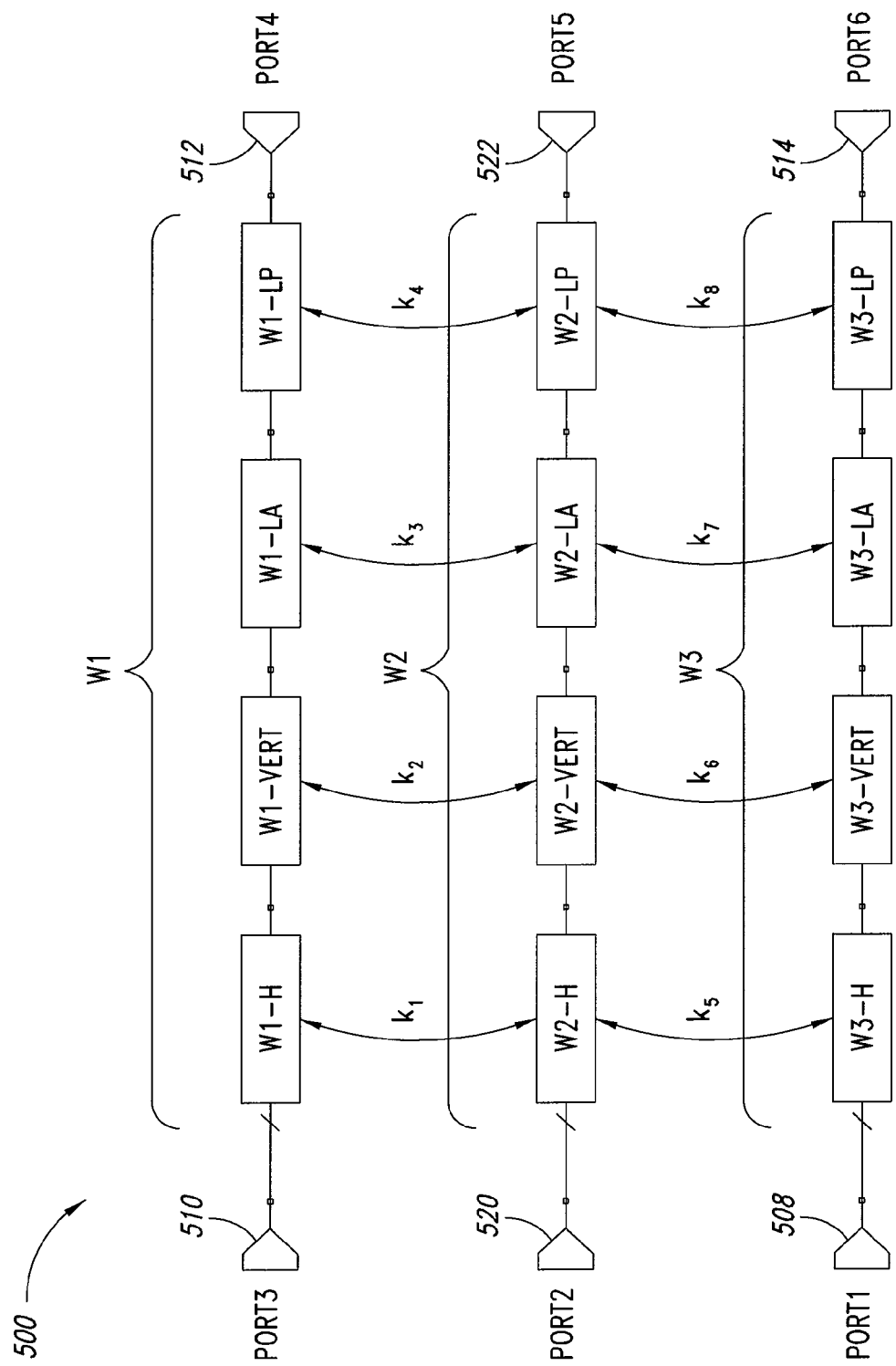
FIG. 5 is a functional block diagram of an embodiment of a model of a multi-pin lead frame package mounted on a PCB board.

FIG. 5 is a functional block diagram of an embodiment of a simulation model 500 for an RFIC package. The model 500 may be based on, for example, the structural model of FIG. 4. The model 500 can be used in place of a structural model, for example, the structural model of FIG. 4. As illustrated, port 3 510 is electrically coupled to port 4 512 through package lead W1, port 2 520 is electrically coupled to port 5 522 through package lead W2, and port 1 508 is electrically coupled to port 6 514 through package lead W3. Each port has an input impedance of 50 Ohms, which is a standard impedance used in the wireless communications industry. Other input impedances may be employed in the model 500.

The package lead W1 electrically coupling port 3 510 to port 4 512 is modeled as four segments. A first segment W1-H represents a horizontal portion of the package lead W1 mounted to a micro-strip on a PCB. The first segment may be modeled, for example, as having a width of 0.3 mm and a length of 0.8 mm, which are fairly common dimensions for leads. The second segment W1-VERT represents a vertical portion of the package lead W1. The second segment W1-VERT may be modeled, for example, as having a width of 0.3 mm and a length of 0.7 mm, which are common dimensions for leads. A third segment W1-LA represents a horizontal portion of the package lead W1 which is in air before entering a body, such as a plastic body, of the RFIC package. The third segment W1-LA may be modeled, for example, as having a width of 0.3 mm and a length of 0.2 mm, which are fairly common dimensions for leads. A fourth segment W1-LP represents a horizontal portion of the package lead W1 which is in a body of the RFIC package, such as a plastic body. The fourth segment W1-LP may be modeled, for example, as having a width of 0.3 mm and a length of 0.4 mm, which are fairly common dimensions for leads. W1-LA and W1-LP may correspond to the segment L2 in FIG. 3. The PCB substrate thickness H (see FIG. 4) may be modeled as having a thickness of, for example, 0.15 mm. Other thicknesses of the PCB substrate may be employed, such as 0.1 mm or 0.25 mm. The value used to model the PCB substrate thickness may vary among the segments of a model.

The package lead W2 electrically coupling port 2 520 to port 5 522 may similarly be modeled as four segments W2-H, W2-VERT, W2-LA and W2-LP. The package lead W3 electrically coupling port 1 508 to port 6 514 may similarly be modeled as four segments W3-H, W3-VERT, W3-LA and W3-LP. The package leads may be modeled, for example, as spaced a distance apart, such as 0.3 mm apart. The doubled sided arrows $k_1$ through $k_8$, show coupling between the parts of the chains, and can be modeled as coupling coefficients. Other impedances, segmentations and dimensions may be employed for modeling the package leads or for modeling the electrical couplings between the ports. Different or the same impedances, segmentations and dimensions may be used to model different package leads. Other dimensions may be included in a model, such as lengths, widths and thicknesses of traces on the PCB and the thicknesses of the package leads.

Simulation software such as ADS (Advanced Design System) from Agilent or Microwave Office from AWR may be used to facilitate the modeling.

Simulation using the embodiment of FIG. 5 was compared with electromagnetic simulation using the embodiment of FIG. 4 and the results were found to be substantially the same when a substrate thickness for the vertical segments W1-VERT, W2-VERT, W3-VERT was modeled as 0.15 mm.

Figure 6:
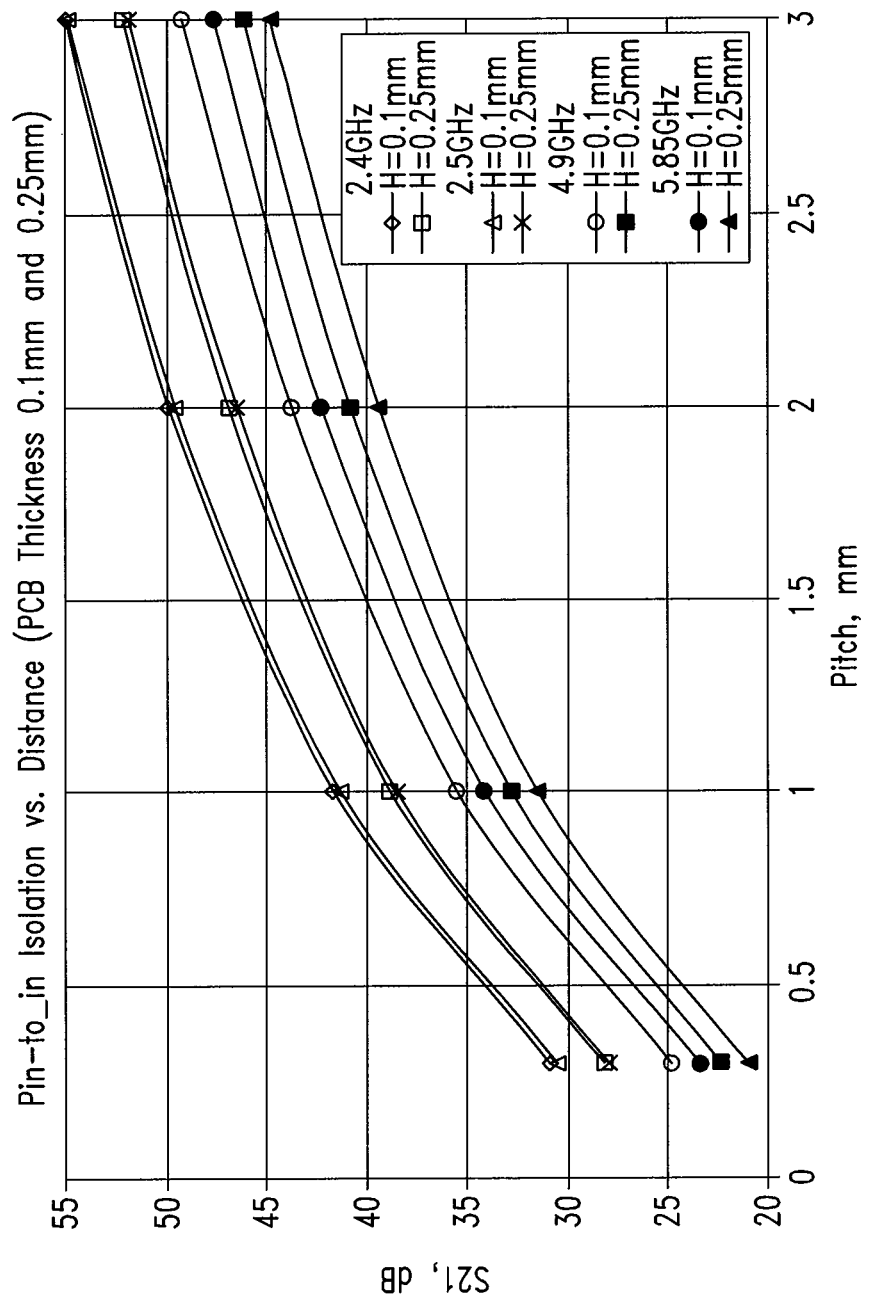
FIG. 6 is a graph illustrating isolation between adjacent pins of an embodiment of a multi-pin lead frame package mounted on a PCB board with fixed dimensions of a package lead.

FIG. 6 is a graph illustrating isolation S21 between two adjacent package leads or pins based on a distance between the pins and PCB thickness at several example frequencies. The frequencies are commonly used frequency bands. As can be seen, when the distance between pins is small, an increase in isolation of 10 dB may be achieved by roughly tripling the distance between the pins. For example, the increase in isolation when the distance between pins is increased from 0.3 mm to 1 mm is just over 10 dB in all frequency ranges. When the distance between pins is larger, a 10 dB increase in isolation may be achieved in all the modeled frequency ranges by roughly doubling the distance. For example, increasing the distance from 1 mm to 2 mm results in an increase in isolation of just under 10 dB in all the modeled frequency ranges. Varying the PCB substrate thickness helps a bit with isolation, particularly at the higher frequencies, with the shape of the curve remaining almost the same.

Figure 7:
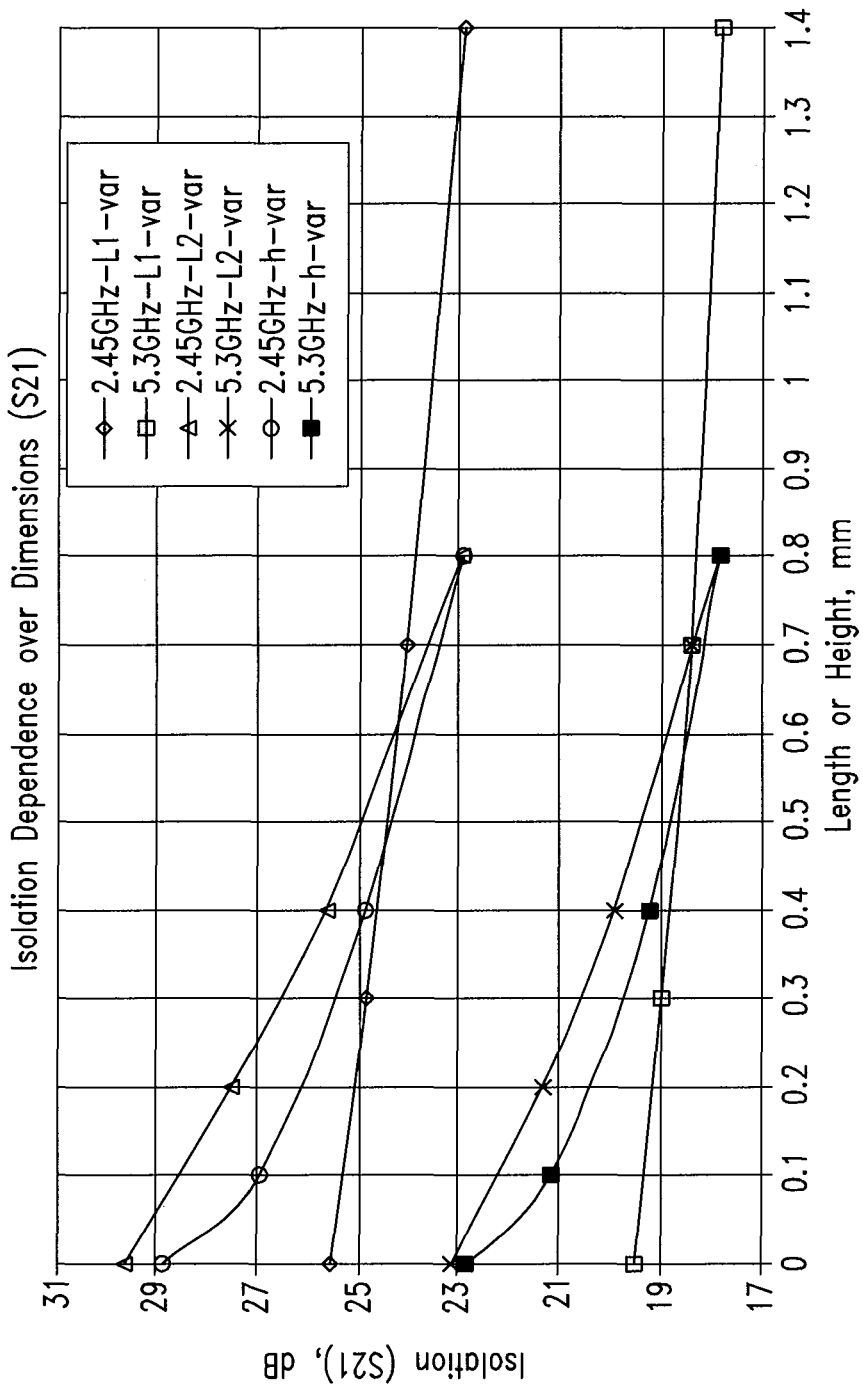
FIG. 7 is a graph illustrating isolation between adjacent pins of an embodiment of a multi-pin lead frame package mounted on a PCB board with varied dimensions of a package lead.

FIG. 7 is a graph illustrating isolation S21 between two adjacent pins (i.e., the pins corresponding to ports 2 and 1 in FIG. 5) 0.3 mm apart with a PCB thickness of 0.25 mm at 2.45 GHz and 5.3 GHz, as the length (i.e., L1 and L2 in FIG. 4) and heights (i.e., h in FIG. 4) are varied. As can be seen, shorter lengths improve isolation slightly, with the improvement decreasing as the frequency is increased. This is due to the decrease in wavelength at higher frequencies. The overall coupling depends on the relative longitudinal dimensions of the lead compared to the wavelength of a signal.

Figure 8:
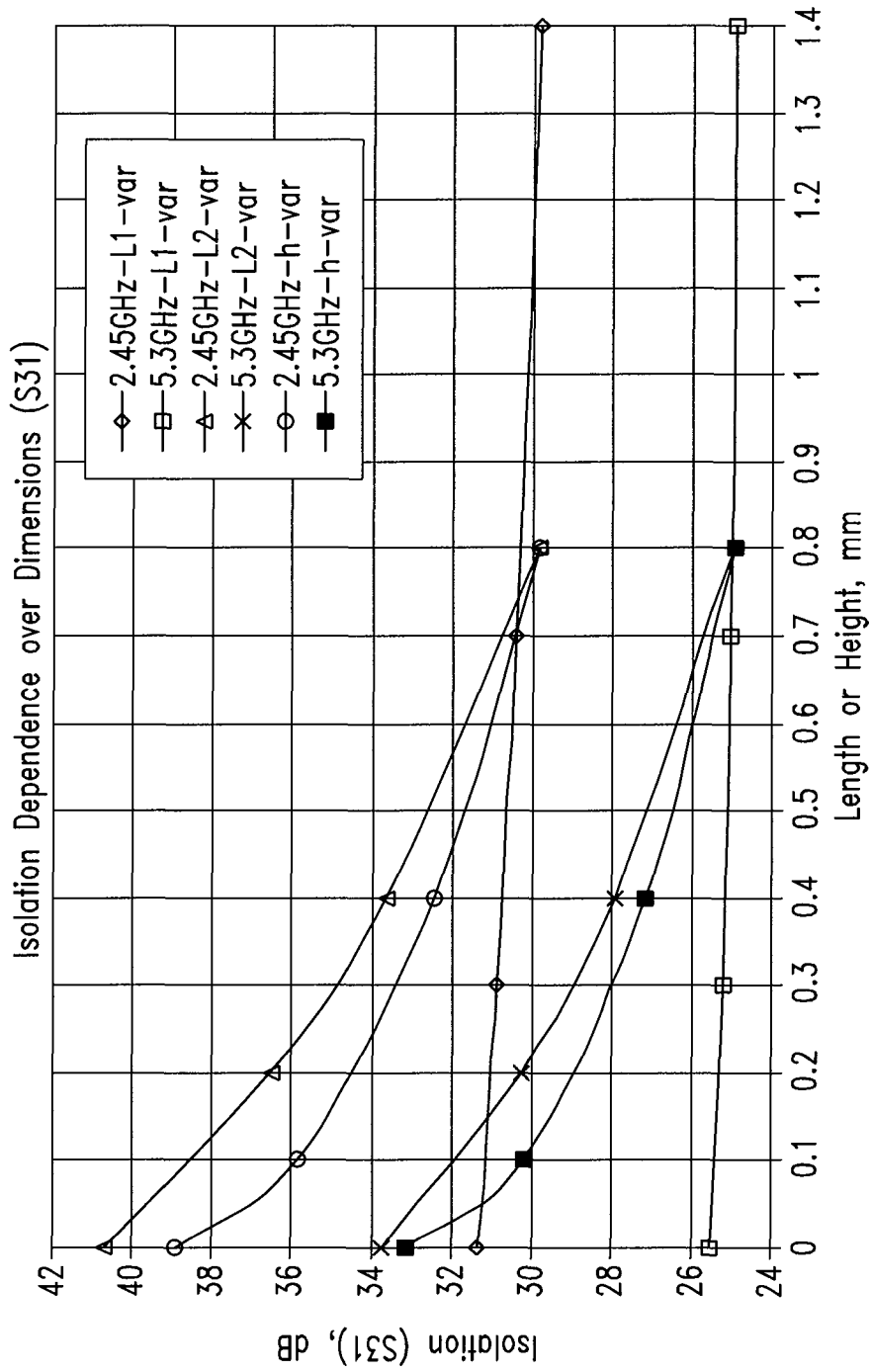
FIG. 8 is a graph illustrating isolation between non-adjacent pins of an embodiment of a multi-pin lead frame package mounted on a PCB board with varied dimensions of a package lead.

FIG. 8 is a graph illustrating isolation S31 between two non-adjacent pins (i.e., the pins corresponding to ports 3 and 1 in FIG. 5), while the intervening pins (i.e., the pins of ports 2 and 5 in FIG. 5) are coupled to a 50 ohm load, at 2.45 GHz and 5.3 GHz, as the length (i.e., L1 and L2 in FIG. 4) and heights (i.e., h in FIG. 4) are varied. The results are similar to those shown in FIG. 7, with an increase in isolation due to the increased distance between the pins 3 and 1.

Figure 9:
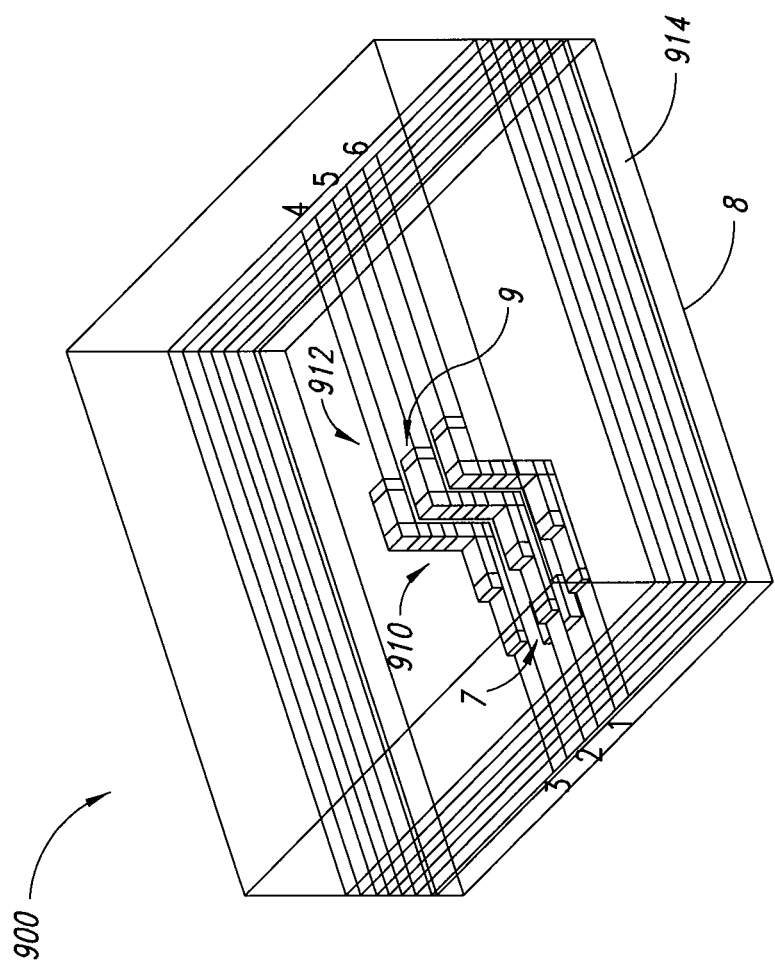
FIG. 9 is an isometric projection of a multi-pin lead frame package mounted on a PCB board with increased isolation between non-adjacent package pins due to grounded pin.
Figure 12:
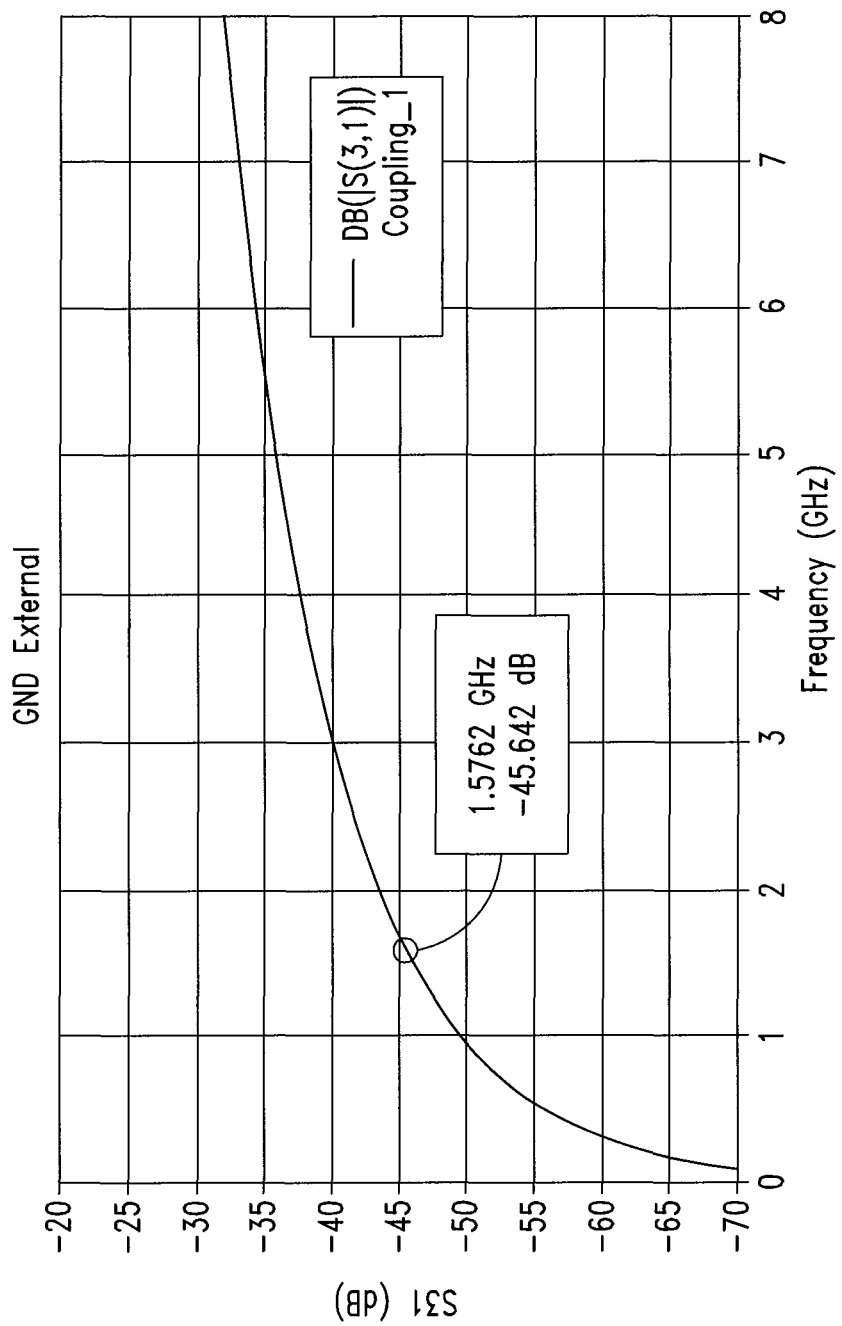

FIG. 9 is an isometric projection of a three-pin structure 900 illustrating a known way of improving isolation between non-adjacent ports. The structure 900 comprises package leads 910 of an RFIC chip 912 mounted on a PCB 914. Micro-strip lines represent metal traces on top of the PCB 914 for corresponding ports 1-3. Micro-strip lines represent metal traces inside the RFIC chip 912 for corresponding ports 4-6. The package leads 910 couple the RFIC chip 912 to the PCB 914. To improve isolation between the ports 1 and 3 (or 4 and 6), a metal via 7 connects the center micro-strip line of port 2 to a ground 8 on the bottom of the PCB 914. The via 7 is close to the center package lead 910 edge. In addition, the top 9 of the center package lead 910 may be connected to a grounding pad (not shown for ease of illustration) of the RFIC chip 912. The improvement in isolation depends on the physical dimensions and is typically not high, only a few dB, as shown in FIG. 12, discussed in more detail below. Parasitic coupling between ports 1 and 3 (or 6 and 4) still exists due to the electromagnetic field distribution over air, over the PCB, and over the plastic of the package, as well as over the bond wires (not shown for ease of illustration).

Figure 10:
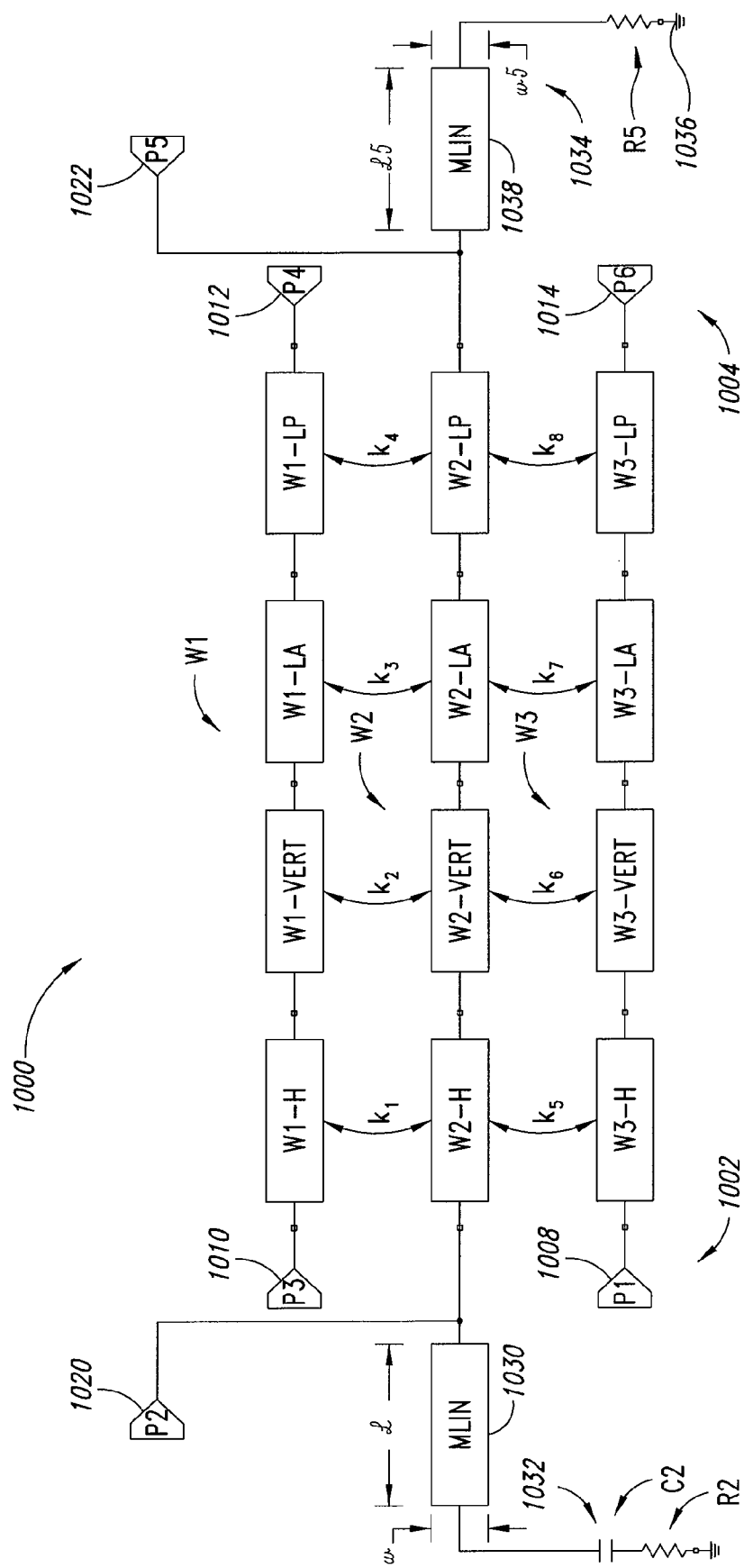
FIG. 10 is functional block diagram of a model of an embodiment of a system configured to isolate non-adjacent ports of an RFIC package.

FIG. 10 is a functional block diagram illustrating an embodiment of a model 1000 of a system configured to reduce coupling between ports coupling a PCB 1002 to an RFIC chip 1004 by changing the electro-magnetic field distribution in the area of the coupled leads. The model 1000 may be used, for example, to model the embodiment of FIG. 3 to facilitate selection of the width and length of the MLIN 316 and the capacitance of the capacitor C1 of FIG. 3. As illustrated in FIG. 10, port 3 1010 is electrically coupled to port 4 1012 through package lead W1, port 2 1020 is electrically coupled to port 5 1022 through package lead W2, and port 1 1008 is electrically coupled to port 6 1014 through package lead W3. Ports 3 and 4 may be loaded with an input impedance of, for example, 50 Ohms. Ports 1 and 6 may be loaded with an input impedance of, for example, 50 Ohms. Optional ports 2 and 5 may be loaded with, for example, a high input impedance, and may be used for signal monitoring. Other input impedances may be employed.

The package leads W1-W3 electrically coupling the ports may be modeled as separate segments. The modeling of the package leads described with respect to FIG. 5 above, for example, may be employed. The doubled sided arrows $k_1$ through $k_8$, show coupling between the parts of the chains, and can be modeled as coupling coefficients. A micro-strip line trace 1030 having a length L and a width w couples the package lead W2 to a capacitor C2 1032, and is modeled with an associated parasitic resistance R2 coupled in series between the capacitor C2 1032 and a radio frequency ground. A short line 1034 (such as a bonding wire) coupling the package lead W2 to a ground 1036 of the RFIC chip 1004 is modeled as a micro-strip line 1038 having a length l5 and a width w5 and a parasitic resistance R5.

FIGS. 11 through 14 graphically illustrate the results of modeling the isolation between two ports (i.e., ports 3 and 1 of FIG. 5) when the associated pins (i.e., package leads W1 and W3 of FIG. 5) are separated by another pin (i.e., package lead W2 of FIG. 5) of another port (i.e., port 2 of FIG. 5) placed between the two pins under different configurations.

Figure 11:
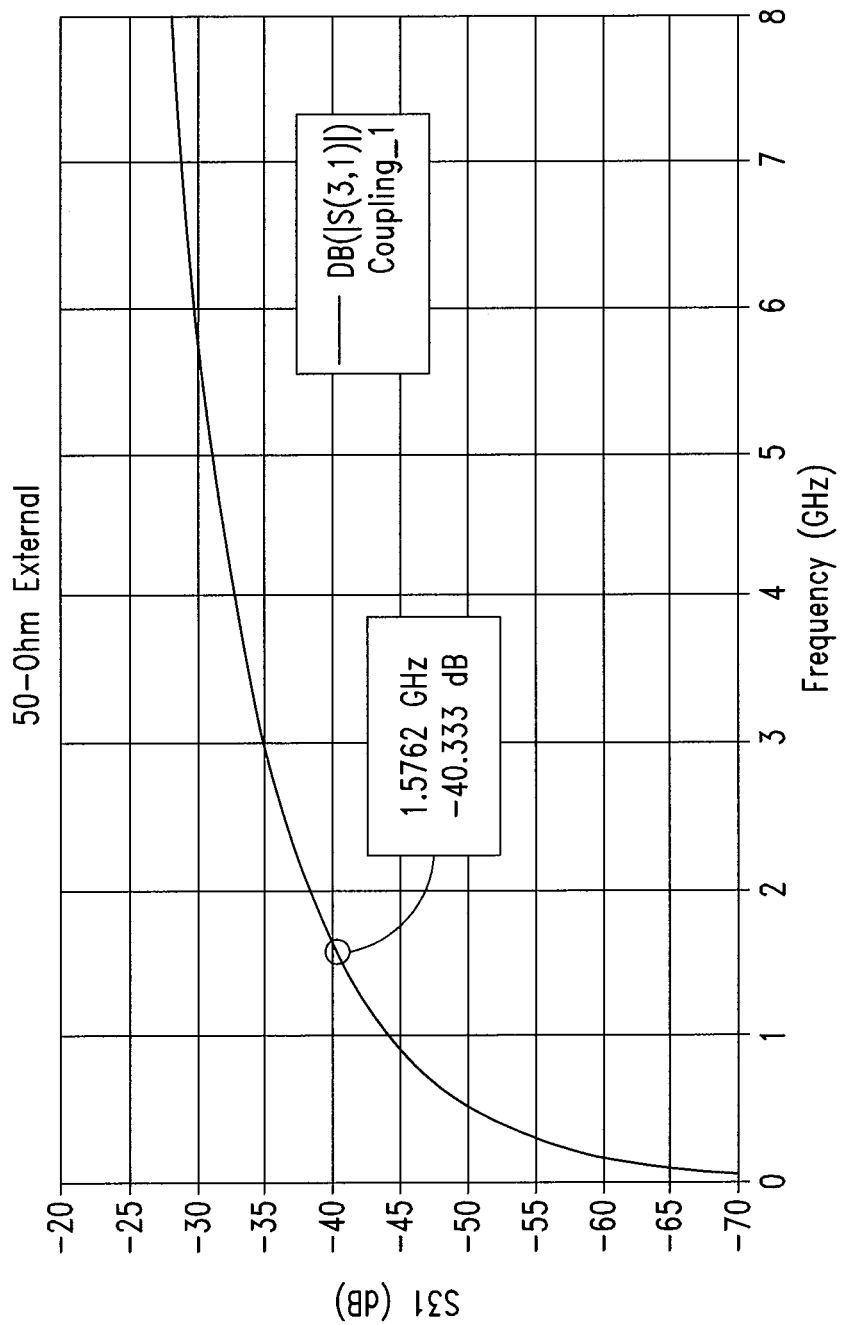
FIGS. 11 through 16 are graphical illustrations of the isolation of non-adjacent ports of selected configurations of an RFIC package coupled to a PCB.

FIG. 11 shows the isolation S31 between the two non-adjacent ports under consideration against the operation frequency when all of the ports are loaded at 50 Ohms. See the model 500 of FIG. 5.

FIG. 12 shows the isolation S31 between the two ports under consideration against the operation frequency when the ports under consideration (see ports 3 and 1 of FIG. 9) are loaded at 50 Ohms and the package lead of the ports separating the ports under consideration (see ports 2 and 5 of FIG. 9) is coupled, close to its edge, to a radio frequency ground on the PCB board and to a radio frequency ground on the RFIC chip. See FIG. 9. The isolation is improved by approximately 5 dB at 1.5762 GHz as compared to the isolation when all of the ports are loaded at 50 Ohms.

Figure 13:
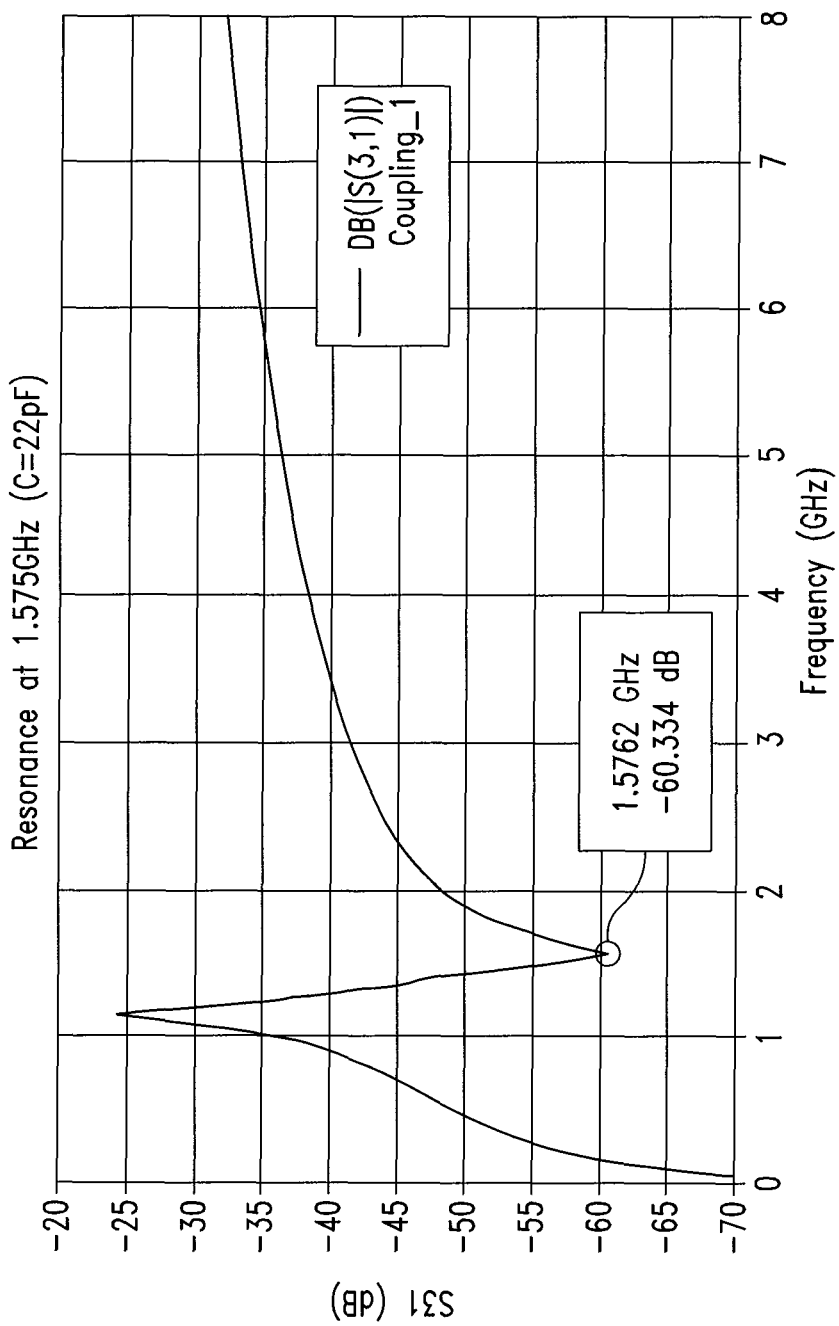

FIG. 13 shows the isolation S31 obtained from the embodiment of FIG. 10. As modeled, all of the segments of the package leads have a width of 0.3 mm, the horizontal segments W1-H, W2-H, W3-H have a length of 0.8 mm, the vertical segments W1-VERT, W2-VERT, W3-VERT a length of 0.7 mm, the air-exposed horizontal segments W1-A, W2-A, W3-A have a length of 0.2 mm, and the encased segments W1-P, W2-P, W3-P have a length of 0.4 mm. As modeled, the separation between adjacent package leads is 0.3 mm and ports 1, 3, 4 and 6 are externally loaded at 50 Ohms. The capacitance C2 of the capacitor 1032 is 22 pF with a parasitic resistance of 0.2 Ohms. The micro-strip line 1030 is modeled as having a length of 0.3 mm and a width of 0.3 mm. The micro-strip line 1038 is modeled as having a length of 0.3 mm and a width of 0.3 mm with a parasitic resistance of 0.05 Ohms. At 1.5762 GHz, the isolation between the ports under consideration is improved by about 15 dB over the grounding of the model of FIG. 9, and the frequency band over which the isolation is improved is fairly wide. At some frequencies, the isolation is degraded as compared to the 50 Ohm loaded model of FIG. 5 and the grounded model of FIG. 9.

Figure 14:
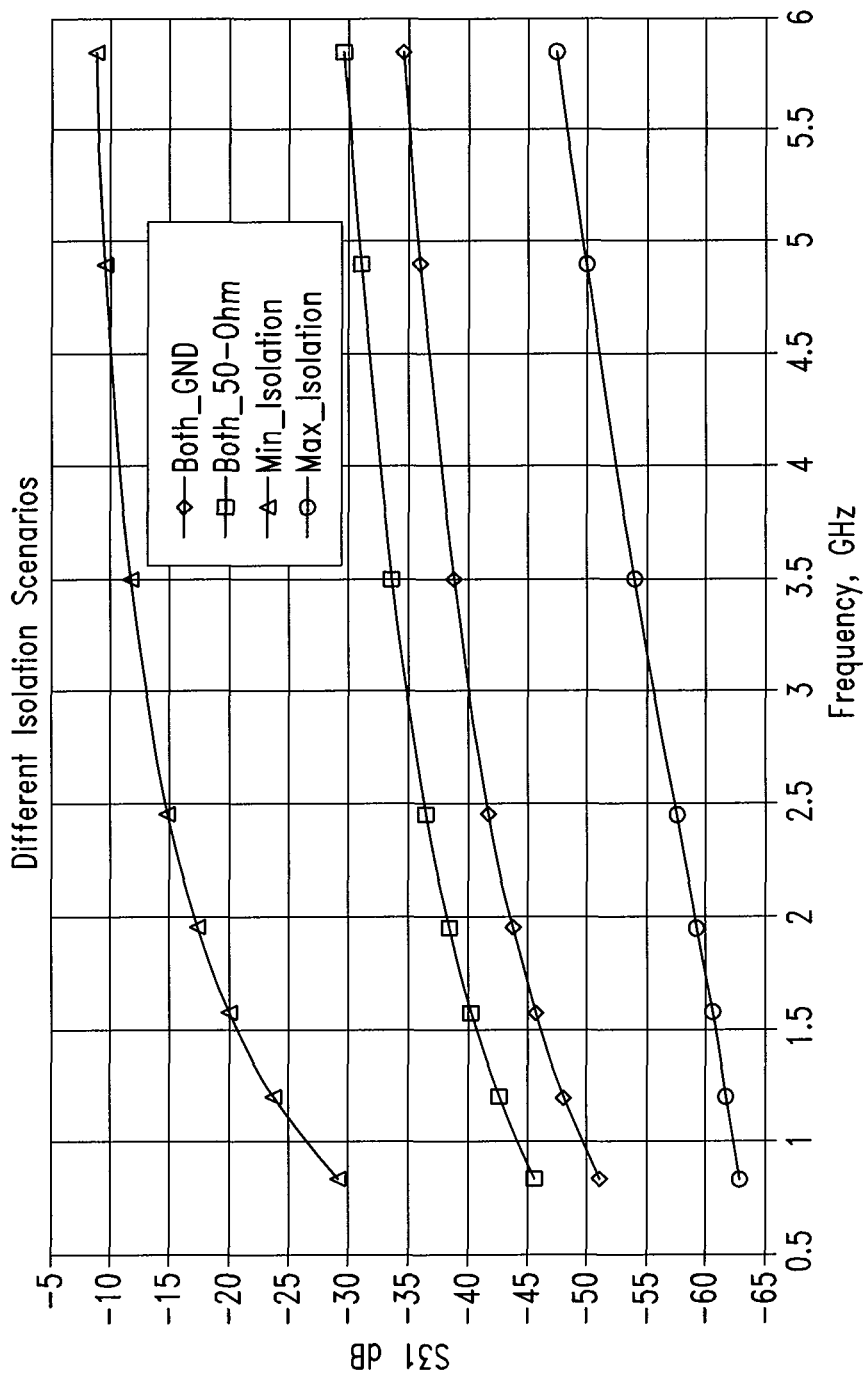

FIG. 14 compares isolation levels S31 against frequency for a grounded configuration (see FIG. 9), a 50 Ohm configuration (see FIG. 5) and for two selected capacitance values of the embodiment of FIG. 10, a first value selected to maximize the isolation at the particular frequency, and a second value selected to minimize isolation at the particular frequency (which is useful in some specific applications). Grounding produces about a 5 dB improvement, while the configuration of FIG. 10 produces a further improvement of about 13 dB to 15 dB in wide frequency range.

Figure 15:
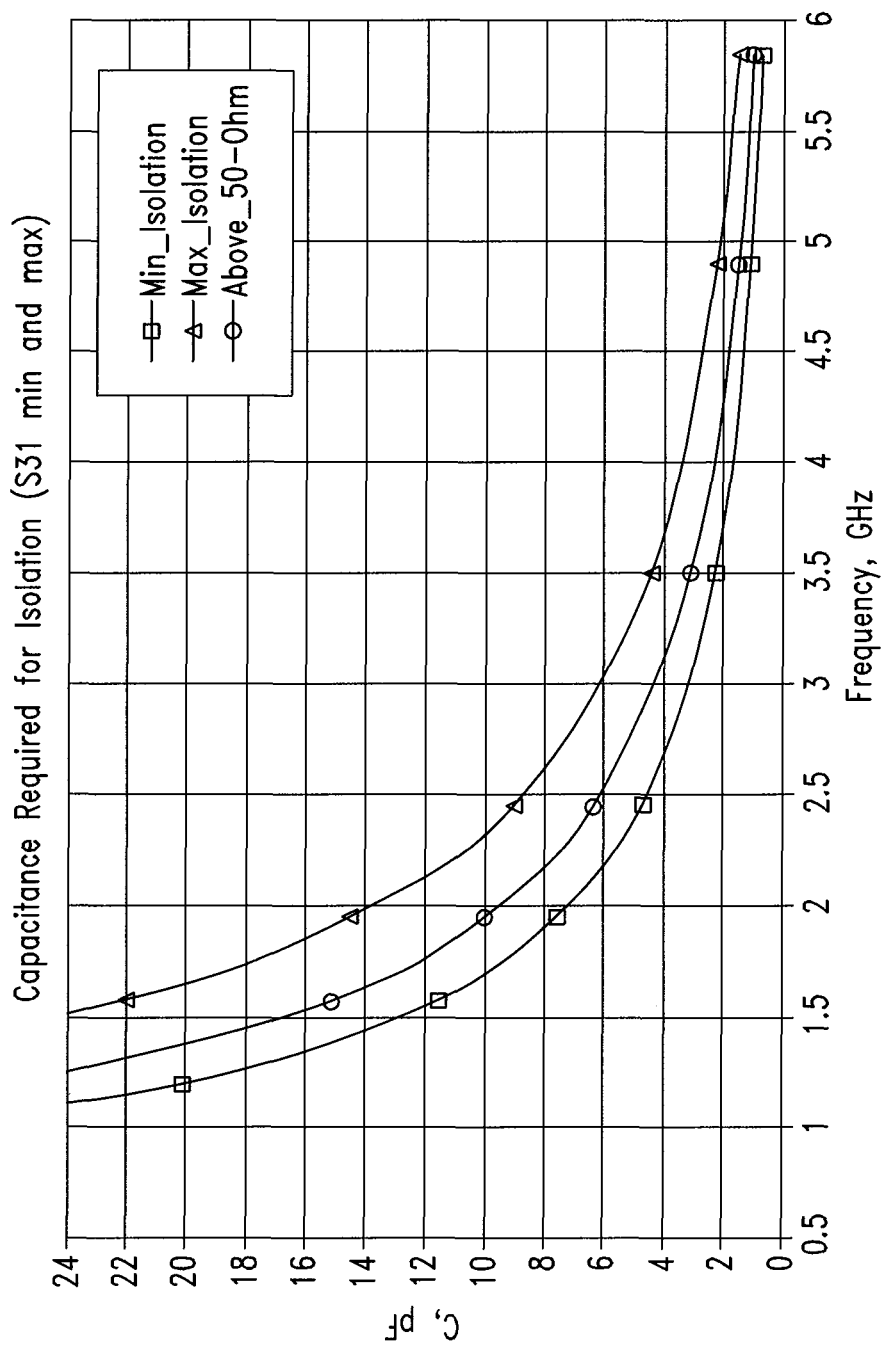

FIG. 15 graphically illustrates the capacitance of a capacitor to minimize and to maximize isolation in an embodiment using a PCB board capacitance to modify the electromagnetic field distribution around coupled package leads, such as the embodiment illustrated in FIG. 10. Also shown is an illustration of the capacitance values above which isolation is increased over the isolation when all the ports are loaded at 50 Ohms. The illustration shows that, at a given frequency, the capacitance for the maximum isolation is roughly twice the capacitance for the minimum isolation. Thus, a tolerance of a selected capacitor value should not raise significant issues.

Figure 16:
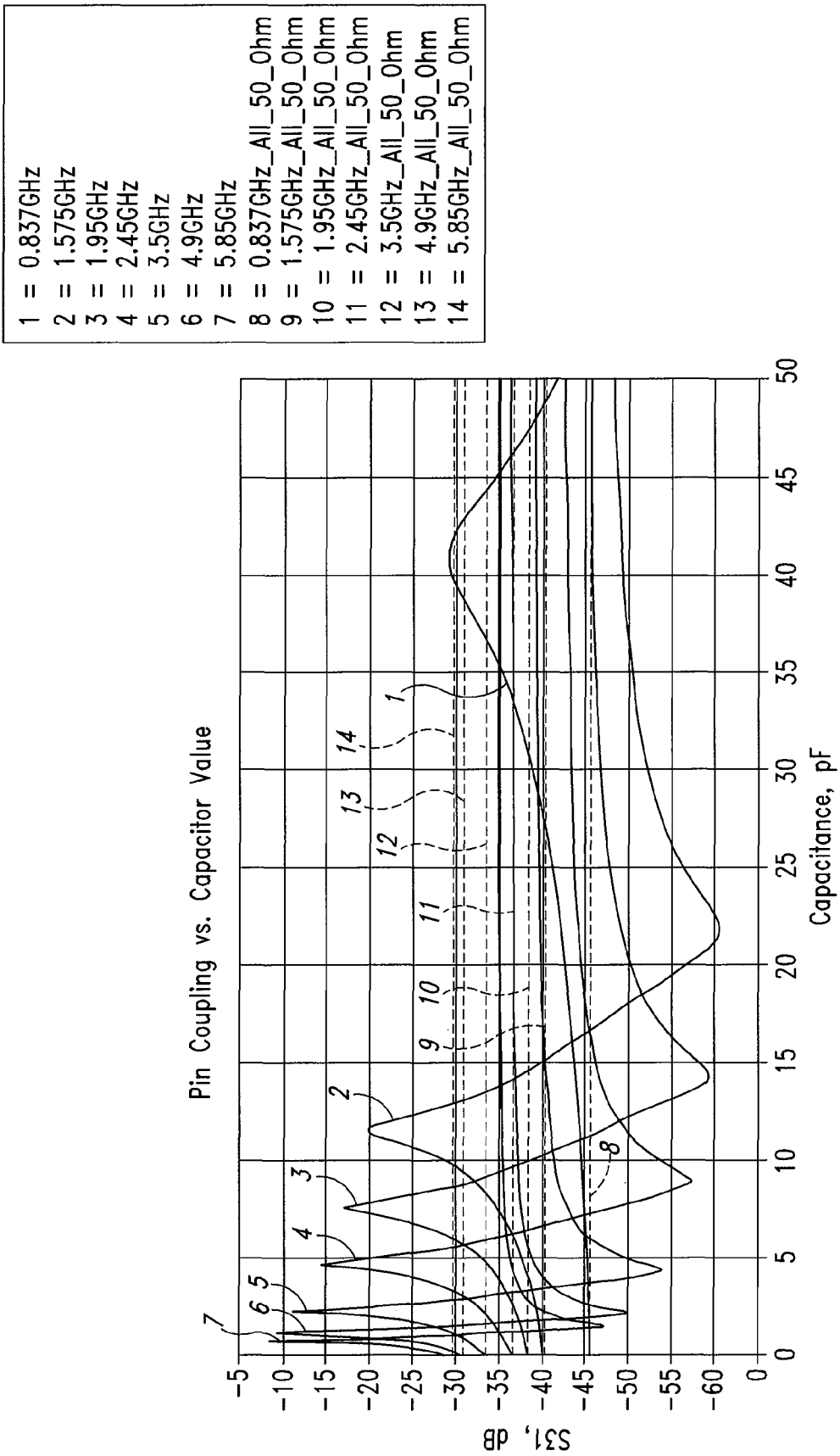

FIG. 16 graphically illustrates isolation S31 against selected capacitance values for various frequencies in an embodiment using a PCB board capacitance to modify the electromagnetic field distribution around coupled package leads, such as the embodiment illustrated in FIG. 10 to improve isolation between ports 1 and 3 (or ports 6 and 4). As shown, a capacitance above a certain level coupled to a separating package lead will always improve the isolation between ports (such as ports 1 and 3) coupled to the separated package leads as compared to a configuration where all the ports are loaded at 50 Ohms.

Figure 17:
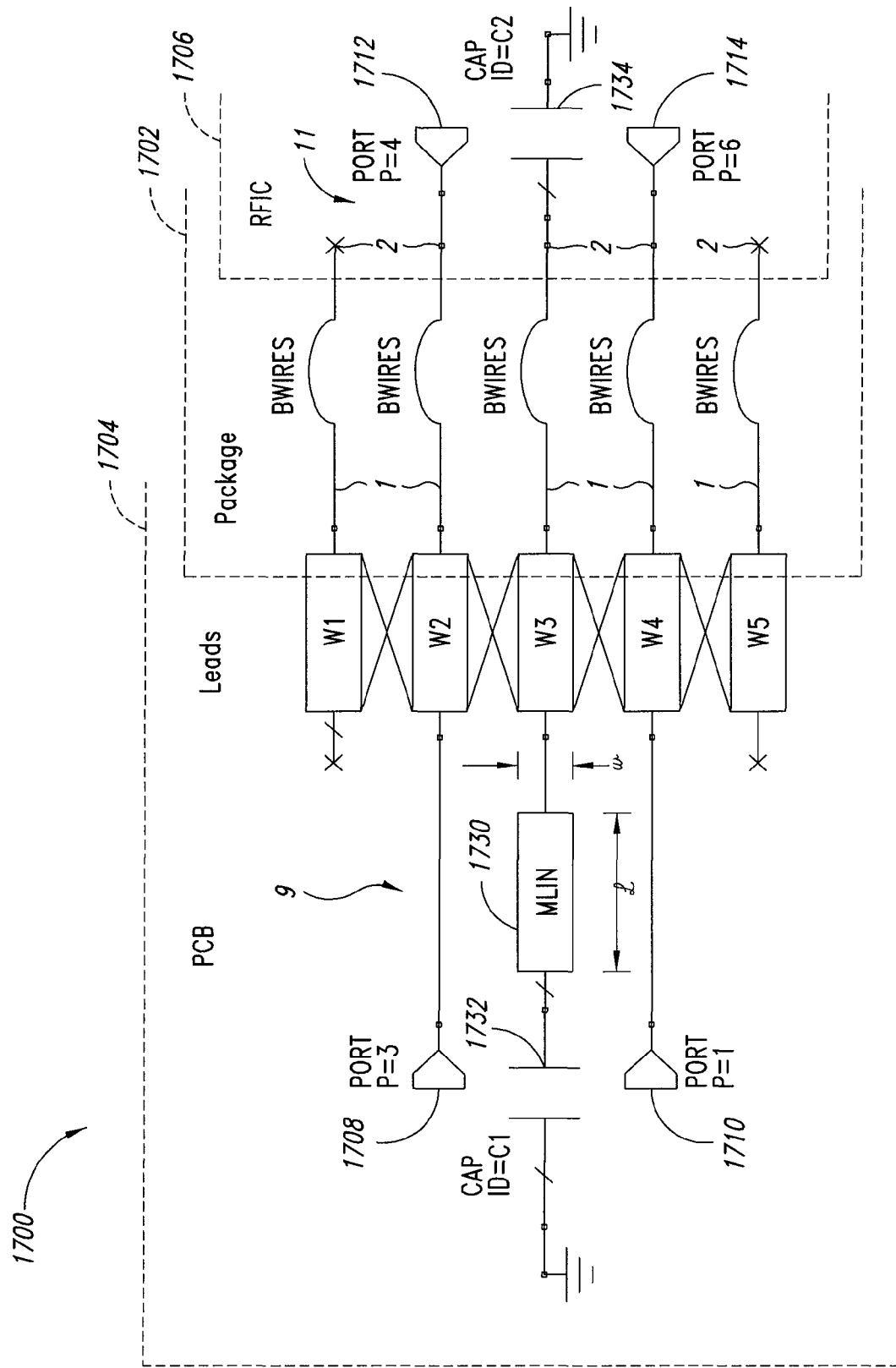
FIG. 17 is a functional block diagram of an embodiment of a system configured to isolate non-adjacent ports of an RFIC package.

FIG. 17 is a functional block diagram of an embodiment of system 1700 comprising an RFIC package 1702 mounted on a PCB board 1704. FIG. 17 shows only a portion of the system 1700 for ease of illustration. Additional components, such as additional packages and RFIC packages, may be mounted to the PCB 1704. The RFIC package 1702 comprises an RFIC chip 1706. The RFIC package may be a plastic package. As illustrated, the RFIC package 1702 has five package leads or pins W1-W5 configured to electrically couple the RFIC chip 1706 to the PCB 1704. The RFIC package may have additional leads. The five package leads W1-W5 are in a row, and as illustrated are uniformly spaced apart. The package leads W1-W5 are coupled to via bonding wires 1 to bonding pads 2 on the RFIC chip 1706. The bonding pads 2 are coupled to circuitry of the RFIC chip 1706.

The RFIC package 1702 may be coupled to the PCB 1704 using standard techniques. For example, the RFIC package 1702 may be soldered to the PCB 1704. Some embodiments may employ sockets on the PCB configured to receive the package leads or pins of the RFIC package 1702. In some embodiments, the RFIC package 1702 may be soldered to the PCB 1704, and the PCB may be mounted to another PCB. For example, the PCB may have a set of pins which are configured to be received by a socket in another PCB. The connections between the RFIC package 1702 and the PCB 1704 may include, for example, signal, biasing, power and control connections. The PCB 1704 typically has metal traces 9 that couple the connections between the RFIC package 1702 and the PCB 1704 to circuitry of the PCB 1704.

As illustrated, four ports 1708, 1710, 1712, 1714 are configured to carry RF signals between the PCB 1704 and the RFIC chip 1706. The system 1700 may comprise additional ports and package leads configured to carry signals between the PCB 1704 and the RFIC chip 1706, including additional RF ports. The connections of package leads W1 and W5 to components (such as ports) of the PCB 1702 and of the RFIC chip 1706 are not shown for ease of illustration.

A first connection chain electrically couples port 1 1710 to port 6 1714 through micro-strip line trace 9, package lead W4, a bond wire 1, a bond pad 2 and a micro-strip line trace 11. A second connection chain electrically couples port 3 1708 to port 4 1712 through a micro-strip line trace 9, a package lead W2, a bond wire 1, a bond pad 2 and a micro-strip line trace 11. Electromagnetic coupling between port 1 1710 and port 3 1708 may arise through the PCB 1704, the package leads W1-W5, the bond wires 1, the bond pads 2 and the RFIC chip 1706, particularly in view of the small dimensions of the RFIC package 1702. Similarly, electromagnetic coupling between port 4 1712 and port 6 1714 may occur. To address this coupling, a third connection chain includes a package lead W3 placed between package lead W2 and package lead W4, and is configured to reduce electromagnetic coupling between non-adjacent ports. Package lead W3 is coupled through a short length of micro-strip line metal tracing MLIN 1730 to a first end of a capacitor C1 1732 on the PCB 1704. The micro-strip line metal tracing MLIN 1730 has a length L and a width w. The other end of the capacitor C1 1732 is coupled to a reference voltage on the PCB 1704. As illustrated, the reference voltage is a radio frequency ground. Package lead W3 also is coupled to a first end of a capacitor C2 1734 on the RFIC chip 1706. The other end of the capacitor C2 1734 is coupled to a reference voltage. As illustrated, the reference voltage is a radio frequency ground on the RFIC chip 1706. The values of the capacitors C1 1732 and C2 1734, and the length and width of the micro-strip line metal tracing MLIN 1730 may be selected so as to minimize coupling between ports 1 and 3 and 4 and 6 at frequencies of interest. For example, and as discussed in more detail below, the values for desired operational frequencies or frequency ranges may be selected using electromagnetic or simplified circuit simulation. For example, physical models or modeling programs may be employed to select the values for the length and width of the micro-strip line metal tracing MLIN 1730 and for the capacitances of the capacitors C1 1732 and C2 1734.

For a given configuration, there will typically be optimum capacitance values for obtaining maximum isolation at a given frequency. In addition, selecting the capacitance values improving isolation at a selected frequency will generally improve isolation for frequencies higher than the selected frequency in a frequency range. For a given frequency and configuration, a capacitance above a selected value will result in improved isolation as compared to a 50 Ohm loaded or a grounded configuration. In an embodiment, the isolation may be improved over conventional grounding of the package lead W3 by as much as 20 dB over a wide frequency range. In some embodiments, the capacitances for the capacitors C1 1732 and C2 1734 will be the same. For example, both capacitors may have a capacitance of 4.5 pF. Generally, a maximum isolation for a particular frequency will be obtained by selecting a capacitance value for C1 1732 and C2 1734 that is twice the value selected to obtain a maximum isolation for the frequency in the embodiment of FIG. 3.

Figure 18:
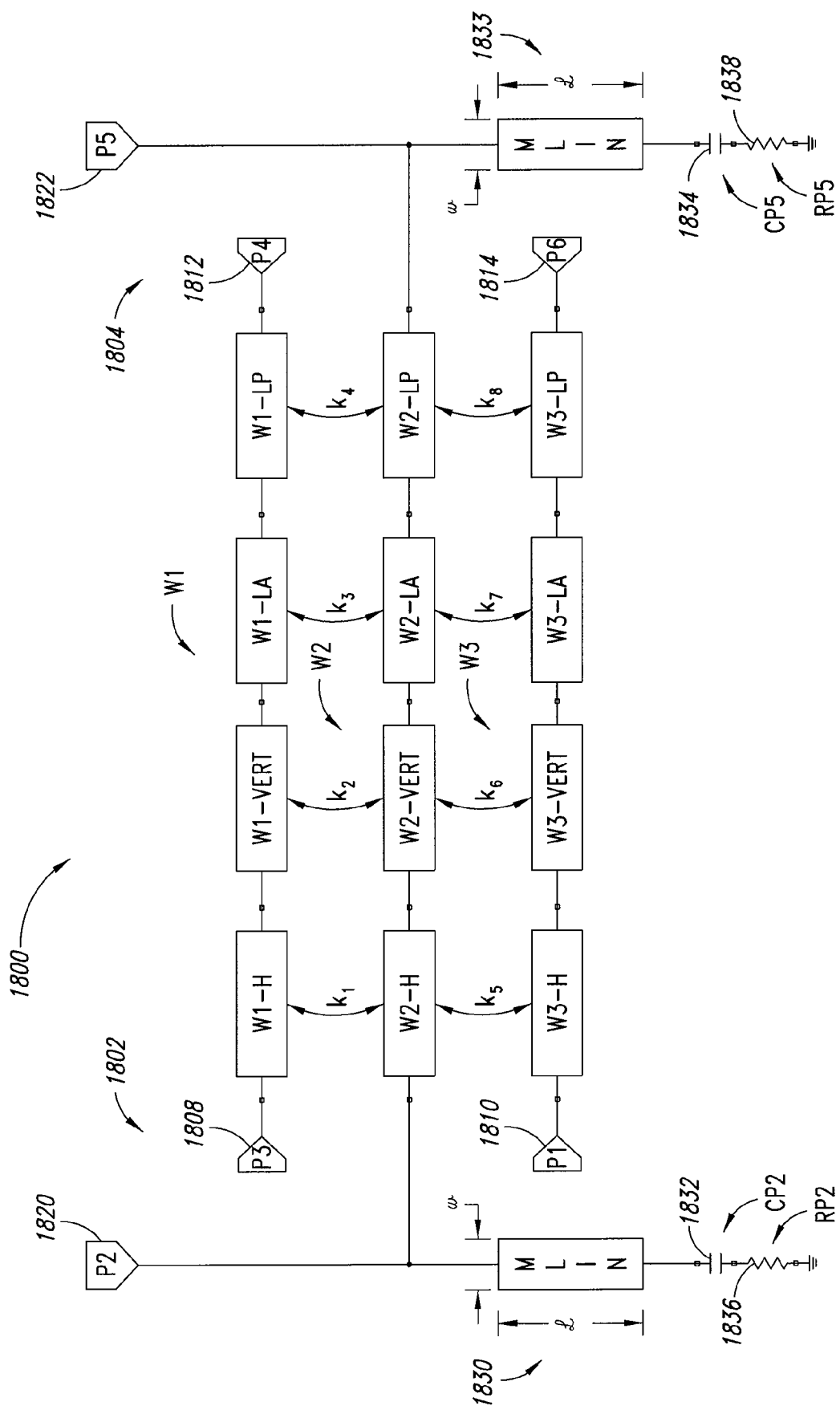
FIG. 18 is functional block diagram of a model of an embodiment of a system configured to isolate non-adjacent ports of an RFIC package.

FIG. 18 is a functional block diagram illustrating an embodiment of a model 1800 of a system configured to reduce electromagnetic coupling between non-adjacent ports coupling a PCB 1802 to an RFIC chip 1804 by changing the electro-magnetic field distribution in the area of coupled package leads W1-W3. The model 1800 may be used, for example, to model the embodiment of FIG. 17 to facilitate selection of the width and length of the micro-strip line MLIN 1730 and the capacitance of the capacitors C1 1732 and C2 1734 of FIG. 17.

As illustrated in FIG. 18, port 3 1808 is electrically coupled to port 4 1812 through package lead W1, port 2 1820 is electrically coupled to port 5 1822 through package lead W2, and port 1 1810 is electrically coupled to port 6 1814 through package lead W3. Ports 3 and 4 may be loaded with an input impedance of, for example, 50 Ohms. Ports 1 and 6 may be loaded with an input impedance of, for example, 50 Ohms. Optional ports 2 and 5 may be loaded with, for example, a high input impedance, and may be used for signal monitoring. Other input impedances may be employed.

The package leads W1-W3 electrically coupling the ports may be modeled as separate segments. The modeling of the package leads described with respect to FIG. 5 above, for example, may be employed. The doubled sided arrows $k_1$ through $k_8$, show coupling between the parts of the chains, and can be modeled as coupling coefficients. A micro-strip line trace 1830 having a length L and a width w couples the package lead W2 to a capacitor CP2 1832 on the PCB 1802, and is modeled with an associated parasitic resistance RP2 1836 coupled in series between the capacitor CP2 1832 and a radio frequency ground on the PCB 1802. A short wire or line, modeled as a micro-strip line trace 1833 couples the package lead W2 to a capacitor CP5 1834 on the RFIC chip 1804, and is modeled with an associated parasitic resistance RP5 1838 coupled in series between the capacitor CP5 1834 and a radio frequency ground on the RFIC 1804. The length and width of the micro-strip line trace 1833 on the RFIC chip 1804 may differ from the length and width of the micro-strip line trace on the PCB 1802.

FIGS. 19 through 22 graphically illustrate the results of modeling the isolation between two non-adjacent ports (i.e., ports 3 and 1 of FIG. 5) when the associated pins (i.e., package leads W1 and W3 of FIG. 5) are separated by another pin (i.e., package lead W2 of FIG. 5) of another port (i.e., port 2 of FIG. 5) placed between the two pins under different configurations.

Figure 19:
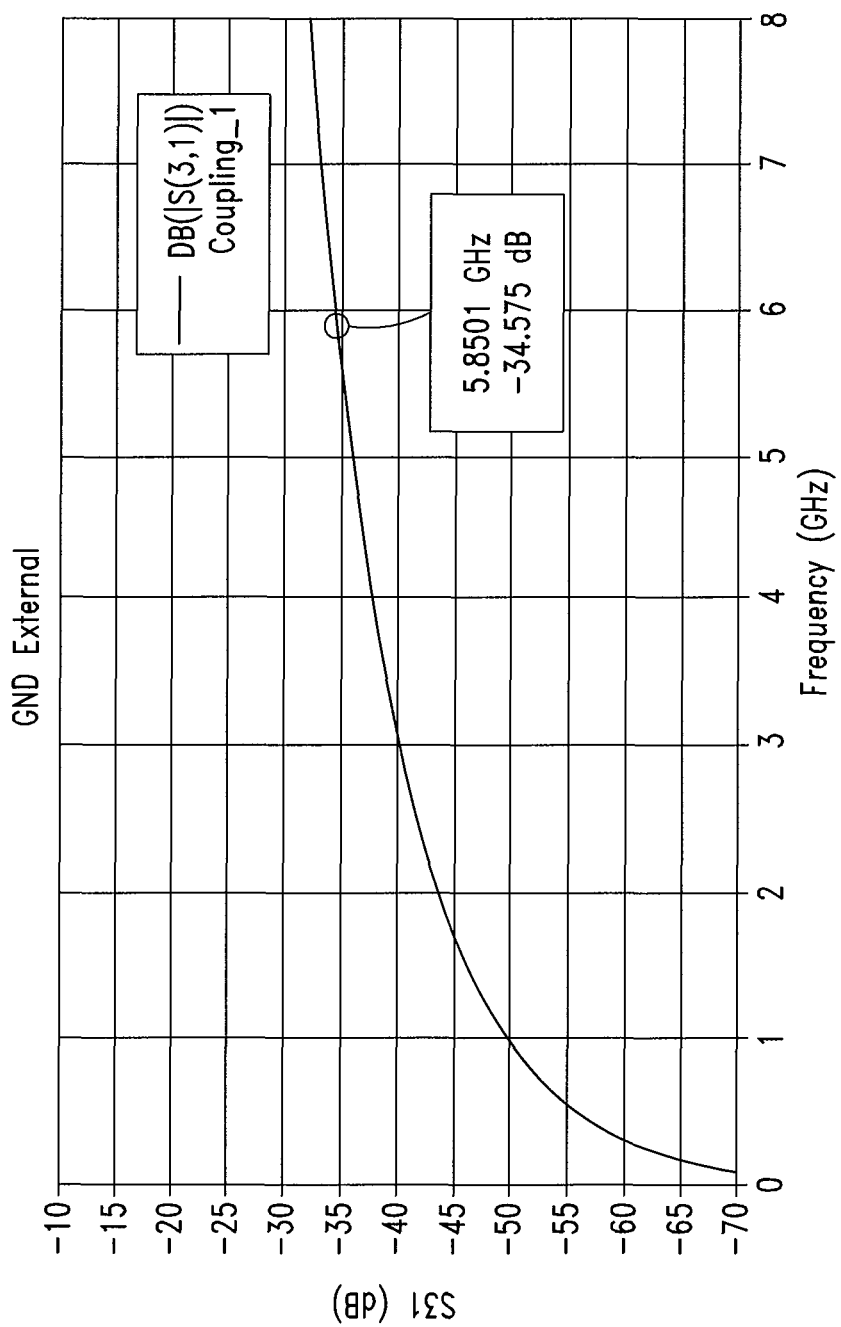
FIGS. 19 through 22 are graphical illustrations of the isolation of non-adjacent ports of selected configurations of an RFIC package coupled to a PCB.

FIG. 19 shows the isolation S31 between the two non-adjacent ports under consideration against the operating frequency when the ports under consideration (see ports 3 and 1 of FIG. 9) are loaded at 50 Ohms and the package lead of the ports separating the ports under consideration (see ports 2 and 5 of FIG. 9) is coupled, close to its edge, to a radio frequency ground on the PCB board and to a radio frequency ground on the RFIC chip. See FIG. 9. At 5.8501 GHz, the isolation is −34.575 dB.

Figure 20:
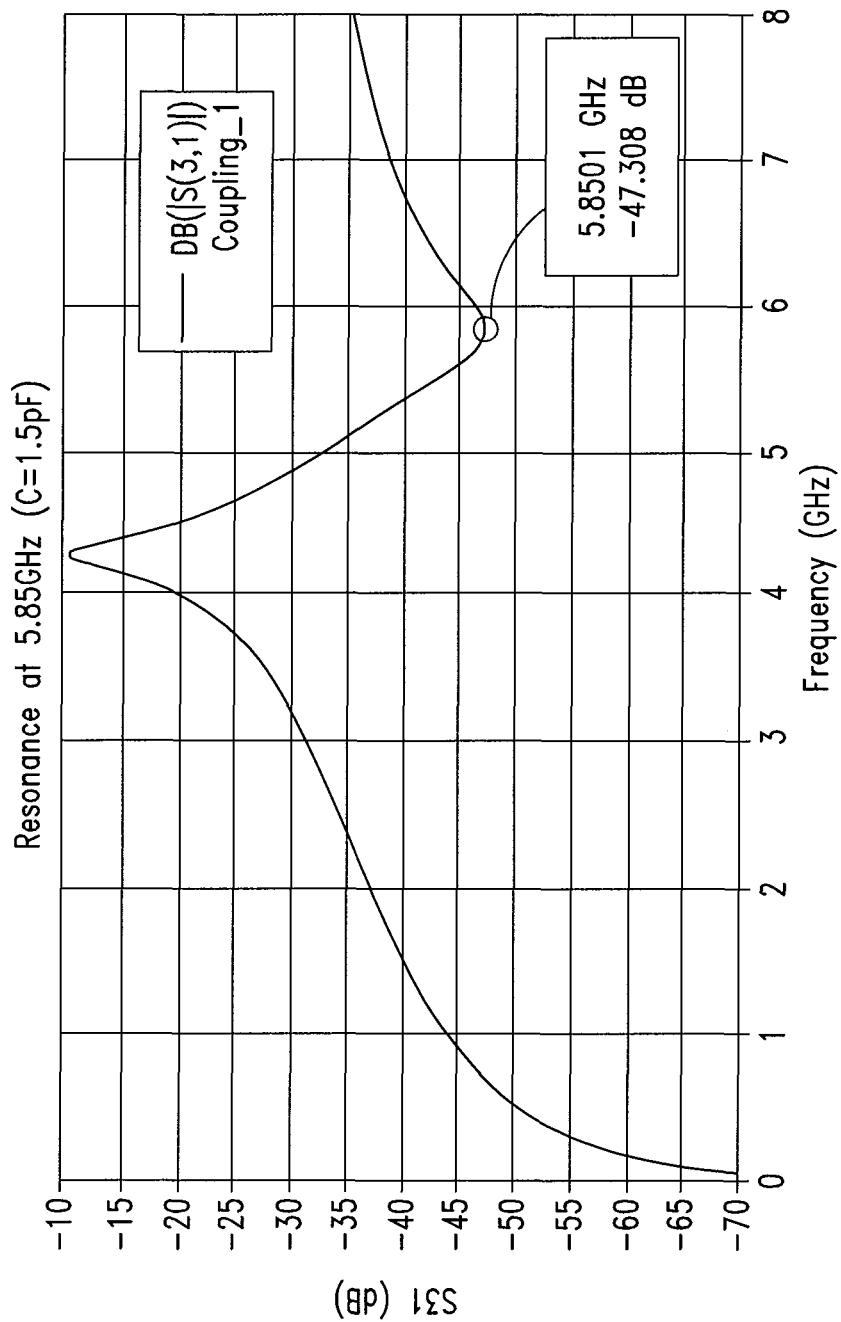

FIG. 20 shows the isolation S31 obtained from the embodiment of FIG. 10. As modeled, all of the segments of the package leads have a width of 0.3 mm, the horizontal segments W1-H, W2-H, W3-H have a length of 0.8 mm, the vertical segments W1-VERT, W2-VERT, W3-VERT a length of 0.7 mm, the air-exposed horizontal segments W1-A, W2-A, W3-A have a length of 0.2 mm, and the encased segments W1-P, W2-P, W3-P have a length of 0.4 mm. As modeled, the separation between adjacent package leads is 0.3 mm and ports 1, 3, 4 and 6 are externally loaded at 50 Ohms. The capacitance C2 of the capacitor 1032 is 1.5 pF. At 5.8501 GHz, the isolation between the ports under consideration is −47.308 dB. At some frequencies, the isolation is degraded as compared to the 50 Ohm loaded model of FIG. 5 and the grounded model of FIG. 9.

Figure 21:
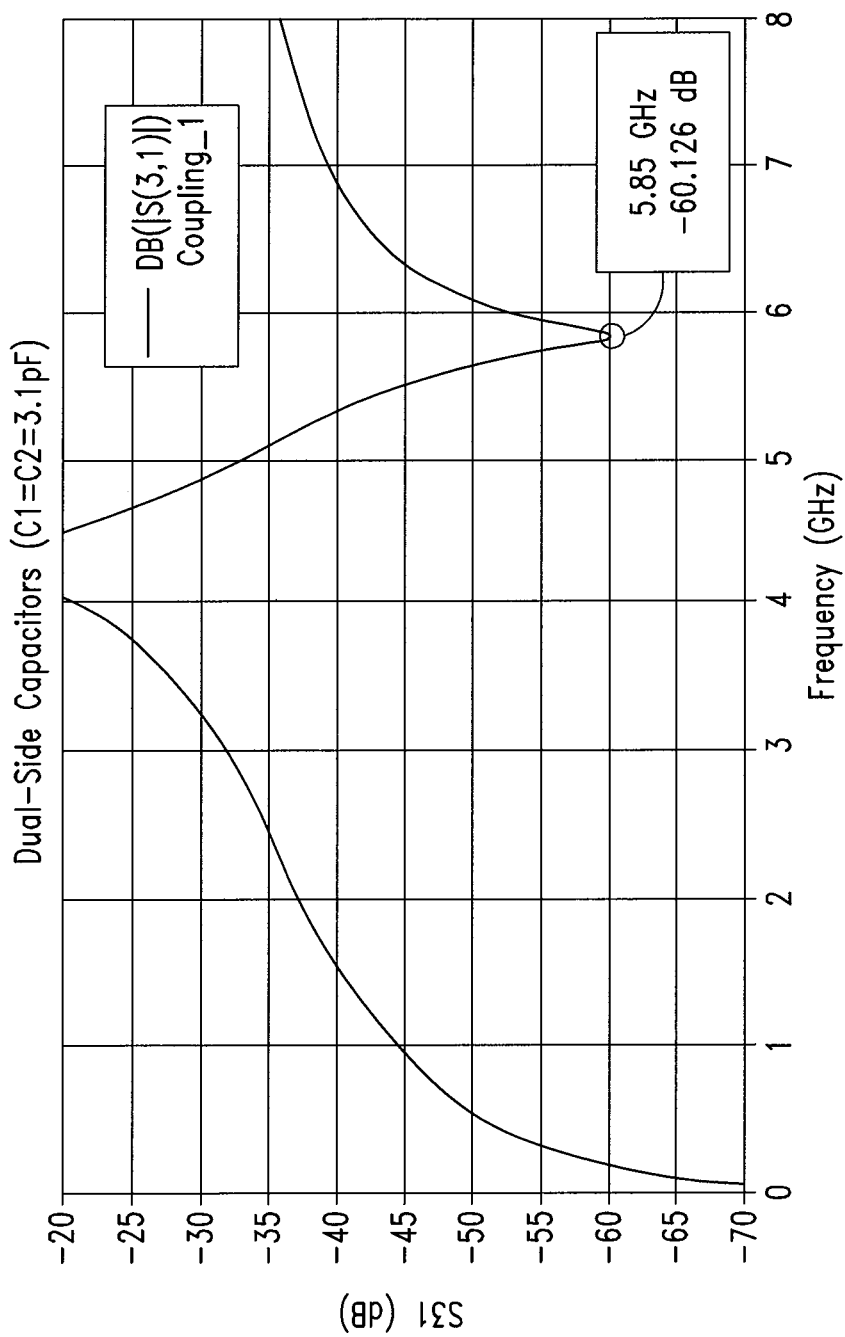

FIG. 21 shows the isolation S31 obtained from the embodiment of FIG. 18. As modeled, all of the segments of the package leads have a width of 0.3 mm, the horizontal segments W1-H, W2-H, W3-H have a length of 0.8 mm, the vertical segments W1-VERT, W2-VERT, W3-VERT a length of 0.7 mm, the air-exposed horizontal segments W1-A, W2-A, W3-A have a length of 0.2 mm, and the encased segments W1-P, W2-P, W3-P have a length of 0.4 mm. As modeled, the separation between adjacent package leads is 0.3 mm and ports 1, 3, 4 and 6 are externally loaded at 50 Ohms. The capacitance C2 of the PCB capacitor 1832 is 3.1 pF. The capacitance C5 of the RFIC capacitor 1834 is 3.1 pF. At 5.85 GHz, the isolation between the non-adjacent ports under consideration is −60.126 dB, with the package leads of the ports of interest separated by only 0.9 mm. To obtain a 60 dB isolation at 5.85 GHz using physical positioning, package leads 3 and 1 would need to be over 5 mm apart. At some frequencies, the isolation is degraded as compared to the 50 Ohm loaded model of FIG. 5, the grounded model of FIG. 9 and the PCB-side capacitor model of FIG. 10. At the frequency of interest, the improvement in isolation over grounding is over 25 dB, and the band over which isolation is increased in fairly wide.

Figure 22:
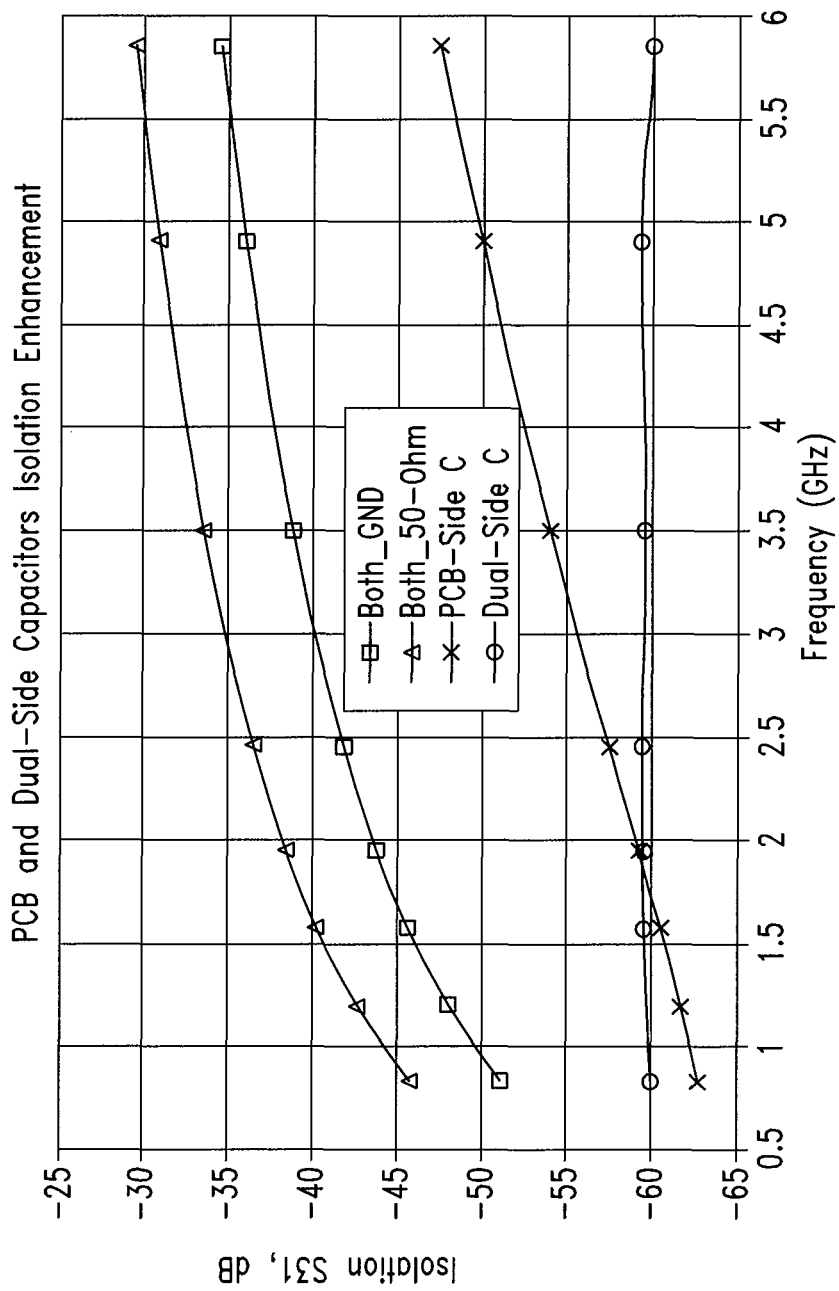

FIG. 22 compares isolation levels S31 against frequency for a grounded configuration (see FIG. 9), a 50 Ohm configuration (see FIG. 5), a PCB-side capacitor configuration (see FIGS. 3 and 10), and a dual side capacitor configuration (See FIGS. 17 and 18), with the capacitances chosen to maximize isolation based on the models. Grounding produces about a 5 dB improvement, while the PCB side capacitor configuration of FIG. 10 produces a further improvement of about 13 dB to 15 dB, and the dual side capacitor configuration of FIG. 18 produces an improvement over grounding of between approximately 8 dB and 25 dB. At some frequency ranges, the PCB-side capacitor configuration (see FIGS. 3 and 10) provided increased isolation over the dual-side capacitor configuration (see FIGS. 17 and 18). In some embodiments, the capacitances may be selected so as to minimize isolation. The simplification used in modeling may impact the amount of isolation achieved in practice using selected trace and capacitance configurations.

Figure 23:
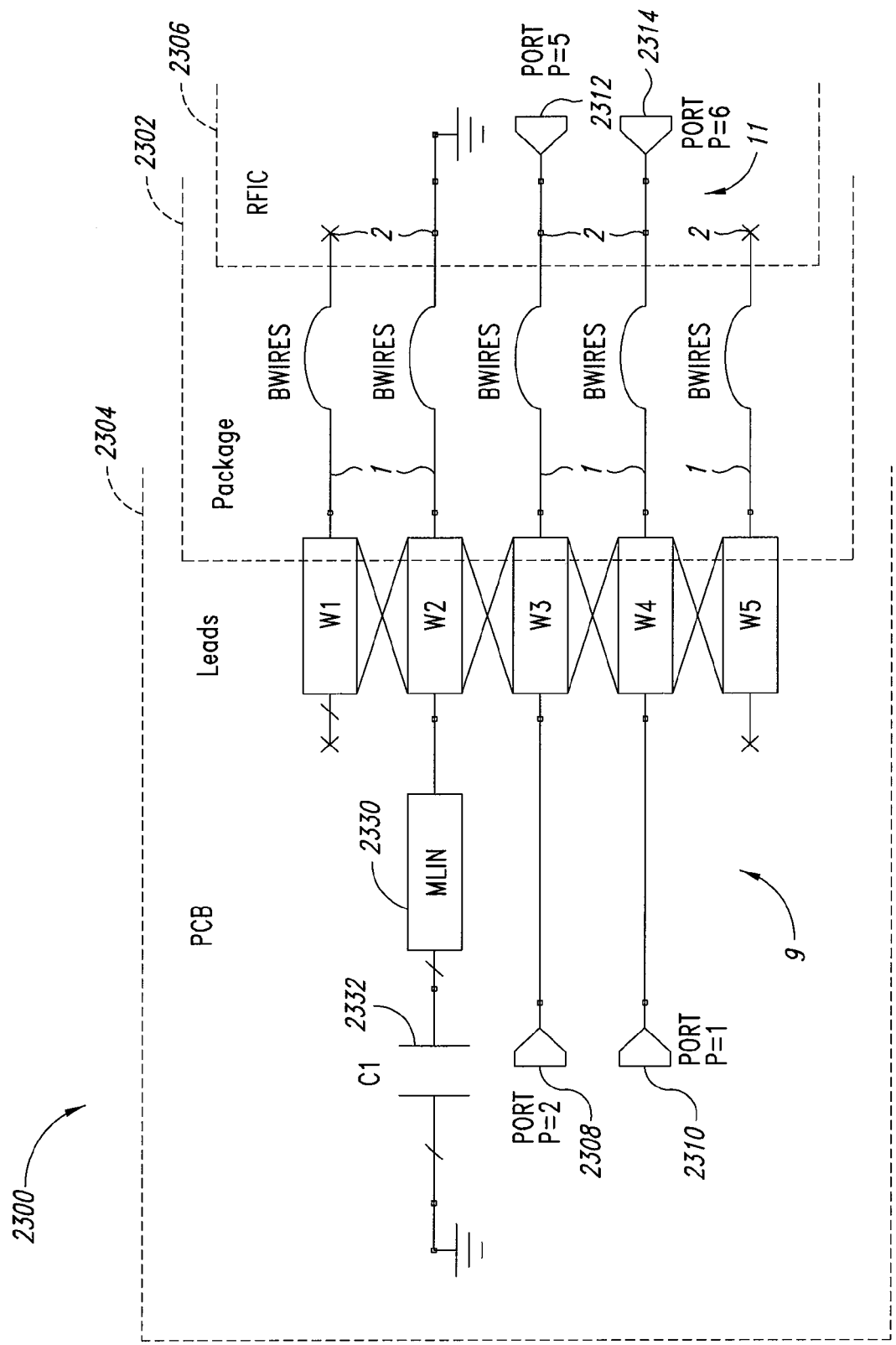
FIG. 23 is a functional block diagram of an embodiment of a system configured to isolate adjacent ports of an RFIC package.

FIG. 23 is a functional block diagram of an embodiment of system 2300 comprising an RFIC package 2302 mounted on a PCB board 2304. FIG. 23 shows only a portion of the system 2300 for ease of illustration. Additional components, such as additional packages and RFIC packages, may be mounted to the PCB 2304. The RFIC package 2302 comprises an RFIC chip 2306. The RFIC package may be a plastic package. As illustrated, the RFIC package 2302 has five package leads or pins W1-W5 configured to electrically couple the RFIC chip 2306 to the PCB 2304. The RFIC package may have additional leads. The five package leads W1-W5 are in a row, and as illustrated are uniformly spaced apart. The package leads W1-W5 are coupled to via bonding wires 1 to bonding pads 2 on the RFIC chip 2306. The bonding pads 2 are coupled to circuitry of the RFIC chip 2306.

The RFIC package 2302 may be coupled to the PCB 2304 using standard techniques. For example, the RFIC package 2302 may be soldered to the PCB 2304. Some embodiments may employ sockets on the PCB configured to receive the package leads or pins of the RFIC package 2302. In some embodiments, the RFIC package 2302 may be soldered to the PCB 2304, and the PCB may be mounted to another PCB. For example, the PCB may have a set of pins which are configured to be received by a socket in another PCB. The connections between the RFIC package 2302 and the PCB 2304 may include, for example, signal, biasing, power and control connections. The PCB 2304 typically has metal traces 9 that couple the connections between the RFIC package 2302 and the PCB 2304 to circuitry of the PCB 2304.

As illustrated, four ports 2308, 2310, 2312, 2314 are configured to carry RF signals between the PCB 2304 and the RFIC chip 2306 through adjacent package leads W3 and W4. The system 2300 may comprise additional ports and package leads configured to carry signals between the PCB 2304 and the RFIC chip 2306, including additional RF ports. The connections of package leads W1 and W5 to components (such as ports) of the PCB 2302 and of the RFIC chip 2306 are not shown for ease of illustration.

A first connection chain electrically couples port 1 2310 to port 6 2314 through micro-strip line trace 9, package lead W4, a bond wire 1, a bond pad 2 and a micro-strip line trace 11. A second connection chain adjacent to the first connection chain electrically couples port 2 2308 to port 5 2312 through a micro-strip line trace 9, a package lead W3, a bond wire 1, a bond pad 2 and a micro-strip line trace 11. Electromagnetic coupling between port 1 2310 and port 2 2308 may arise through the PCB 2304, the package leads W1-W5, the bond wires 1, the bond pads 2 and the RFIC chip 2306, particularly in view of the small dimensions of the RFIC package 2302. Similarly, electromagnetic coupling between port 5 2312 and port 6 2314 may occur. To address this coupling, a package lead W2 of a third connection chain is placed near to the package lead W3 of the second chain, on the opposite side from the package lead W4 of the first chain. The third connection chain is configured to reduce electromagnetic coupling between the ports of the first and second chains. For example, and as illustrated, the package lead W2 may be a neighboring lead on a side of the package lead W3 of the second chain opposite from the package lead W4 of the first chain. The package lead W2 is coupled through a short length of micro-strip line metal tracing MLIN 2330 to a first end of a capacitor C1 2332 on the PCB 2304. The micro-strip line metal tracing MLIN 2330 has a length and a width. The other end of the capacitor C1 2332 is coupled to a reference voltage on the PCB 2304. As illustrated, the reference voltage is a radio frequency ground. Package lead W2 also is coupled to a reference voltage on the RFIC chip 2306 via bonding wire 1 and bonding pad 2. As illustrated, the reference voltage is a radio frequency ground on the RFIC chip 2306. The values of the capacitor C1 2332 and the length and width of the micro-strip line metal tracing MLIN 2330 may be selected so as to minimize coupling between ports 1, 2, 5 and 6 at frequencies of interest. For example, and as discussed in more detail below, the values for desired operational frequencies or frequency ranges may be selected using electromagnetic or simplified circuit simulation. For example, physical models or modeling programs may be employed to select the values for the length and width of the micro-strip line metal tracing MLIN 2330 and for the capacitance of the capacitor C1 2332.

For a given configuration, there will typically be an optimum capacitance value for obtaining maximum isolation at a given frequency. In addition, selecting the capacitance value improving isolation at a selected frequency will generally improve isolation for frequencies higher than the selected frequency in a frequency range. For a given frequency and configuration, a capacitance above a selected value will result in improved isolation as compared to a 50 Ohm loaded or a grounded configuration. In an embodiment, the isolation may be improved over conventional grounding of a package lead placed between the package leads of the RF ports by 5 to 10 dB over a wide frequency range.

Figure 24:
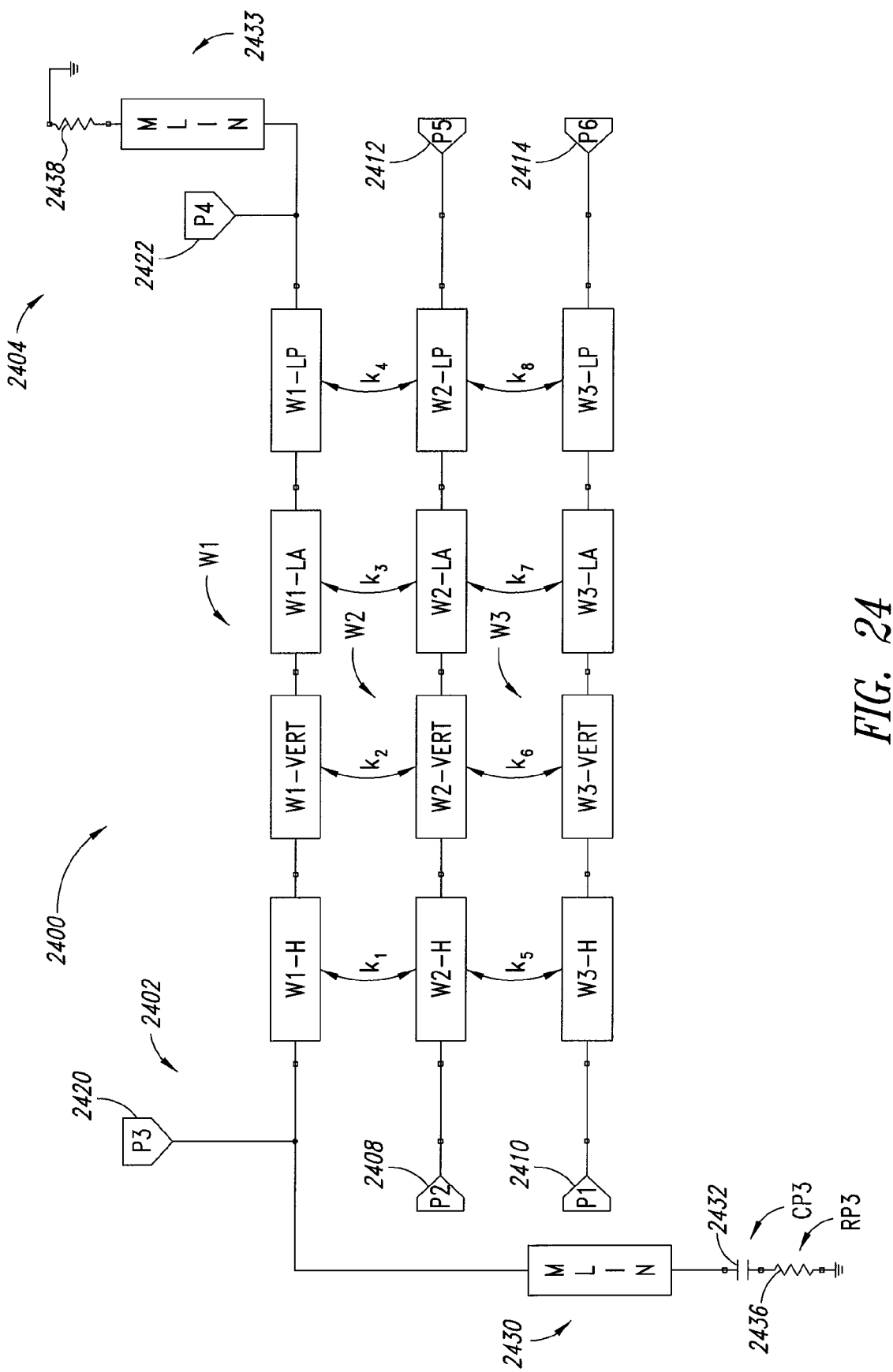
FIG. 24 is functional block diagram of an embodiment of a model of a system configured to isolate adjacent ports of an RFIC package.

FIG. 24 is a functional block diagram illustrating an embodiment of a model 2400 of a system configured to reduce electromagnetic coupling between adjacent ports coupling a PCB 2402 to an RFIC chip 2404 by changing the electro-magnetic field distribution in the area of coupled package leads W1-W3. The model 2400 may be used, for example, to model the embodiment of FIG. 23 to facilitate selection of the width and length of the micro-strip line MLIN 2330 and the capacitance of the capacitor C1 2332 of FIG. 23.

As illustrated in FIG. 24, port 2 2408 is electrically coupled to port 5 2412 through package lead W2, port 3 2420 is electrically coupled to port 4 2422 through package lead W1, and port 1 2410 is electrically coupled to port 6 2414 through package lead W3. Ports 2 and 5 may be loaded with an input impedance of, for example, 50 Ohms. Ports 1 and 6 may be loaded with an input impedance of, for example, 50 Ohms. Optional ports 3 and 4 may be loaded with, for example, a high input impedance, and may be used for signal monitoring. Other input impedances may be employed.

The package leads W1-W3 electrically coupling the ports may be modeled as separate segments. The modeling of the package leads described with respect to FIG. 5 above, for example, may be employed. The doubled sided arrows $k_1$ through $k_8$, show coupling between the parts of the chains, and can be modeled as coupling coefficients. A micro-strip line trace 2430 having a length L and a width w couples the package lead W1 to a capacitor CP3 2432 on the PCB 2402, and is modeled with an associated parasitic resistance RP3 2436 coupled in series between the capacitor CP3 2432 and a radio frequency ground on the PCB 2402. A short wire, modeled as micro-strip line trace 2433 and an associated parasitic resistance 2438, couples the package lead W1 to a radio frequency ground on the RFIC chip 2404. The length and width of the micro-strip line trace on the RFIC chip may differ from the length and width of the micro-strip line trace on the PCB.

Figure 25:
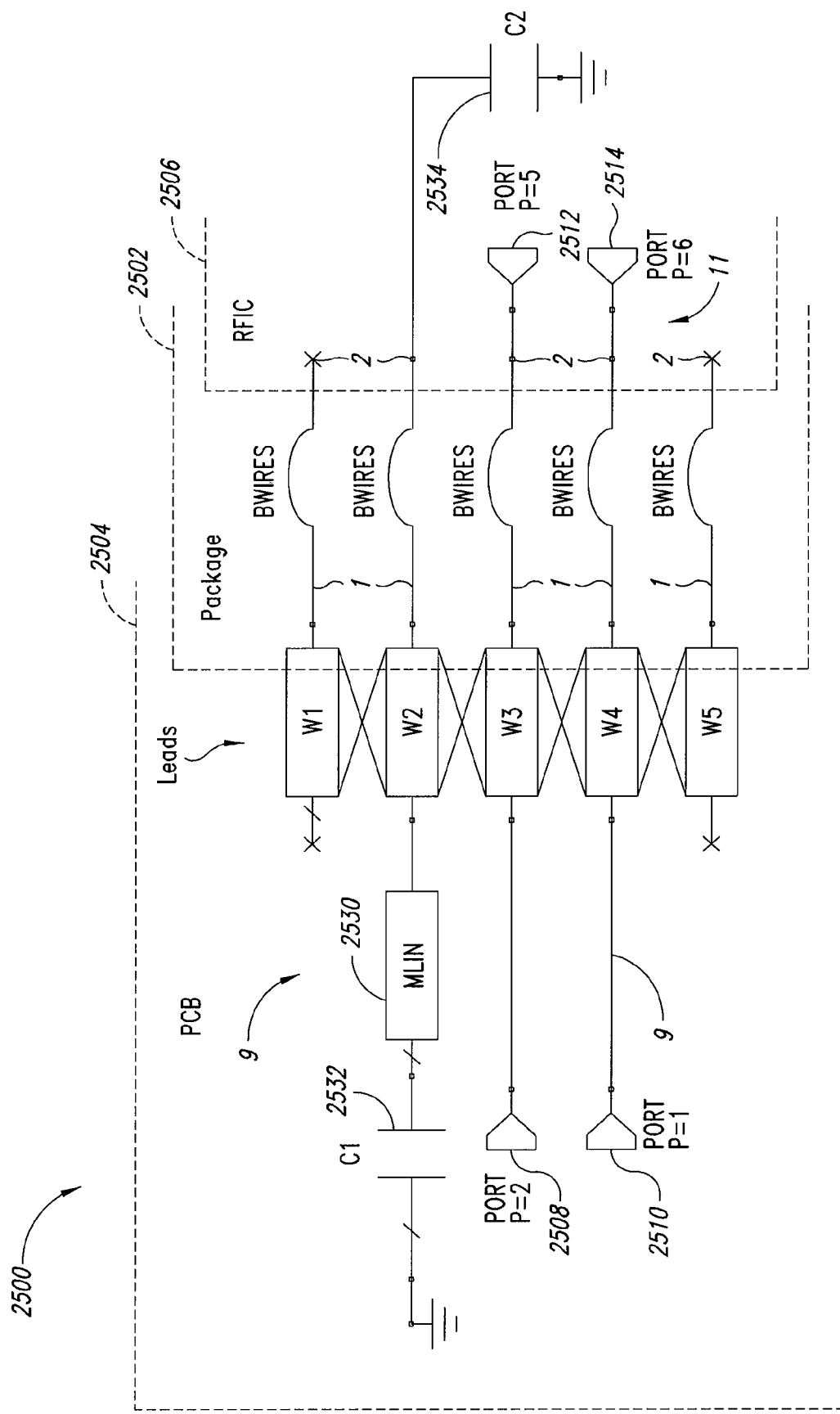
FIG. 25 is a functional block diagram of an embodiment of a system configured to isolate adjacent ports of an RFIC package.

FIG. 25 is a functional block diagram of an embodiment of system 2500 comprising an RFIC package 2502 mounted on a PCB board 2504. FIG. 25 shows only a portion of the system 2500 for ease of illustration. Additional components, such as additional packages and RFIC packages, may be mounted to the PCB 2504. The RFIC package 2502 comprises an RFIC chip 2506. The RFIC package 2502 may be a plastic package. As illustrated, the RFIC package 2502 has five package leads or pins W1-W5 configured to electrically couple the RFIC chip 2506 to the PCB 2504. The RFIC package 2502 may have additional leads. The five package leads W1-W5 are in a row, and as illustrated are uniformly spaced apart. The package leads W1-W5 are coupled to via bonding wires 1 to bonding pads 2 on the RFIC chip 2506. The bonding pads 2 are coupled to circuitry of the RFIC chip 2506.

The RFIC package 2502 may be coupled to the PCB 2504 using standard techniques. For example, the techniques discussed above with respect to FIG. 3 may be employed. The connections between the RFIC package 2502 and the PCB 2504 may include, for example, signal, biasing, power and control connections. The PCB 2504 typically has metal traces 9 that couple the connections between the RFIC package 2502 and the PCB 2504 to circuitry of the PCB 2504.

As illustrated, four ports 2508, 2510, 2512, 2514 are configured to carry RF signals between the PCB 2504 and the RFIC chip 2506 via adjacent package leads W3 and W4. The system 2500 may comprise additional ports and package leads configured to carry signals between the PCB 2504 and the RFIC chip 2506, including additional RF ports. The connections of package leads W1 and W5 to components (such as ports) of the PCB 2502 and of the RFIC chip 2506 are not shown for ease of illustration.

A first connection chain electrically couples port 1 2510 to port 6 2514 through a micro-strip line trace 9, package lead W4, a bond wire 1, a bond pad 2 and a micro-strip line trace 11. A second connection chain adjacent to the first connection chain electrically couples port 2 2508 to port 5 2512 through a micro-strip line trace 9, a package lead W3, a bond wire 1, a bond pad 2 and a micro-strip line trace 11. Electromagnetic coupling between port 1 2510 and port 2 2508 may arise through the PCB 2504, the package leads W1-W5, the bond wires 1, the bond pads 2 and the RFIC chip 2506, particularly in view of the small dimensions of the RFIC package 2502. Similarly, electromagnetic coupling between port 5 2512 and port 6 2514 may occur. A third connection chain includes a package lead W2 is placed near to the package lead W3 of the second chain, on the opposite side from the package lead W4 of the first chain, and is configured to reduce electromagnetic coupling between the adjacent ports of the first and second chains. For example, and as illustrated, the package lead W2 may be a neighboring lead on a side of the package lead W3 of the second chain opposite from the package lead W4 of the first chain. The package lead W2 is coupled through a short length of micro-strip line metal tracing MLIN 2530 to a first end of a capacitor C1 2532 on the PCB 2504. The micro-strip line metal tracing MLIN 2530 has a length and a width. The other end of the capacitor C1 2532 is coupled to a reference voltage. As illustrated, the reference voltage is a radio frequency ground. Package lead W2 also is coupled through a short length of wire to a first end of a capacitor C2 2534 on the RFIC chip 2506. The other end of the capacitor C2 2534 is coupled to a reference voltage on the RFIC chip 2506. As illustrated, the reference voltage is a radio frequency ground on the RFIC chip 2506. The values of the capacitors C1 2532 and C2 2534, and the length and width of the micro-strip line metal tracing MLIN 2530 may be selected so as to minimize coupling between the adjacent RF ports 1, 2, 5 and 6 at frequencies of interest. For example, and as discussed in more detail below, the values for desired operational frequencies or frequency ranges may be selected using electromagnetic or simplified circuit simulation. For example, physical models or modeling programs may be employed to select the values for the length and width of the micro-strip line metal tracing MLIN 2530 and for the capacitances of the capacitors C1 2532 and C2 2534.

For a given configuration, there will typically be optimum capacitance values for obtaining maximum isolation at a given frequency. In addition, selecting the capacitance values improving isolation at a selected frequency will generally improve isolation for frequencies higher than the selected frequency in a frequency range. For a given frequency and configuration, a capacitance above a selected value will result in improved isolation as compared to a 50 Ohm loaded or a grounded configuration. In an embodiment, the isolation may be improved over the embodiment of FIG. 23 by 5 dB at high frequencies and by 10 dB or more over a wide frequency range as compared to the grounding configuration of FIG. 9. In some embodiments, the capacitances for the capacitors C1 2532 and C2 2534 will be the same. For example, both capacitors may have a capacitance of 1.8 pF. The capacitances may also be different. For example, C1 may have a capacitance of 0.85 pF while C2 has a capacitance of 1.8 pF. In an embodiment, a maximum isolation for a particular frequency may generally be obtained by selecting a capacitance value for C1 2532 and C2 2534 that is twice the value selected for the capacitor of the embodiment of FIG. 23 to obtain a maximum isolation for a selected frequency.

Figure 26:
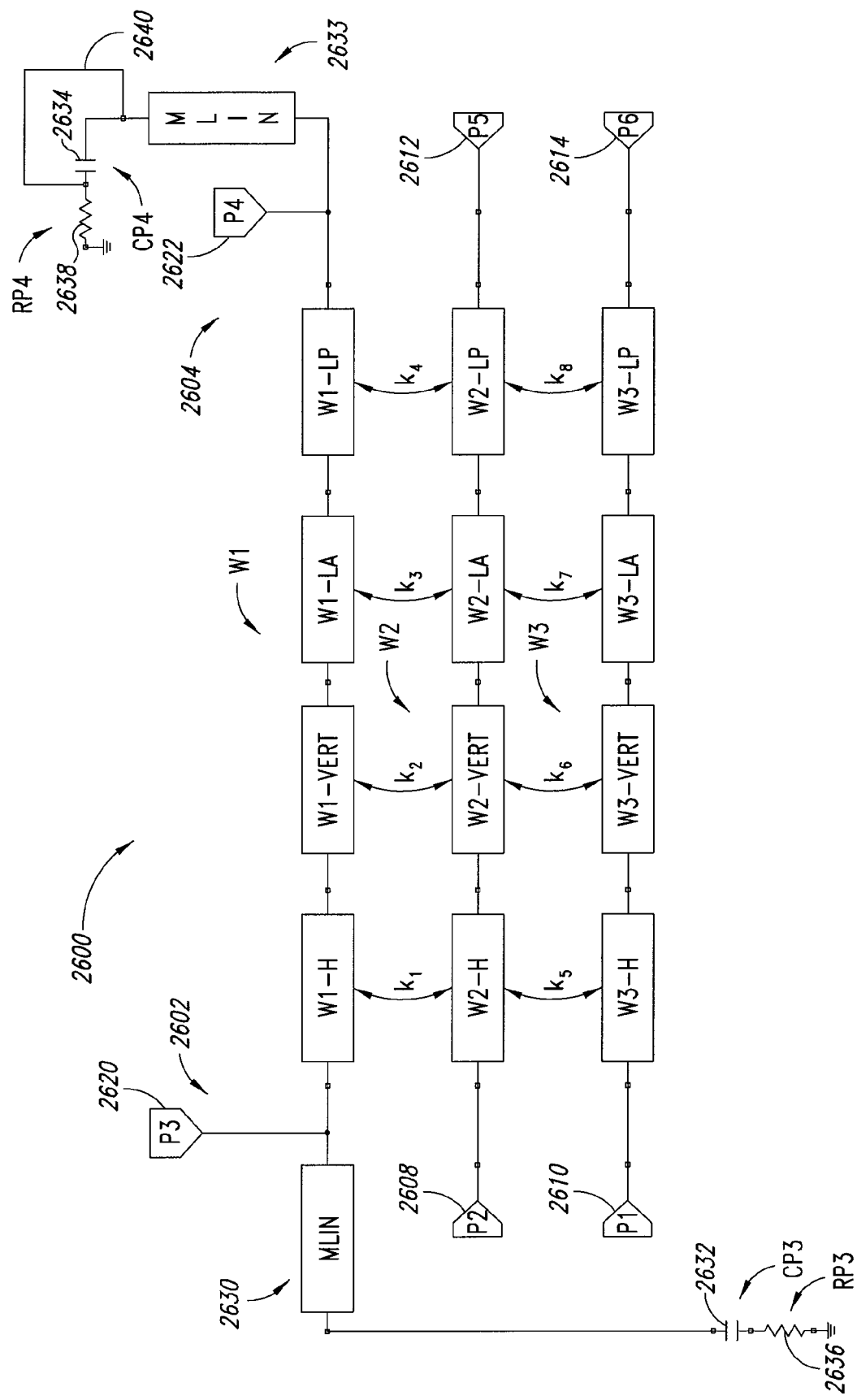
FIG. 26 is functional block diagram of a model of an embodiment of a system configured to isolate adjacent ports of an RFIC package.

FIG. 26 is a functional block diagram illustrating an embodiment of a model 2600 of a system configured to reduce electromagnetic coupling between adjacent ports coupling a PCB 2602 to an RFIC chip 2604 by changing the electro-magnetic field distribution in the area of coupled package leads W1-W3. The model 2600 may be used, for example, to model the embodiment of FIG. 25 to facilitate selection of the width and length of the micro-strip line MLIN 2530 and the capacitances of the capacitors C1 2532 and C2 2534 of FIG. 25.

As illustrated in FIG. 26, port 2 2608 is electrically coupled to port 5 2612 through package lead W2, port 3 2620 is electrically coupled to port 4 2622 through package lead W1, and port 1 2610 is electrically coupled to port 6 2614 through package lead W3. Ports 2 and 5 may be loaded with an input impedance of, for example, 50 Ohms. Ports 1 and 6 may be loaded with an input impedance of, for example, 50 Ohms. Optional ports 3 and 4 may be loaded with, for example, a high input impedance, and may be used for signal monitoring. Other input impedances may be employed.

The package leads W1-W3 electrically coupling the ports may be modeled as separate segments. The modeling of the package leads described with respect to FIG. 5 above, for example, may be employed. The doubled sided arrows $k_1$ through $k_8$, show coupling between the parts of the chains, and can be modeled as coupling coefficients. A micro-strip line trace 2630 having a length L and a width w couples the package lead W1 to a capacitor CP3 2632 on the PCB 2602, and is modeled with an associated parasitic resistance RP3 2636 coupled in series between the capacitor CP3 2632 and a radio frequency ground on the PCB 2602. A short wire or line, modeled as a micro-strip line trace 2633 couples the package lead W1 to a capacitor CP4 2634 on the RFIC chip 2604, and is modeled with an associated parasitic resistance RP4 2638 coupled in series between the capacitor CP4 2634 and a radio frequency ground on the RFIC chip 2604. The length and width of the micro-strip line trace on the RFIC chip may differ from the length and width of the micro-strip line trace on the PCB.

Some embodiments may include an optional shunt, such as the optional shunt 2640 in FIG. 26 across the capacitor CP4 2634, such as when an RFIC chip DC pass to an external ground is needed. The use of an optional shunt, may impact the selected capacitances. For example, with reference to an embodiment of FIG. 26, maximum isolation may be obtained at a selected frequency when the respective capacitances of CP3 and CP4 are equal when no optional shunt is present (for example, when both capacitances are 1.8 pF in an embodiment). When a shunt is present, the maximum isolation at the selected frequency may occur when the capacitance of CP4 is approximately twice the capacitance of CP3 (for example, when CP3 has a capacitance of 0.85 pF and CP4 has a capacitance of 1.8 pF in an embodiment).

Figure 27:
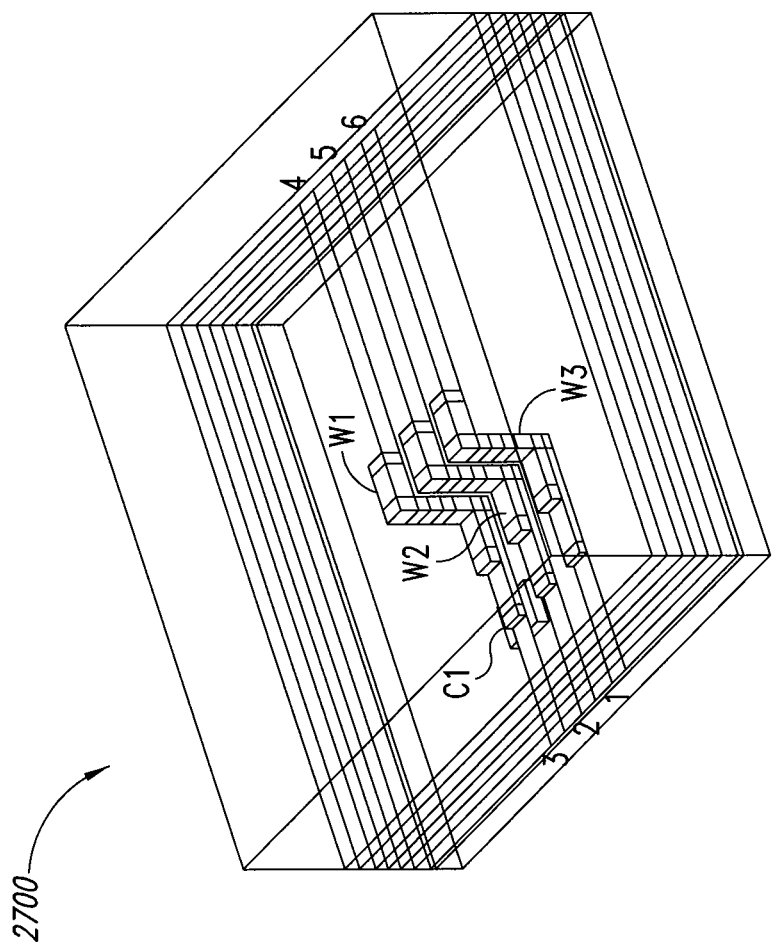
FIG. 27 is an isometric projection of an embodiment of a structural model of a multi-pin lead frame package mounted on a PCB board with increased isolation between adjacent package pins due to grounded pin.

FIG. 27 illustrates a physical model 2700 that may be used to determine the value of a capacitance C1 which maximizes isolation between ports in, for example, the embodiment of FIG. 23. The model comprises three package leads W1-W3 coupling ports 1-3 of a PCB to ports 4-6 of an RFIC chip. A capacitor C1 is coupled between a micro-strip line coupled to package lead W1 and a ground of the PCB. The capacitor is coupled to the micro-strip line near the connection of the package lead W1 to the PCB, and may, as illustrated, be in the PCB.

FIGS. 28 through 32 graphically illustrate example results of modeling the isolation between two ports for different configurations.

Figure 28:
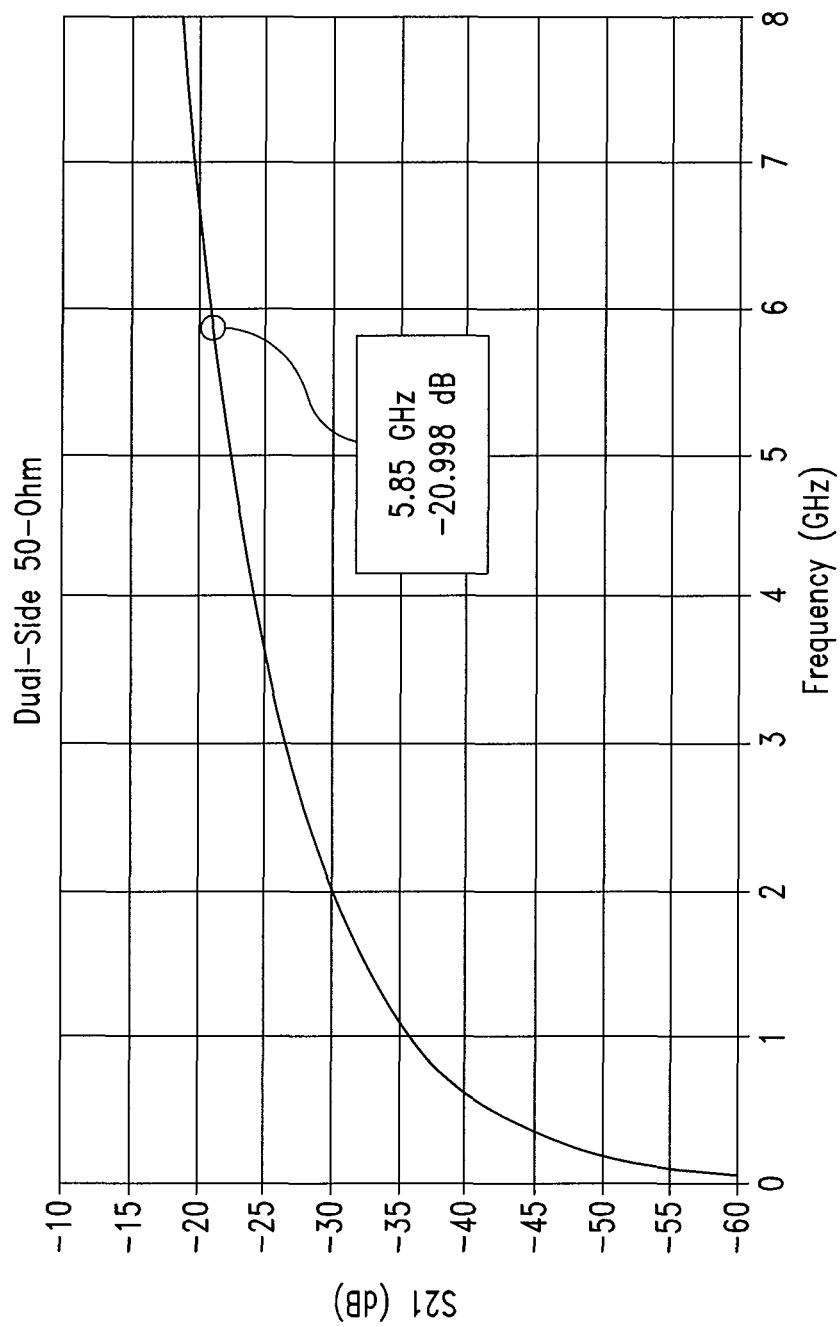
FIGS. 28 through 36 are graphical illustrations of the isolation of adjacent and non-adjacent ports of selected configurations of an RFIC package coupled to a PCB.

FIG. 28 shows the isolation S21 between the two adjacent ports under consideration against the operation frequency when the ports under consideration (see ports 2 and 1 of FIG. 5) are loaded at 50 Ohms and the package lead of a port adjacent to the ports under consideration is also loaded at 50 Ohms. At 5.85 GHz, the isolation is −20.998 dB.

Figure 29:
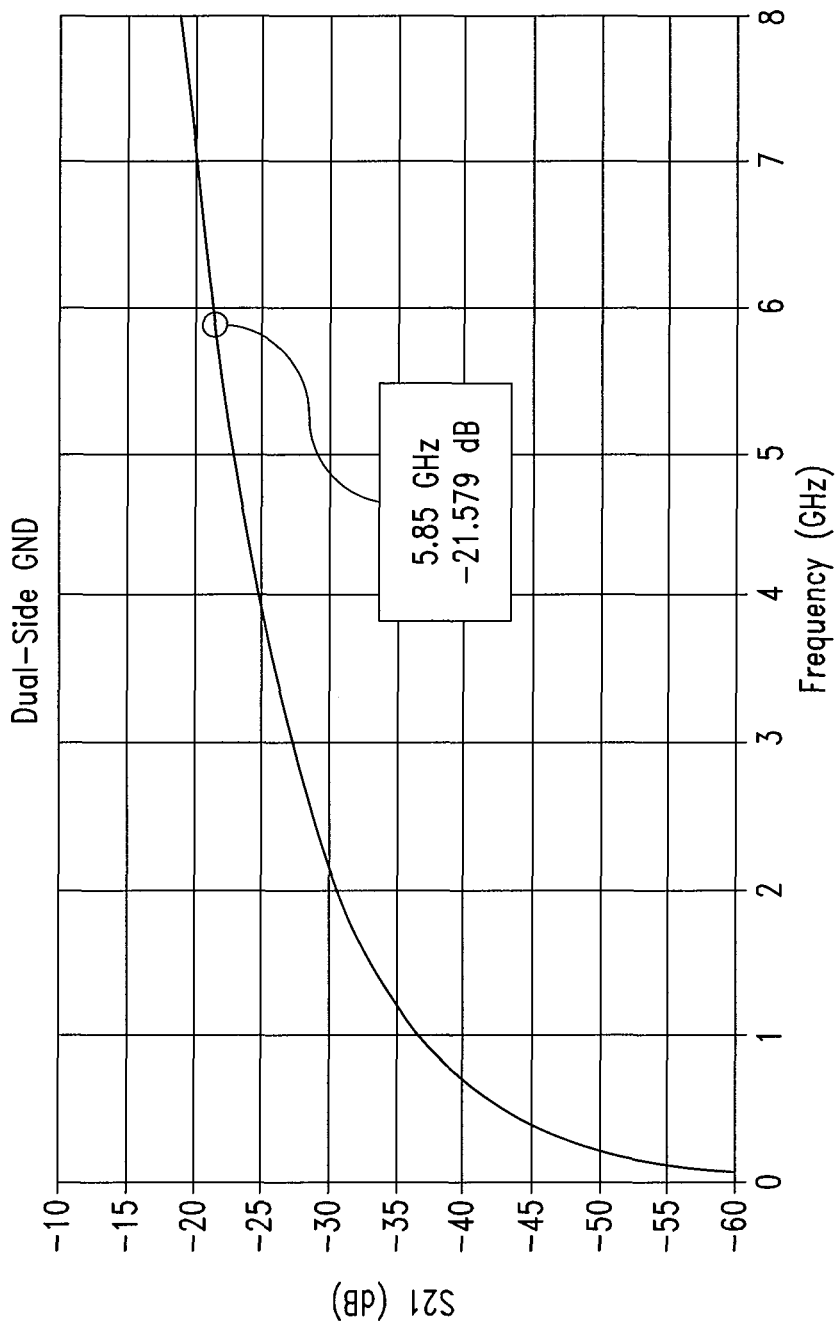

FIG. 29 shows the isolation S21 between two adjacent ports under consideration (see ports 2 and 1 of FIG. 5) are loaded at 50 Ohms and ports adjacent to one of the ports under consideration (see ports 3 and 4 of FIG. 5) are coupled to a radio frequency ground on the PCB board and to a radio frequency ground on the RFIC chip. At 5.85 GHz, the isolation is −21.579 dB.

Figure 30:
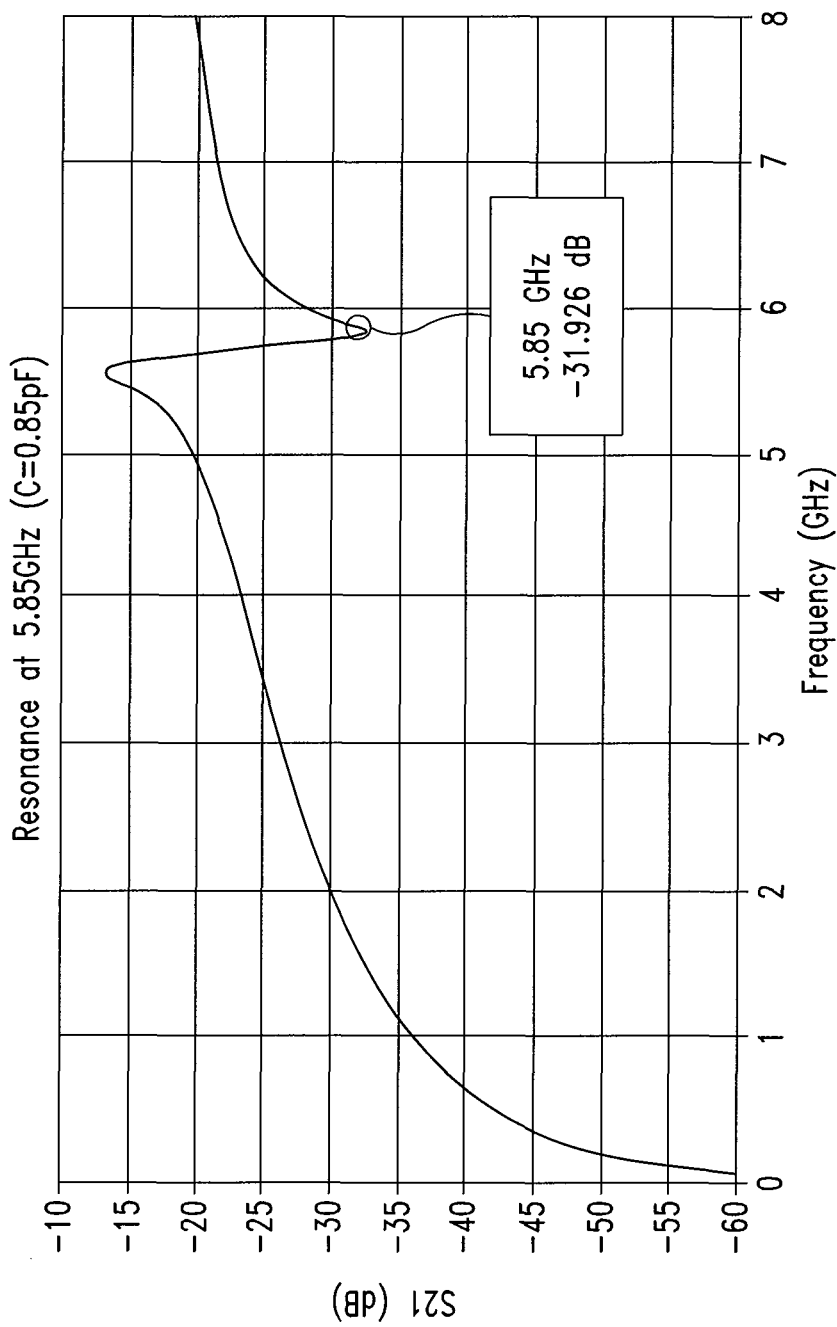

FIG. 30 shows the isolation S21 obtained from the embodiment of FIG. 24 with PCB side capacitor configuration. As modeled, all of the segments of the package leads have a width of 0.3 mm, the horizontal segments W1-H, W2-H, W3-H have a length of 0.8 mm, the vertical segments W1-VERT, W2-VERT, W3-VERT a length of 0.7 mm, the air-exposed horizontal segments W1-A, W2-A, W3-A have a length of 0.2 mm, and the encased segments W1-P, W2-P, W3-P have a length of 0.4 mm. As modeled, the separation between adjacent package leads is 0.3 mm and ports 1, 2, 5 and 6 are externally loaded at 50 Ohms. The capacitance of the capacitor 2432 is 0.85 pF. At 5.85 GHz, the isolation between the adjacent ports under consideration is −31.926 dB. At some frequencies, the isolation is degraded as compared to the 50 Ohm loaded model of FIG. 28 and a grounded model of FIG. 29.

Figure 31:
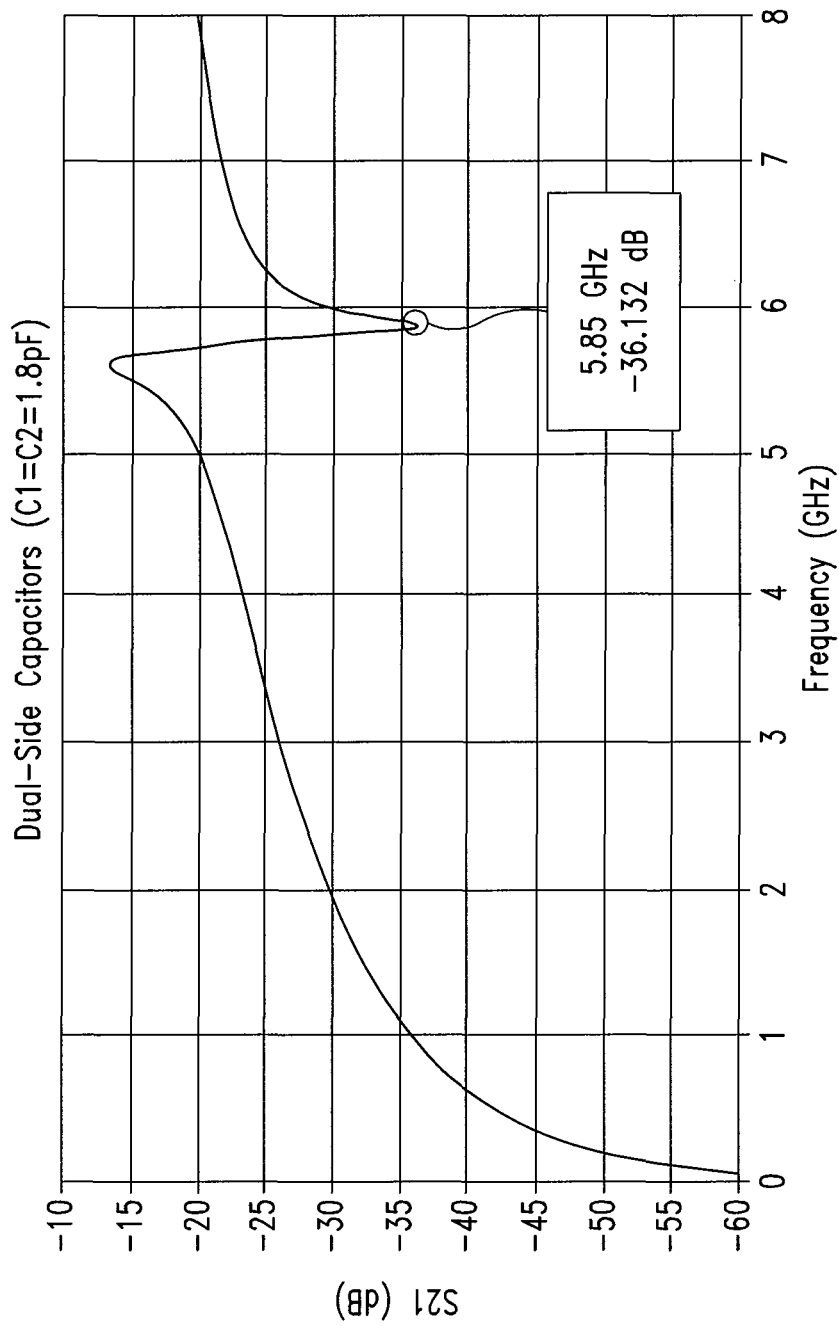

FIG. 31 shows the isolation S21 obtained from the embodiment of FIG. 26 with dual side capacitor configuration. As modeled, all of the segments of the package leads have a width of 0.3 mm, the horizontal segments W1-H, W2-H, W3-H have a length of 0.8 mm, the vertical segments W1-VERT, W2-VERT, W3-VERT a length of 0.7 mm, the air-exposed horizontal segments W1-A, W2-A, W3-A have a length of 0.2 mm, and the encased segments W1-P, W2-P, W3-P have a length of 0.4 mm. As modeled, the separation between adjacent package leads is 0.3 mm and ports 1, 2, 5 and 6 are externally loaded at 50 Ohms. The capacitance CP3 of the PCB capacitor 2632 is 1.8 pF. The capacitance CP4 of the RFIC capacitor 2634 is 1.8 pF. At 5.85 GHz, the isolation between the adjacent ports under consideration is −36.132 dB, with the package leads of the ports of interest separated by only 0.3 mm. To obtain an isolation of −36 dB at 5.85 GHz using physical positioning, package leads 2 and 1 would need to be substantially farther apart. At some frequencies, the isolation is degraded as compared to the 50 Ohm loaded model of FIG. 28, the grounded model of FIG. 29 and the PCB-side capacitor model of FIG. 30. At the frequency of interest, the improvement in isolation over grounding is approximately 15 dB, and the band over which isolation is increased in fairly wide. While the improvement in isolation for the embodiments of FIGS. 23 and 25 is not as high as the improvement for the embodiments of FIGS. 3 and 17, the package leads got the ports of interest are only 0.3 mm apart, instead of 0.9 mm apart.

Figure 32:
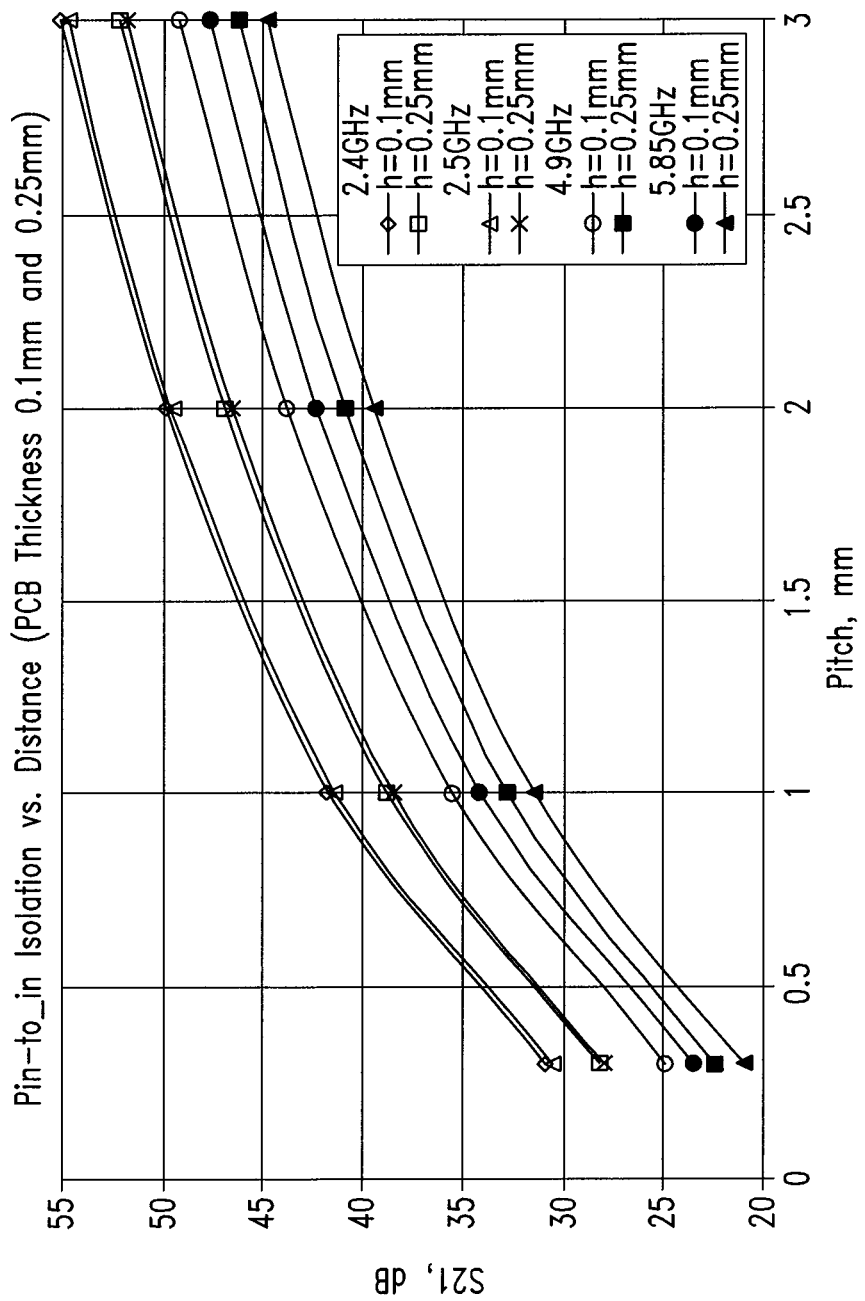

FIG. 32 compares isolation levels for adjacent ports against PCB thickness at various frequencies for an embodiment of the configuration shown in FIGS. 25 and 26. At higher frequencies, the thickness h of the PCB board has a slightly greater impact on the isolation.

Figure 33:
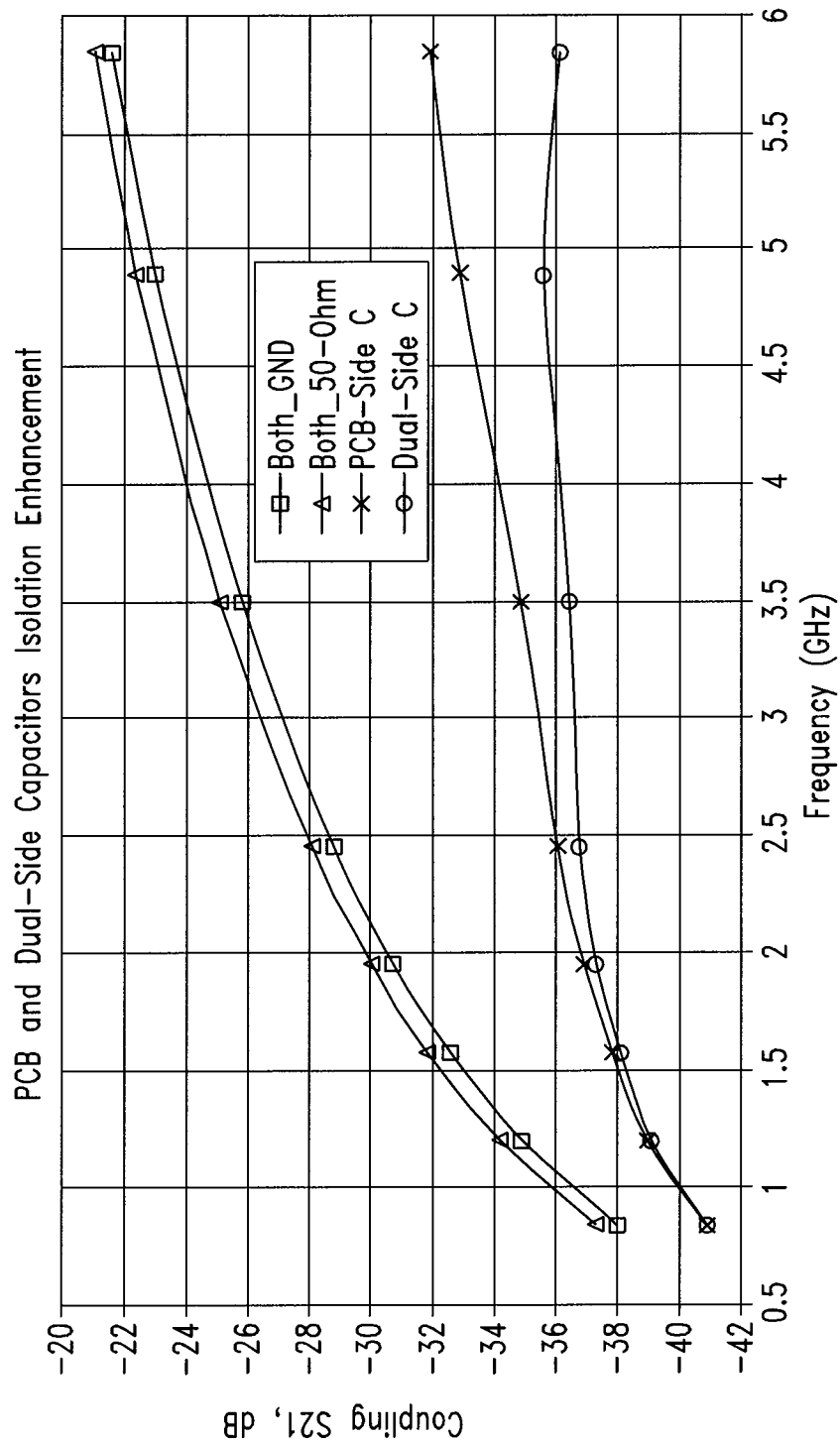

FIG. 33 compares isolation levels between adjacent ports S21 against frequency for a grounded configuration, a 50 Ohm configuration, a PCB-side configuration (see FIGS. 23 and 24), and a dual side configuration (See FIGS. 25 and 26), with the capacitances chosen to maximize isolation based on the models. Grounding a neighboring package lead produces almost no improvement, about 1 dB, while the configuration of FIG. 23 produces an improvement of about 4 dB to 11 dB, and the configuration of FIG. 25 produces an improvement over 50 Ohm loading of between approximately 4 dB and 15 dB. The improvement was greater at higher frequencies. In some embodiments, the capacitances may be selected so as to minimize isolation. The simplification used in modeling may impact the amount of isolation achieved in practice using selected micro-strip line trace and capacitance configurations. At 5.85 GHz, to achieve the same level of isolation as a PCB-side capacitor configuration (see FIG. 23), the adjacent package leads of the ports under consideration would need to be more than three times farther apart in a 50 Ohm loaded configuration (from 0.3 mm to over 1 mm). At 5.85 GHz, to achieve the same level of isolation as a dual-side capacitor configuration (see FIG. 25), the adjacent package leads of the ports under consideration would need to be five to six times farther apart in a 50 Ohm loaded configuration (from 0.3 mm to between 1.6 and 1.7 mm).

Figure 34:
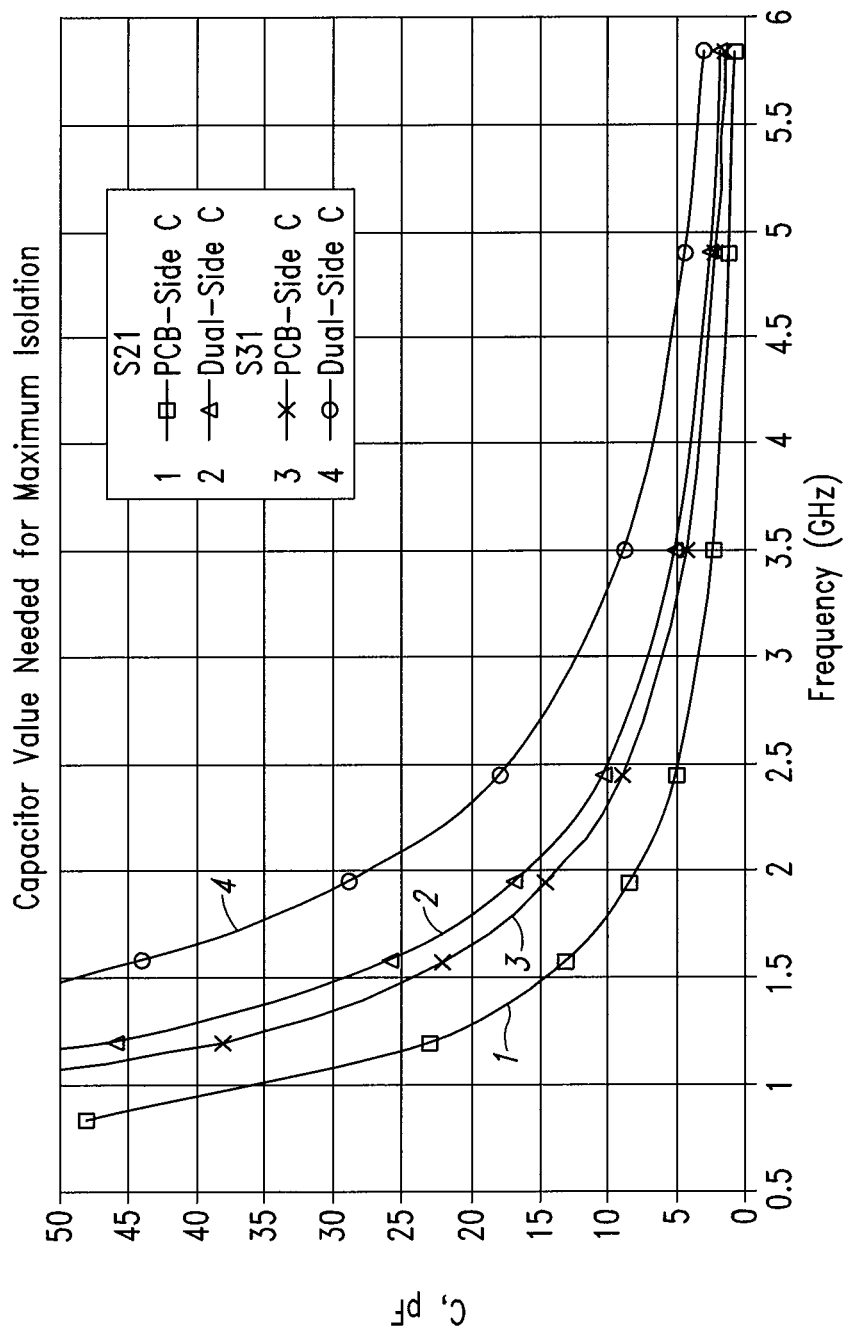

FIG. 34 graphs the capacitance value to obtain a maximum isolation based on models against frequency for four different configurations. A first line 1 corresponds to ports of interest coupled to adjacent package leads with a neighboring lead coupled to a radio-frequency ground through a capacitor on the PCB side and to a radio-frequency ground on the RFIC chip side (See FIGS. 23 and 24). A second line 2 corresponds to ports of interest coupled to adjacent package leads with a neighboring lead coupled to a radio-frequency ground through a capacitor on the PCB side and to a radio-frequency ground through a capacitor on the RFIC chip side (see FIGS. 25 and 26). A third line 3 corresponds to ports of interest coupled to package leads separated by a package lead coupled to a radio-frequency ground through a capacitor on the PCB side and to a radio-frequency ground on the RFIC chip side (See FIGS. 3 and 10). A fourth line 4 corresponds to ports of interest coupled to package leads separated by a package lead coupled to a radio-frequency ground through a capacitor on the PCB side and to a radio-frequency ground through a capacitor on the RFIC chip side (see FIGS. 17 and 18). As can be seen, the configuration impacts the selection of the capacitance values.

Figure 35:
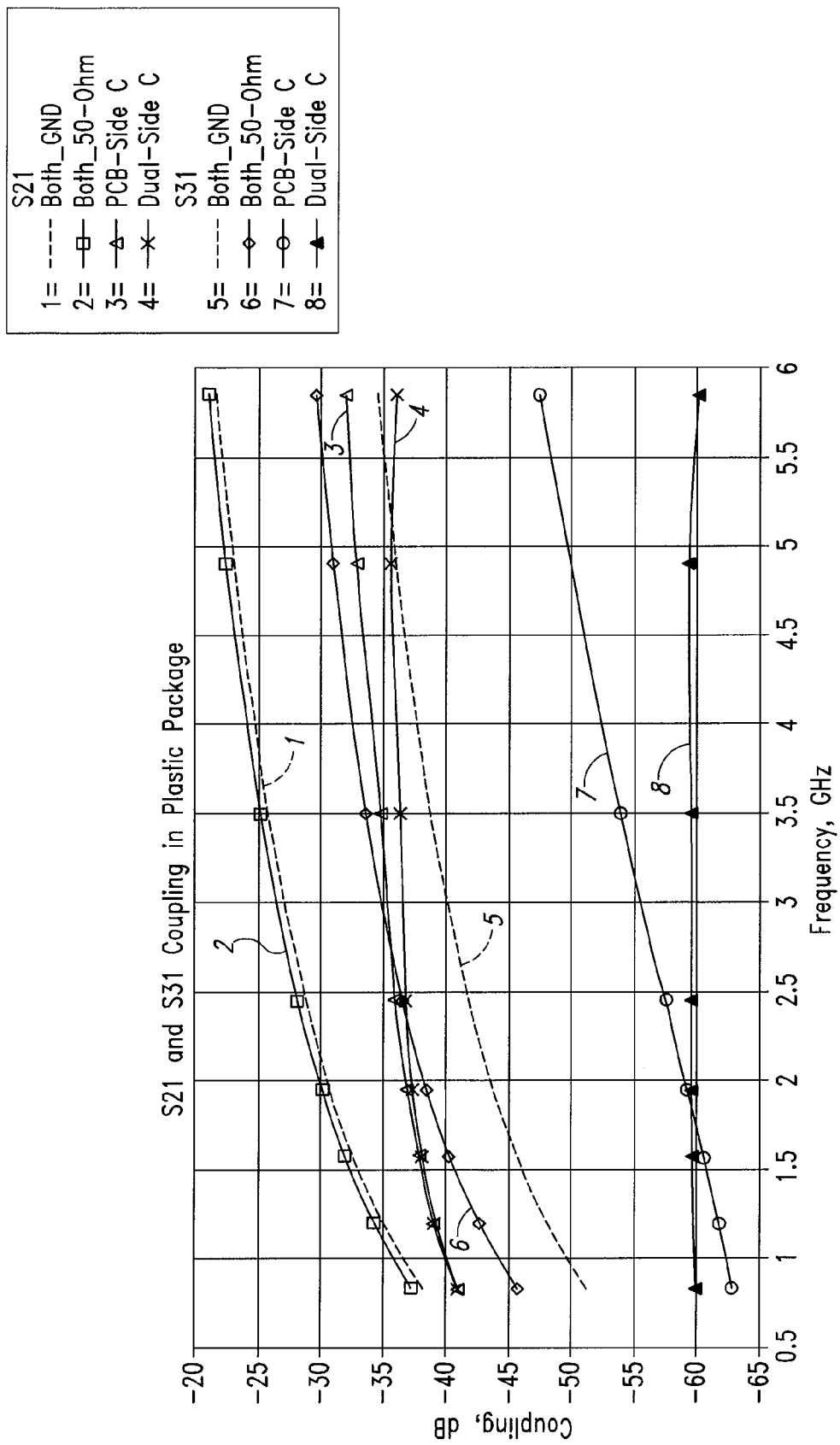

FIG. 35 graphically illustrates the isolation against frequency for various embodiments when an RFIC chip is encased in a plastic package, such as a SOT 363 package, and the package is mounted on a PCB. A first line 1 corresponds to RF ports of interest coupled to adjacent package leads with a neighboring package lead coupled to a RF ground on the PCB and on the RFIC chip. A second line 2 corresponds to RF ports of interest coupled to adjacent package leads with a neighboring package lead loaded at 50 Ohms. A third line 3 corresponds to RF ports of interest coupled to adjacent package leads with a neighboring lead coupled to a radio-frequency ground through a capacitor on the PCB side and to a radio-frequency ground on the RFIC chip side (See FIGS. 23 and 24). A fourth line 4 corresponds to RF ports of interest coupled to adjacent package leads with a neighboring lead coupled to a radio-frequency ground through a capacitor on the PCB side and to a radio-frequency ground through a capacitor on the RFIC chip side (see FIGS. 25 and 26). A fifth line 5 corresponds to RF ports of interest coupled to package leads separated by a package lead coupled to a RF ground on both the PCB side and the RFIC chip side (see FIG. 9). A sixth line 6 corresponds to RF ports of interest coupled to package leads separated by a package lead loaded at 50 Ohms. A seventh line 7 corresponds to RF ports of interest coupled to package leads separated by a package lead coupled to a radio-frequency ground through a capacitor on the PCB side and to a radio-frequency ground on the RFIC chip side (See FIGS. 3 and 10). A eighth line 8 corresponds to RF ports of interest coupled to package leads separated by a package lead coupled to a radio-frequency ground through a capacitor on the PCB side and to a radio-frequency ground through a capacitor on the RFIC chip side (see FIGS. 17 and 18).

Figure 36:
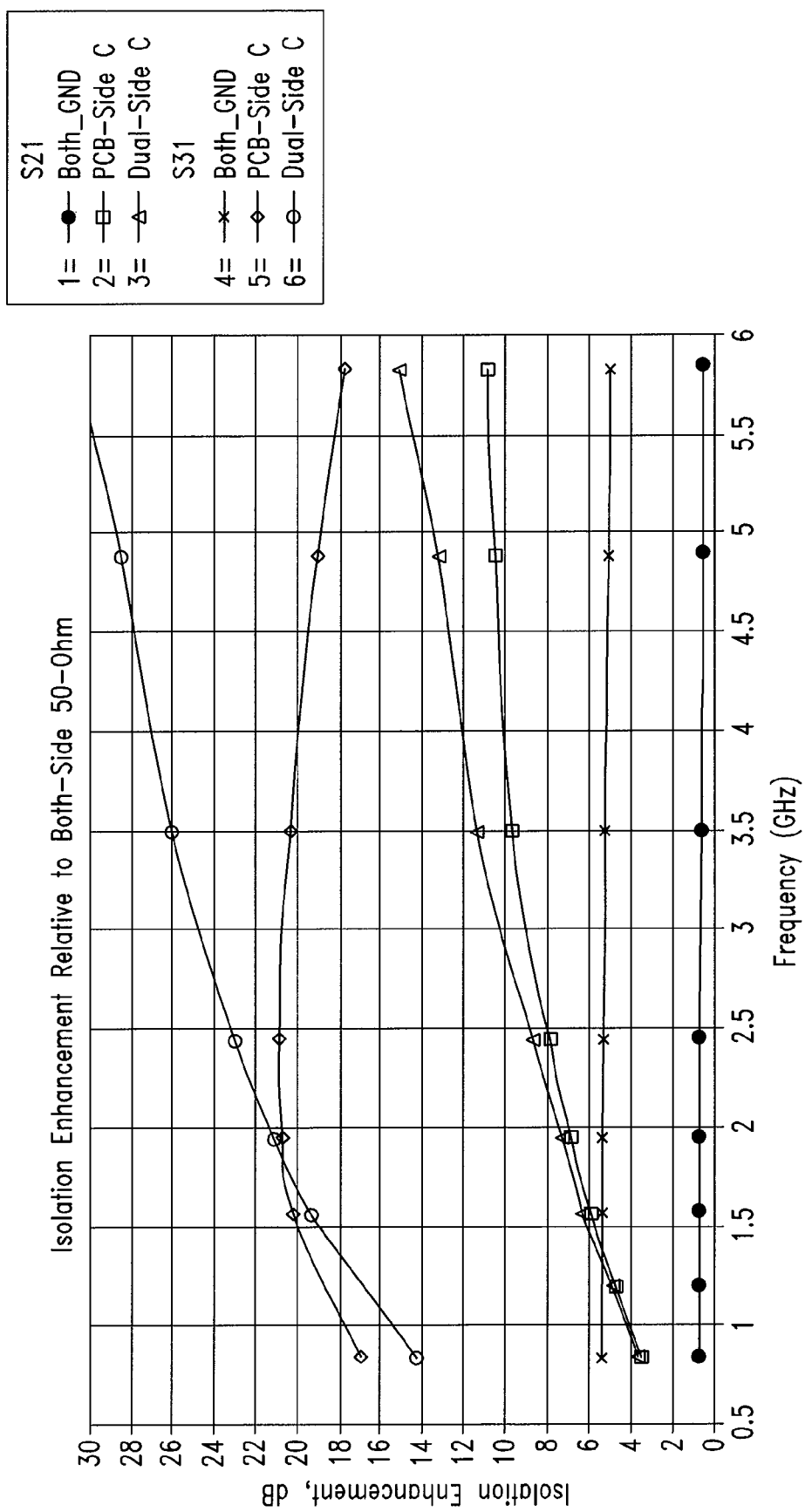

FIG. 36 graphically illustrates the isolation enhancement in decibels against frequency of various configurations of embodiments as compared to a configuration in which all ports are loaded at 50 Ohms. A first line 1 corresponds to the isolation enhancement S21 for RF ports of interest coupled to adjacent package leads with a neighboring package lead coupled to a RF ground on the PCB and on the RFIC chip. A second line 2 corresponds to the isolation enhancement S21 for RF ports of interest coupled to adjacent package leads with a neighboring lead coupled to a radio-frequency ground through a capacitor on the PCB side and to a radio-frequency ground on the RFIC chip side (See FIGS. 23 and 24). A third line 3 corresponds to the isolation enhancement S21 for RF ports of interest coupled to adjacent package leads with a neighboring lead coupled to a radio-frequency ground through a capacitor on the PCB side and to a radio-frequency ground through a capacitor on the RFIC chip side (see FIGS. 25 and 26). A fourth line 4 corresponds to the isolation enhancement S31 for RF ports of interest coupled to package leads separated by a package lead coupled to a RF ground on both the PCB side and the RFIC chip side (see FIG. 9). A fifth line 5 corresponds to the isolation enhancement S31 for RF ports of interest coupled to package leads separated by a package lead coupled to a radio-frequency ground through a capacitor on the PCB side and to a radio-frequency ground on the RFIC chip side (See FIGS. 3 and 10). A sixth line 6 corresponds to the isolation enhancement S31 for RF ports of interest coupled to package leads separated by a package lead coupled to a radio-frequency ground through a capacitor on the PCB side and to a radio-frequency ground through a capacitor on the RFIC chip side (see FIGS. 17 and 18). As can be seen, for the selected geometries the dual-side capacitor embodiments (see FIGS. 17, 18, 25 and 26) provide the greatest isolation for a wide frequency range above approximately 1.9 GHz.

Figure 37:
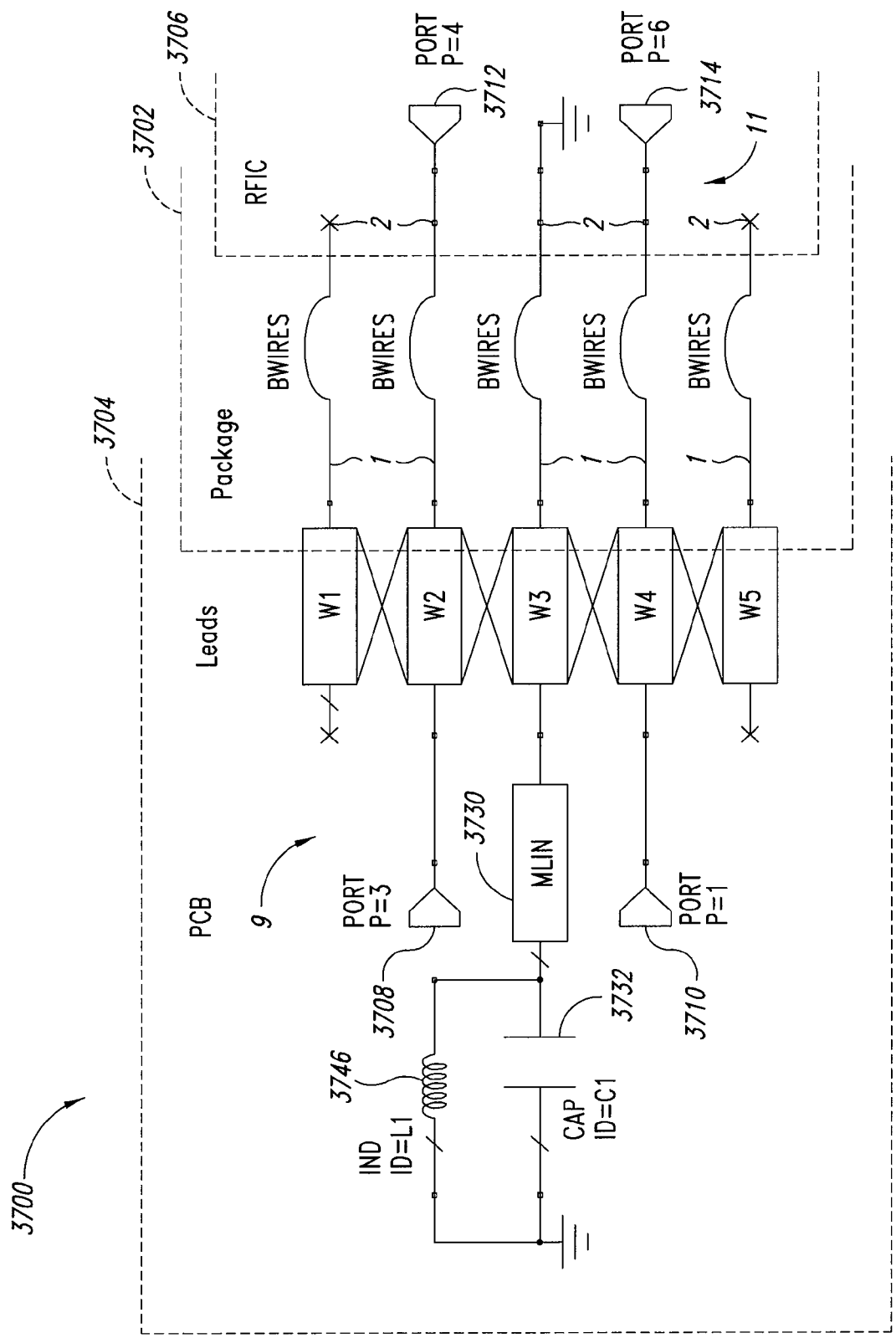
FIG. 37 is a functional block diagram of an embodiment of a system configured to isolate non-adjacent ports of an RFIC package.

FIG. 37 is a functional block diagram of an embodiment of system 3700 comprising an RFIC package 3702 mounted on a PCB board 3704. FIG. 37 shows only a portion of the system 3700 for ease of illustration. Additional components, such as additional packages and RFIC packages, may be mounted to the PCB 3704. The RFIC package 3702 comprises an RFIC chip 3706. The RFIC package may be a plastic package. As illustrated, the RFIC package 3702 has five package leads or pins W1-W5 configured to electrically couple the RFIC chip 3706 to the PCB 3704. The RFIC package may have additional leads. The five package leads W1-W5 are in a row, and as illustrated are uniformly spaced apart. The package leads W1-W5 are coupled to via bonding wires 1 to bonding pads 2 on the RFIC chip 3706. The bonding pads 2 are coupled to circuitry of the RFIC chip 3706.

The RFIC package 3702 may be coupled to the PCB 3704 using standard techniques, such as those discussed above with regard to FIG. 3. The connections between the RFIC package 3702 and the PCB 3704 may include, for example, signal, biasing, power and control connections. The PCB 3704 typically has metal traces 9 that couple the connections between the RFIC package 3702 and the PCB 3704 to circuitry of the PCB 3704.

As illustrated, four ports 3708, 3710, 3712, 3714 are configured to carry RF signals between the PCB 3704 and the RFIC chip 3706 via non-adjacent package leads W2 and W4. The system 3700 may comprise additional ports and package leads configured to carry signals between the PCB 3704 and the RFIC chip 3706, including additional RF ports. The connections of package leads W1 and W5 to components (such as ports) of the PCB 3702 and of the RFIC chip 3706 are not shown for ease of illustration.

A first connection chain electrically couples port 1 3710 to port 6 3714 through micro-strip line trace 9, package lead W4, a bond wire 1, a bond pad 2 and a micro-strip line trace 11. A second connection chain electrically couples port 3 3708 to port 4 3712 through a micro-strip line trace 9, a package lead W2, a bond wire 1, a bond pad 2 and a micro-strip line trace 11. Electromagnetic coupling between port 1 3710 and port 3 3708 may arise through the PCB 3704, the package leads W1-W5, the bond wires 1, the bond pads 2 and the RFIC chip 3706, particularly in view of the small dimensions of the RFIC package 3702. Similarly, electromagnetic coupling between port 4 3712 and port 6 3714 may occur. To address this coupling, package lead W3 is placed between package lead W2 and package lead W4 and configured to reduce electromagnetic coupling between non-adjacent ports. Package lead W3 is coupled through a short length of micro-strip line metal tracing MLIN 3730 to a first end of a capacitor C1 3732 on the PCB 3704. Package lead W3 also is coupled through the short length of micro-strip line metal tracing MLIN 3730 to a first end of an inductor L1 3746 on the PCB 3704. The micro-strip line metal tracing MLIN 3730 has a length L and a width w. The other ends of the capacitor C1 3732 and the inductor L1 3746 are coupled to a reference voltage on the PCB 3704. As illustrated, the reference voltage is a radio frequency ground. The other end of package lead W3 is coupled to a reference voltage on the RFIC chip 3706. As illustrated, the reference voltage is a radio frequency ground on the RFIC chip 3706. The values of the capacitor C1 3732 and the inductor L1 3746, and the length and width of the micro-strip line metal tracing MLIN 3730 may be selected so as to minimize coupling between ports 1 and 3 and 4 and 6 at frequencies of interest. For example, and as discussed in more detail below, the values for desired operational frequencies or frequency ranges may be selected using electromagnetic or simplified circuit simulation. For example, physical models or modeling programs may be employed to select the values for the length and width of the micro-strip line metal tracing MLIN 3730 and for the capacitance of the capacitor C1 3732 and the inductance of the inductor L1 3746.

For a given configuration, there will typically be optimum capacitance and inductance values for obtaining maximum isolation at a given frequency. In addition, selecting the capacitance values improving isolation at a selected frequency will generally improve isolation for frequencies higher than the selected frequency in a frequency range. For a given frequency and configuration, a capacitance above a selected value will result in improved isolation as compared to a 50 Ohm loaded or a grounded configuration. In an embodiment, the isolation may be improved over conventional grounding of the package lead W3 by as much as 10 dB over a wide frequency range.

In an embodiment, an optimum capacitance value for the capacitor C1 3732 may be selected based on a simplified model omitting the inductor L1 3746. Then an optimum inductance for the inductor L1 3746 may be selected based on the selected capacitance value. The process may be iterative. In an embodiment, the choice of an inductance above a certain level will result in improved isolation at a fixed frequency. In an embodiment, a capacitance at an optimizing level and an inductance above a selected level for a selected frequency will result in improved isolation at all frequencies above the selected frequency. The isolation of embodiments of FIG. 37 may be similar to that of embodiments of FIG. 3 for comparable configurations and operational frequencies.

Figure 38:
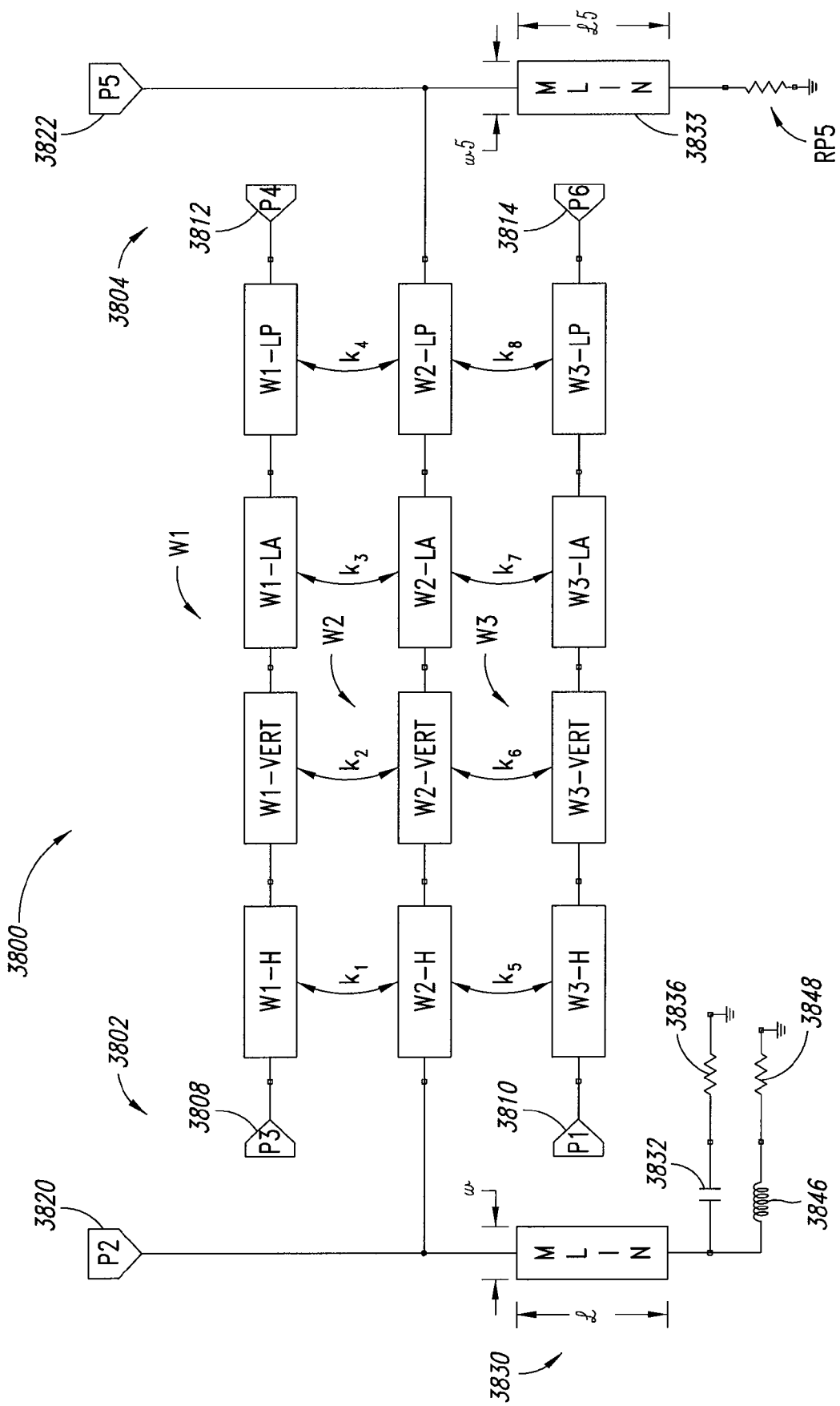
FIG. 38 is functional block diagram of an embodiment of a model of a system configured to isolate non-adjacent ports of an RFIC package.

FIG. 38 is a functional block diagram illustrating an embodiment of a model 3800 of a system configured to reduce electromagnetic coupling between non-adjacent ports coupling a PCB 3802 to an RFIC chip 3804 by changing the electro-magnetic field distribution in the area of coupled package leads W1-W3. The model 3800 may be used, for example, to model the embodiment of FIG. 37 to facilitate selection of the width and length of the micro-strip line MLIN 3730, the capacitance of the capacitor C1 3732 and the inductance of the inductor L1 3746 of FIG. 37. The model 3800 may be used in conjunction with the model 1000 of FIG. 10. For example, an optimum capacitance value may be selected using the model 1000 of FIG. 10, and then an optimum inductance value may be selected using the model 3800 of FIG. 38.

As illustrated in FIG. 38, port 3 3808 is electrically coupled to port 4 3812 through package lead W1, port 2 3820 is electrically coupled to port 5 3822 through package lead W2, and port 1 3810 is electrically coupled to port 6 3814 through package lead W3. Ports 3 and 4 may be loaded with an input impedance of, for example, 50 Ohms. Ports 1 and 6 may be loaded with an input impedance of, for example, 50 Ohms. Optional ports 2 and 5 may be loaded with, for example, a high input impedance, and may be used for signal monitoring. Other input impedances may be employed.

The package leads W1-W3 electrically coupling the ports may be modeled as separate segments. The modeling of the package leads described with respect to FIG. 5 above, for example, may be employed. The doubled sided arrows $k_1$ through $k_8$, show coupling between the parts of the chains, and can be modeled as coupling coefficients. A micro-strip line trace 3830 having a length L and a width w couples the package lead W2 to a capacitor C1 3832 on the PCB 3802, and is modeled with an associated parasitic resistance RC1 3836 coupled in series between the capacitor C1 3832 and a radio frequency ground on the PCB 3802. The micro-strip line trace 3830 couples the package lead W2 to an inductor L1 3846 on the PCB 3802, and is modeled with an associated parasitic resistance RL1 3848 coupled in series between the inductor L1 3846 and the radio frequency ground on the PCB 3802. A short wire or line, modeled as a micro-strip line trace 3833 and associated parasitic resistance R5, couples the package lead W2 to a radio frequency ground on the RFIC 3804. The length and width of the micro-strip line trace on the RFIC chip may differ from the length and width of the micro-strip line trace on the PCB.

Figure 39:
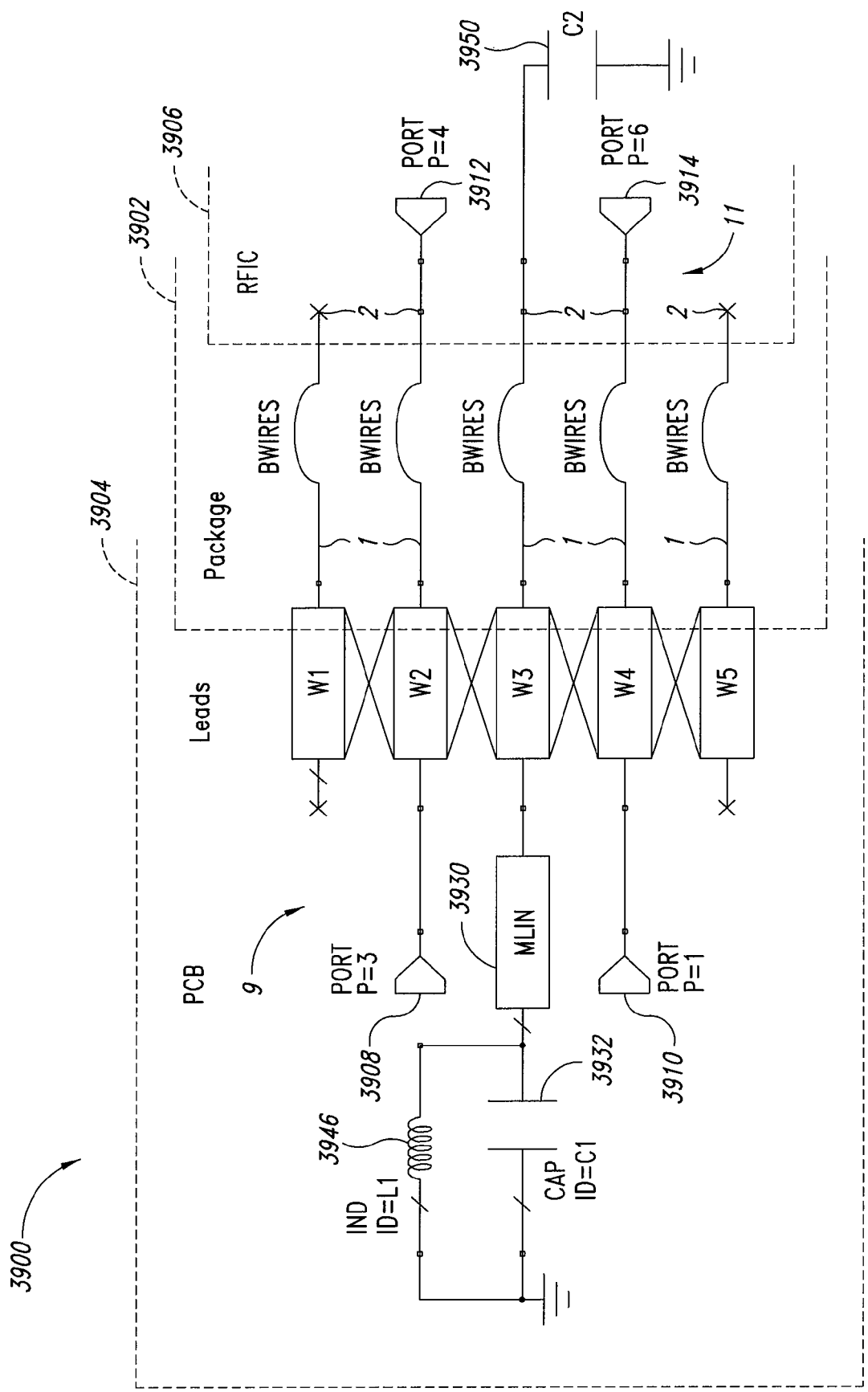
FIG. 39 is a functional block diagram of an embodiment of a system configured to isolate non-adjacent ports of an RFIC package.

FIG. 39 is a functional block diagram of an embodiment of system 3900 comprising an RFIC package 3902 mounted on a PCB board 3904. FIG. 39 shows only a portion of the system 3900 for ease of illustration. Additional components, such as additional packages and RFIC packages, may be mounted to the PCB 3904. The RFIC package 3902 comprises an RFIC chip 3906. The RFIC package may be a plastic package. As illustrated, the RFIC package 3902 has five package leads or pins W1-W5 configured to electrically couple the RFIC chip 3906 to the PCB 3904. The RFIC package may have additional leads. The five package leads W1-W5 are in a row, and as illustrated are uniformly spaced apart. The package leads W1-W5 are coupled to via bonding wires 1 to bonding pads 2 on the RFIC chip 3906. The bonding pads 2 are coupled to circuitry of the RFIC chip 3906.

The RFIC package 3902 may be coupled to the PCB 3904 using standard techniques, such as those discussed above with regard to FIG. 3. The connections between the RFIC package 3902 and the PCB 3904 may include, for example, signal, biasing, power and control connections. The PCB 3904 typically has micro-strip line metal traces 9 that couple the connections between the RFIC package 3902 and the PCB 3904 to circuitry of the PCB 3904.

As illustrated, four ports 3908, 3910, 3912, 3914 are configured to carry RF signals between the PCB 3904 and the RFIC chip 3906 via non-adjacent package leads W2 and W4. The system 3900 may comprise additional ports and package leads configured to carry signals between the PCB 3904 and the RFIC chip 3906, including additional RF ports. The connections of package leads W1 and W5 to components (such as ports) of the PCB 3902 and of the RFIC chip 3906 are not shown for ease of illustration.

A first connection chain electrically couples port 1 3910 to port 6 3914 through micro-strip line trace 9, package lead W4, a bond wire 1, a bond pad 2 and a micro-strip line trace 11. A second connection chain electrically couples port 3 3908 to port 4 3912 through a micro-strip line trace 9, a package lead W2, a bond wire 1, a bond pad 2 and a micro-strip line trace 11. Electromagnetic coupling between port 1 3910 and port 3 3908 may arise through the PCB 3904, the package leads W1-W5, the bond wires 1, the bond pads 2 and the RFIC chip 3906, particularly in view of the small dimensions of the RFIC package 3902. Similarly, electromagnetic coupling between port 4 3912 and port 6 3914 may occur. To address this coupling, package lead W3 is placed between package lead W2 and package lead W4 and configured to reduce electromagnetic coupling between non-adjacent ports. Package lead W3 is coupled through a short length of micro-strip line metal tracing MLIN 3930 to a first end of a capacitor C1 3932 on the PCB 3904. Package lead W3 also is coupled through the short length of micro-strip line metal tracing MLIN 3930 to a first end of an inductor L1 3946 on the PCB 3704. The metal tracing MLIN 3930 has a length L and a width w. The other ends of the capacitor C1 3932 and the inductor L1 3946 are coupled to a reference voltage on the PCB 3904. As illustrated, the reference voltage is a radio frequency ground. The other end of package lead W3 is coupled to a first end of a capacitor C2 3950 on the RFIC chip 3906. The other end of the capacitor C2 3950 is coupled to a reference voltage on the RFIC chip 3906. As illustrated, the reference voltage is a radio frequency ground on the RFIC chip 3906. In some embodiments, an optional shunt may be coupled across the capacitor C2 3950 (see shunt 2640 in FIG. 26). The values of the capacitors C1 3932 and C2 3950 and of the inductor L1 3946, and the length and width of the micro-strip line metal tracing MLIN 3930 may be selected so as to minimize coupling between non-adjacent ports 1 and 3 and 4 and 6 at frequencies of interest. For example, and as discussed in more detail below, the values for desired operational frequencies or frequency ranges may be selected using electromagnetic or simplified circuit simulation. For example, physical models or modeling programs may be employed to select the values for the length and width of the micro-strip line metal tracing MLIN 3930 and for the capacitance of the capacitors C1 3932 and C2 3950 and the inductance of the inductor L1 3946.

For a given configuration, there will typically be optimum capacitance and inductance values for obtaining maximum isolation at a given frequency. In addition, selecting the capacitance values improving isolation at a selected frequency will generally improve isolation for frequencies higher than the selected frequency in a frequency range. For a given frequency and configuration, capacitance values above selected values will result in improved isolation as compared to a 50 Ohm loaded or a grounded configuration.

In an embodiment, optimum capacitance values for the capacitors C1 3932 and C2 3950 may be selected based on a simplified model omitting the inductor L1 3946. Then an optimum inductance for the inductor L1 3946 may be selected based on the selected capacitance values. The process may be iterative. In an embodiment, the choice of an inductance above a certain level will result in improved isolation at a fixed frequency. In an embodiment, capacitances at an optimizing level and an inductance above a selected level for a selected frequency will result in improved isolation at all frequencies above the selected frequency. The isolation of embodiments of FIG. 39 may be similar to that of embodiments of FIG. 17 for comparable dimensional configurations and operational frequencies.

Figure 40:
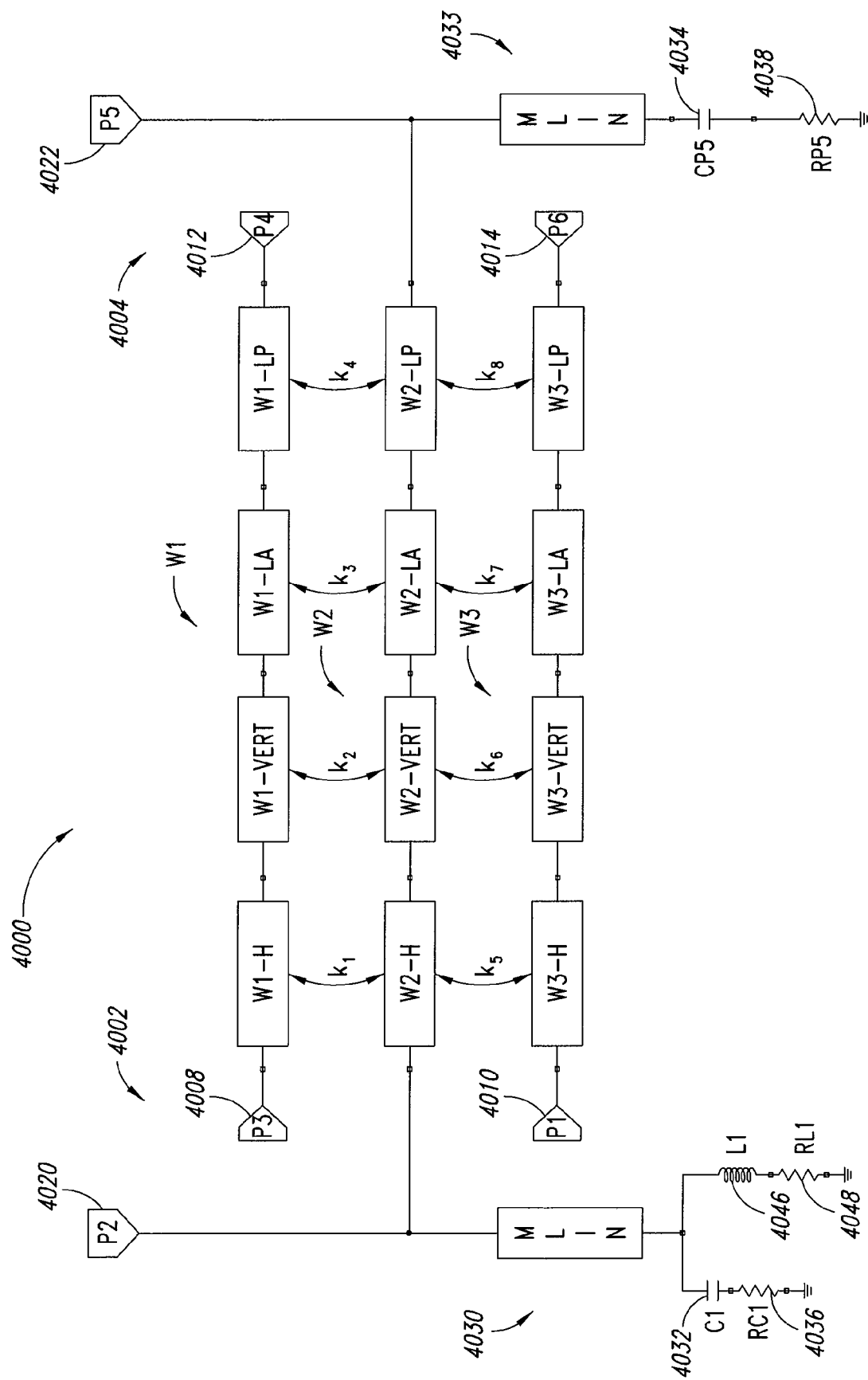
FIG. 40 is functional block diagram of an embodiment of a model of a system configured to isolate non-adjacent ports of an RFIC package.

FIG. 40 is a functional block diagram illustrating an embodiment of a model 4000 of a system configured to reduce electromagnetic coupling between non-adjacent ports coupling a PCB 4002 to an RFIC chip 4004 by changing the electro-magnetic field distribution in the area of coupled package leads W1-W3. The model 4000 may be used, for example, to model the embodiment of FIG. 39 to facilitate selection of the width and length of the micro-strip line MLIN 3930, the capacitance of the capacitors C1 3932 and C2 3950, and the inductance of the inductor L1 3946 of FIG. 39. The model 4000 may be used in conjunction with the model 1800 of FIG. 18. For example, optimum capacitance values may be selected using the model 1800 of FIG. 18, and then an optimum inductance value may be selected using the model 4000 of FIG. 40.

As illustrated in FIG. 40, port 3 4008 is electrically coupled to port 4 4012 through package lead W1, port 2 4020 is electrically coupled to port 5 4022 through package lead W2, and port 1 4010 is electrically coupled to port 6 4014 through package lead W3. Ports 3 and 4 may be loaded with an input impedance of, for example, 50 Ohms. Ports 1 and 6 may be loaded with an input impedance of, for example, 50 Ohms. Optional ports 2 and 5 may be loaded with, for example, a high input impedance, and may be used for signal monitoring. Other input impedances may be employed.

The package leads W1-W3 electrically coupling the ports may be modeled as separate segments. The modeling of the package leads described with respect to FIG. 5 above, for example, may be employed. The doubled sided arrows $k_1$ through $k_8$, show coupling between the parts of the chains, and can be modeled as coupling coefficients. A micro-strip line trace 4030 having a length L and a width w couples the package lead W2 to a capacitor C1 4032 on the PCB 4002, which is modeled with an associated parasitic resistance RC1 4036 coupled in series between the capacitor C1 4032 and a radio frequency ground on the PCB 4002. The micro-strip line trace 4030 couples the package lead W2 to an inductor L1 4046 on the PCB 4002, which is modeled with an associated parasitic resistance RL1 4048 coupled in series between the inductor L1 4046 and the radio frequency ground on the PCB 4002. A short wire or line, modeled as a micro-strip line trace 4033 couples the package lead W2 to a capacitor CP5 4034 on the RFIC chip 4004, and is modeled with an associated parasitic resistance RP5 4038 coupled in series between the capacitor CP5 4034 and a radio frequency ground on the RFIC 4004. The length and width of the micro-strip line trace on the RFIC chip may differ from the length and width of the micro-strip line trace on the PCB.

Figure 41:
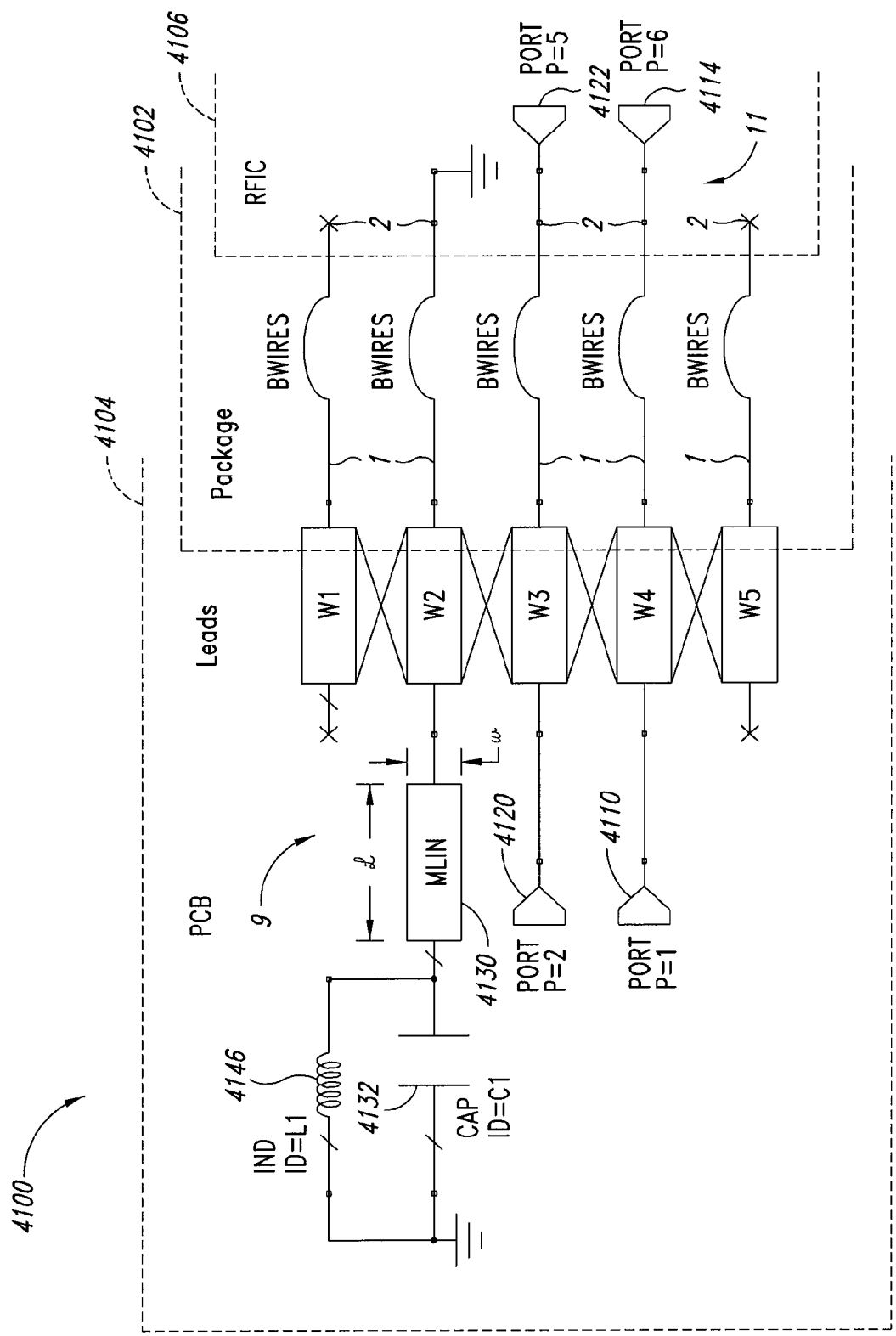
FIG. 41 is a functional block diagram of an embodiment of a system configured to isolate adjacent ports of an RFIC package.

FIG. 41 is a functional block diagram of an embodiment of system 4100 comprising an RFIC package 4102 mounted on a PCB board 4104. FIG. 41 shows only a portion of the system 4100 for ease of illustration. Additional components, such as additional packages and RFIC packages, may be mounted to the PCB 4104. The RFIC package 4102 comprises an RFIC chip 4106. The RFIC package may be a plastic package. As illustrated, the RFIC package 4102 has five package leads or pins W1-W5 configured to electrically couple the RFIC chip 4106 to the PCB 4104. The RFIC package may have additional leads. The five package leads W1-W5 are in a row, and as illustrated are uniformly spaced apart. The package leads W1-W5 are coupled to via bonding wires 1 to bonding pads 2 on the RFIC chip 4106. The bonding pads 2 are coupled to circuitry of the RFIC chip 4106.

The RFIC package 4102 may be coupled to the PCB 4104 using standard techniques, such as those discussed above with regard to FIG. 3. The connections between the RFIC package 4102 and the PCB 4104 may include, for example, signal, biasing, power and control connections. The PCB 4104 typically has micro-strip line metal traces 9 that couple the connections between the RFIC package 4102 and the PCB 4104 to circuitry of the PCB 4104.

As illustrated, four ports 4120, 4110, 4122, 4114 are configured to carry RF signals between the PCB 4104 and the RFIC chip 4106 via adjacent package leads W3 and W4. The system 4100 may comprise additional ports and package leads configured to carry signals between the PCB 4104 and the RFIC chip 4106, including additional RF ports. The connections of package leads W1 and W5 to components (such as ports) of the PCB 4102 and of the RFIC chip 4106 are not shown for ease of illustration.

A first connection chain electrically couples port 1 4110 to port 6 4114 through micro-strip line trace 9, package lead W4, a bond wire 1, a bond pad 2 and a micro-strip line trace 11. A second connection chain electrically couples port 2 4120 to port 5 4122 through a micro-strip line trace 9, a package lead W3, a bond wire 1, a bond pad 2 and a micro-strip line trace 11. Electromagnetic coupling between port 1 4110 and port 2 4120 may arise through the PCB 4004, the package leads W1-W5, the bond wires 1, the bond pads 2 and the RFIC chip 4106, particularly in view of the small dimensions of the RFIC package 4102. Similarly, electromagnetic coupling between port 5 4122 and port 6 4114 may occur.

To address this coupling, a package lead W2 is placed near to the package lead W3 of the second chain, on the opposite side from the package lead W4 of the first chain, and configured to reduce electromagnetic coupling between the ports of the first and second chains. For example, and as illustrated, the package lead W2 may be a neighboring lead on a side of the package lead W3 of the second chain opposite from the package lead W4 of the first chain. Package lead W2 is coupled through a short length of micro-strip line metal tracing MLIN 4130 to a first end of a capacitor C1 4132 on the PCB 4104. Package lead W2 also is coupled through the short length of micro-strip line metal tracing MLIN 4130 to a first end of an inductor L1 4146 on the PCB 4104. The micro-strip line metal tracing MLIN 4130 has a length L and a width w. The other ends of the capacitor C1 4132 and the inductor L1 4146 are coupled to a reference voltage on the PCB 4104. As illustrated, the reference voltage is a radio frequency ground. The other end of package lead W2 is coupled to a reference voltage on the RFIC chip 4106. As illustrated, the reference voltage is a radio frequency ground on the RFIC chip 4106. The values of the capacitor C1 4132 and the inductor L1 4146, and the length and width of the micro-strip line metal tracing MLIN 4130 may be selected so as to minimize coupling between adjacent ports 1 and 2 and 5 and 6 at frequencies of interest. For example, and as discussed in more detail below, the values for desired operational frequencies or frequency ranges may be selected using electromagnetic or simplified circuit simulation. For example, physical models or modeling programs may be employed to select the values for the length and width of the micro-strip line metal tracing MLIN 4130 and for the capacitance of the capacitor C1 4132 and the inductance of the inductor L1 4146.

For a given configuration, there will typically be optimum capacitance and inductance values for obtaining maximum isolation at a given frequency. In addition, selecting the capacitance values improving isolation at a selected frequency will generally improve isolation for frequencies higher than the selected frequency in a frequency range. For a given frequency and configuration, a capacitance above a selected value will result in improved isolation as compared to a 50 Ohm loaded or a grounded configuration.

In an embodiment, an optimum capacitance value for the capacitor C1 4132 may be selected based on a simplified model omitting the inductor L1 4146. Then an optimum inductance for the inductor L1 4146 may be selected based on the selected capacitance value. The process may be iterative. In an embodiment, the choice of an inductance above a certain level will result in improved isolation at a fixed frequency. In an embodiment, a capacitance at an optimizing level and an inductance above a selected level for a selected frequency will result in improved isolation at all frequencies above the selected frequency. The isolation of embodiments of FIG. 41 may be similar to that of embodiments of FIG. 23 for comparable dimensional configurations and operational frequencies.

Figure 42:
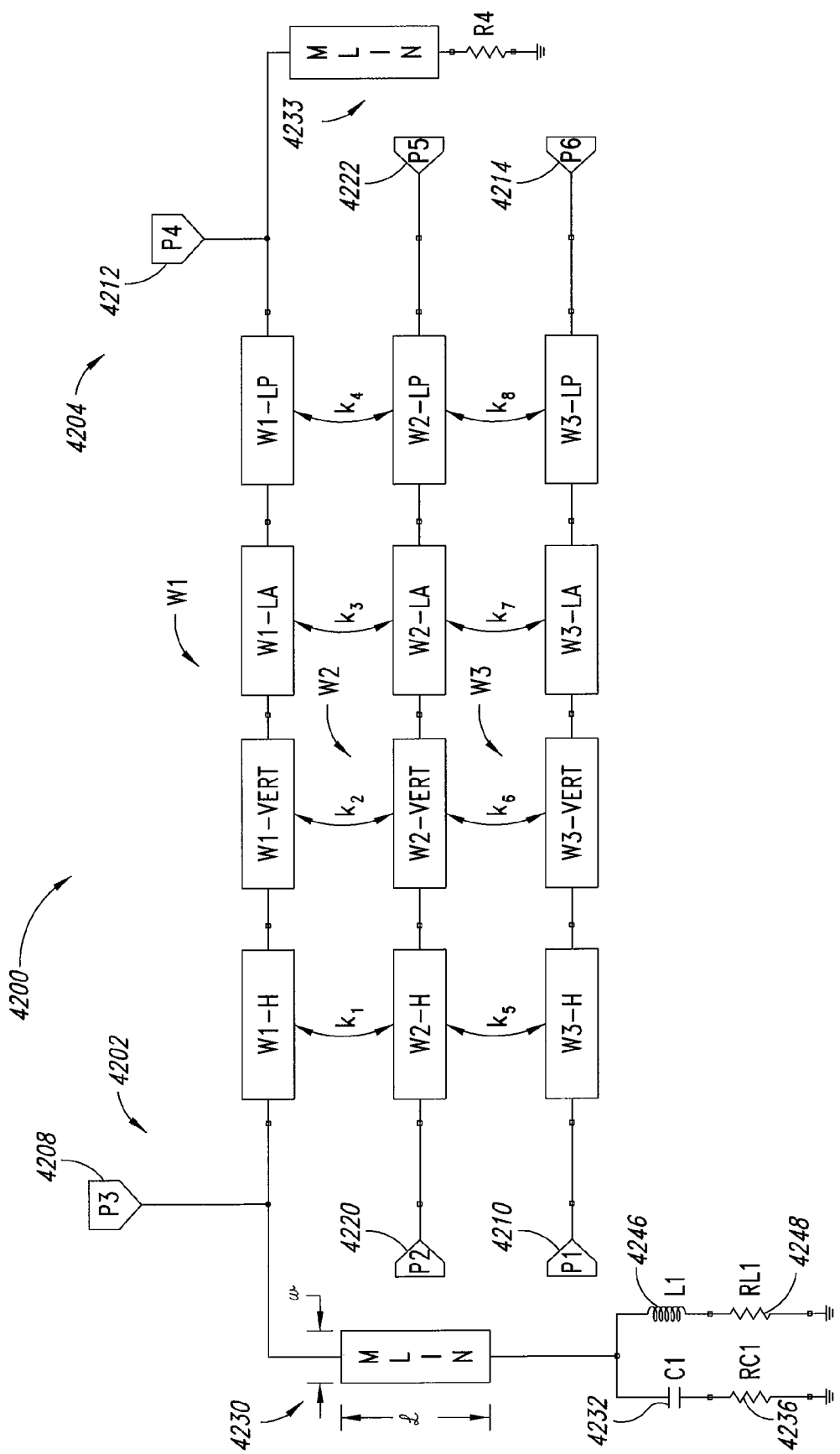
FIG. 42 is functional block diagram of an embodiment of a model of a system configured to isolate adjacent ports of an RFIC package.

FIG. 42 is a functional block diagram illustrating an embodiment of a model 4200 of a system configured to reduce electromagnetic coupling between adjacent ports coupling a PCB 4202 to an RFIC chip 4204 by changing the electro-magnetic field distribution in the area of coupled package leads W1-W3. The model 4200 may be used, for example, to model the embodiment of FIG. 41 to facilitate selection of the width and length of the micro-strip line MLIN 4130, the capacitance of the capacitor C1 4132 and the inductance of the inductor L1 4146 of FIG. 41. The model 4100 may be used in conjunction with the model 2400 of FIG. 24. For example, an optimum capacitance value may be selected using the model 2400 of FIG. 24, and then an optimum inductance value may be selected using the model 4200 of FIG. 42.

As illustrated in FIG. 42, port 3 4208 is electrically coupled to port 4 4212 through package lead W1, port 2 4220 is electrically coupled to port 5 4222 through package lead W2, and port 1 4210 is electrically coupled to port 6 4214 through package lead W3. Ports 2 and 5 may be loaded with an input impedance of, for example, 50 Ohms. Ports 1 and 6 may be loaded with an input impedance of, for example, 50 Ohms. Optional ports 3 and 4 may be loaded with, for example, a high input impedance, and may be used for signal monitoring. Other input impedances may be employed.

The package leads W1-W3 electrically coupling the ports may be modeled as separate segments. The modeling of the package leads described with respect to FIG. 5 above, for example, may be employed. The doubled sided arrows $k_1$ through $k_8$, show coupling between the parts of the chains, and can be modeled as coupling coefficients. A micro-strip line trace 4230 having a length L and a width w couples the package lead W1 to a capacitor C1 4232 on the PCB 3802, and is modeled with an associated parasitic resistance RC1 4236 coupled in series between the capacitor C1 4232 and a radio frequency ground on the PCB 4202. The micro-strip line trace 4230 couples the package lead W1 to an inductor L1 4246 on the PCB 3802, and is modeled with an associated parasitic resistance RL1 4248 coupled in series between the inductor L1 4246 and the radio frequency ground on the PCB 4202. A short wire or line, modeled as a micro-strip line trace 4233 and associated parasitic resistance R4, couples the package lead W1 to a radio frequency ground on the RFIC 4204. The length and width of the micro-strip line trace on the RFIC chip may differ from the length and width of the micro-strip line trace on the PCB.

Figure 43:
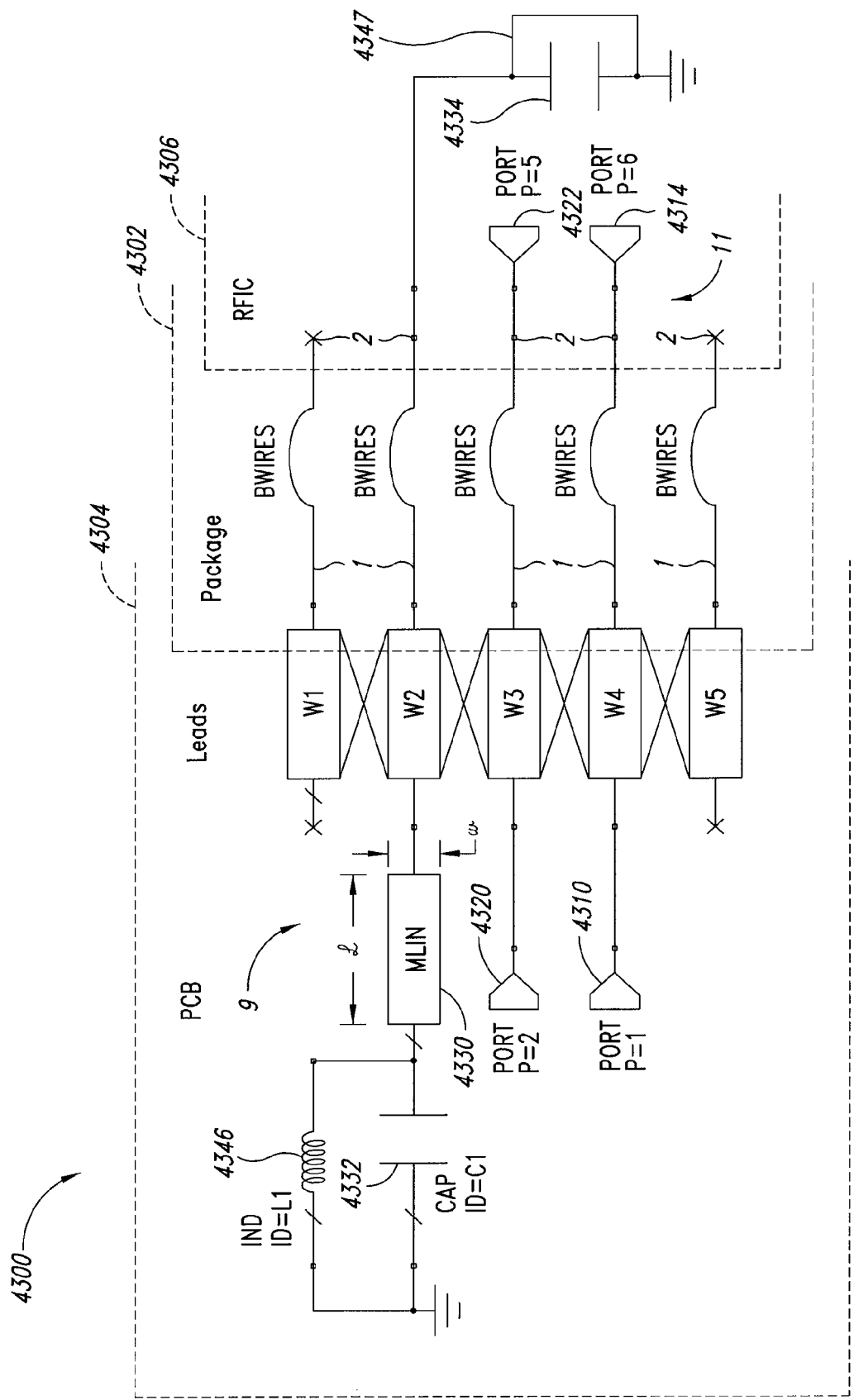
FIG. 43 is a functional block diagram of an embodiment of a system configured to isolate adjacent ports of an RFIC package.

FIG. 43 is a functional block diagram of an embodiment of system 4300 comprising an RFIC package 4302 mounted on a PCB board 4304. FIG. 43 shows only a portion of the system 4300 for ease of illustration. Additional components, such as additional packages and RFIC packages, may be mounted to the PCB 4304. The RFIC package 4302 comprises an RFIC chip 4306. The RFIC package may be a plastic package. As illustrated, the RFIC package 4302 has five package leads or pins W1-W5 configured to electrically couple the RFIC chip 4306 to the PCB 4304. The RFIC package may have additional leads. The five package leads W1-W5 are in a row, and as illustrated are uniformly spaced apart. The package leads W1-W5 are coupled to via bonding wires 1 to bonding pads 2 on the RFIC chip 4306. The bonding pads 2 are coupled to circuitry of the RFIC chip 4306.

The RFIC package 4302 may be coupled to the PCB 4304 using standard techniques, such as those discussed above with regard to FIG. 3. The connections between the RFIC package 4302 and the PCB 4304 may include, for example, signal, biasing, power and control connections. The PCB 4304 typically has metal traces 9 that couple the connections between the RFIC package 4302 and the PCB 4304 to circuitry of the PCB 4304.

As illustrated, four ports 4320, 4322, 4312, 4314 are configured to carry RF signals between the PCB 4304 and the RFIC chip 4306 via adjacent package leads W3 and W4. The system 4300 may comprise additional ports and package leads configured to carry signals between the PCB 4304 and the RFIC chip 4306, including additional RF ports. The connections of package leads W1 and W5 to components (such as ports) of the PCB 4302 and of the RFIC chip 4306 are not shown for ease of illustration.

A first connection chain electrically couples port 1 4310 to port 6 4314 through micro-strip line trace 9, package lead W4, a bond wire 1, a bond pad 2 and a micro-strip line trace 11. A second connection chain electrically couples port 2 4320 to port 5 4322 through a micro-strip line trace 9, a package lead W3, a bond wire 1, a bond pad 2 and a micro-strip line trace 11. Electromagnetic coupling between port 2 4320 and port 1 4310 may arise through the PCB 4304, the package leads W1-W5, the bond wires 1, the bond pads 2 and the RFIC chip 4306, particularly in view of the small dimensions of the RFIC package 4302. Similarly, electromagnetic coupling between port 5 4322 and port 6 4314 may occur. To address this coupling, a package lead W2 is placed near to the package lead W3 of the second chain, on the opposite side from the package lead W4 of the first chain, and configured to reduce electromagnetic coupling between the ports of the first and second chains. For example, and as illustrated, the package lead W2 may be a neighboring lead on a side of the package lead W3 of the second chain opposite from the package lead W4 of the first chain. Package lead W2 is coupled through a short length of micro-strip line metal tracing MLIN 4330 to a first end of a capacitor C1 4332 on the PCB 4304. Package lead W2 also is coupled through the short length of micro-strip line metal tracing MLIN 4330 to a first end of an inductor L1 4346 on the PCB 4304. The micro-strip line metal tracing MLIN 4330 has a length L and a width w. The other ends of the capacitor C1 4332 and the inductor L1 4346 are coupled to a reference voltage on the PCB 4304. As illustrated, the reference voltage is a radio frequency ground. The other end of package lead W2 is coupled to a reference voltage on the RFIC chip 4306 through a capacitor C2 4334. As illustrated, the reference voltage is a radio frequency ground on the RFIC chip 4306. The values of the capacitors C1 4332 and C2 4334, and of the inductor L1 4346, and the length and width of the micro-strip line metal tracing MLIN 4330 may be selected so as to minimize coupling between ports 1 and 2 and 5 and 6 at frequencies of interest. For example, and as discussed in more detail below, the values for desired operational frequencies or frequency ranges may be selected using electromagnetic or simplified circuit simulation. For example, physical models or modeling programs may be employed to select the values for the length and width of the micro-strip line metal tracing MLIN 4330, the capacitance of the capacitors C1 4332 and C2 4334, and the inductance of the inductor L1 4346. In some embodiments, an optional shunt 4347 may be coupled across the capacitor C2 4334.

For a given configuration, there will typically be optimum capacitance and inductance values for obtaining maximum isolation at a given frequency. In addition, selecting the capacitance values improving isolation at a selected frequency will generally improve isolation for frequencies higher than the selected frequency in a frequency range. For a given frequency and configuration, capacitance values above selected values will result in improved isolation as compared to a 50 Ohm loaded or a grounded configuration.

In an embodiment, optimum capacitance values for the capacitors C1 4332 and C2 4334 may be selected based on a simplified model omitting the inductor L1 4346. Then an optimum inductance for the inductor L1 4346 may be selected based on the selected capacitance values. The process may be iterative. In an embodiment, the choice of an inductance above a certain level will result in improved isolation at a fixed frequency. In an embodiment, capacitances at an optimizing level and an inductance above a selected level for a selected frequency will result in improved isolation at all frequencies above the selected frequency. The isolation of embodiments of FIG. 43 may be similar to that of embodiments of FIG. 25 for comparable dimensional configurations and operational frequencies.

Figure 44:
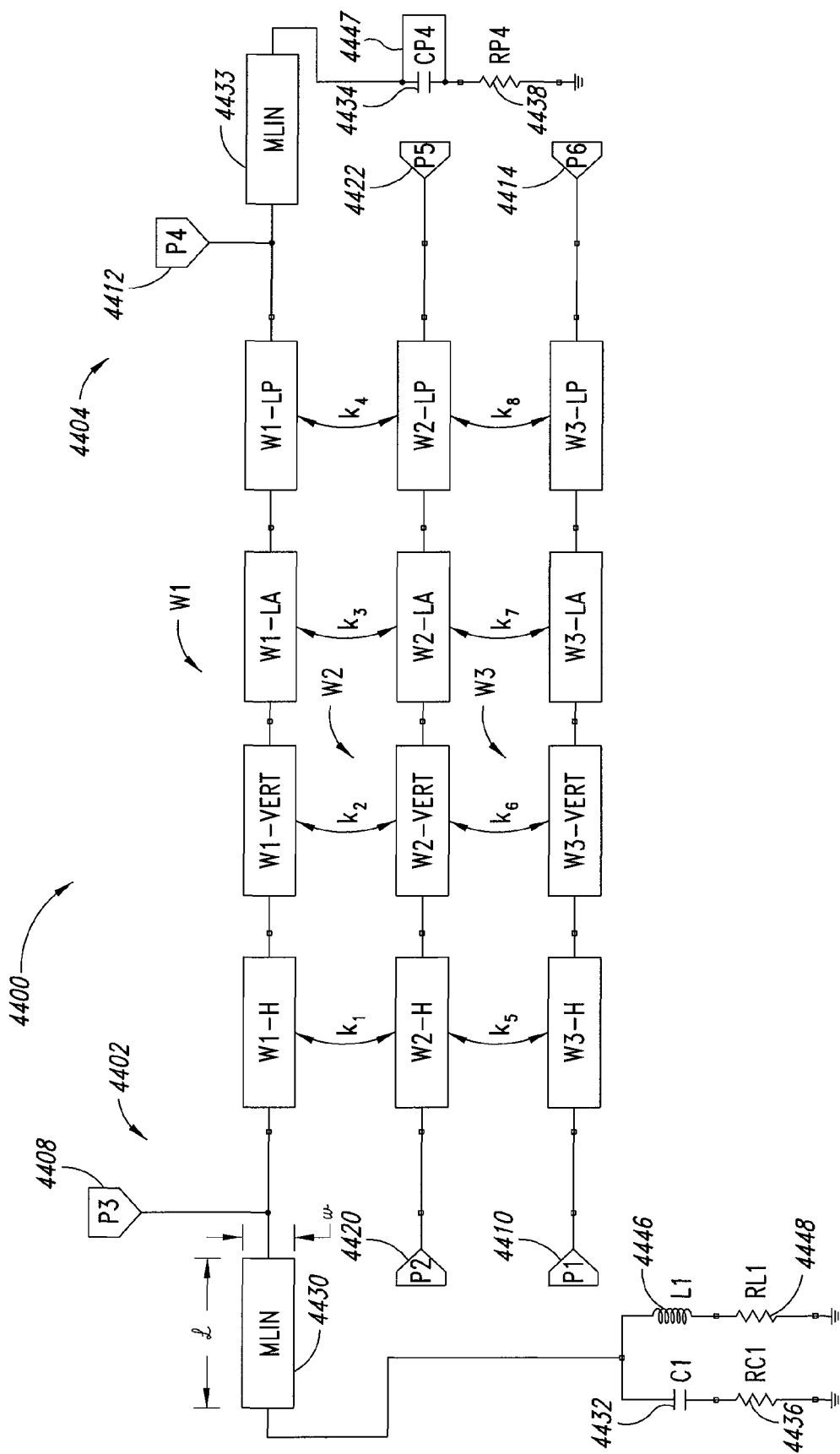
FIG. 44 is functional block diagram of an embodiment of a model of a system configured to isolate adjacent ports of an RFIC package.

FIG. 44 is a functional block diagram illustrating an embodiment of a model 4400 of a system configured to reduce electromagnetic coupling between adjacent ports coupling a PCB 4402 to an RFIC chip 4404 by changing the electro-magnetic field distribution in the area of coupled package leads W1-W3. The model 4400 may be used, for example, to model the embodiment of FIG. 43 to facilitate selection of the width and length of the micro-strip line MLIN 4330, the capacitance of the capacitors C1 4332 and C2 4334, and the inductance of the inductor L1 4346 of FIG. 43. The model 4400 may be used in conjunction with the model 2600 of FIG. 26. For example, optimum capacitance values may be selected using the model 2600 of FIG. 26, and then an optimum inductance value may be selected using the model 4400 of FIG. 44.

As illustrated in FIG. 44, port 3 4408 is electrically coupled to port 4 4412 through package lead W1, port 2 4420 is electrically coupled to port 5 4422 through package lead W2, and port 1 4410 is electrically coupled to port 6 4414 through package lead W3. Ports 2 and 5 may be loaded with an input impedance of, for example, 50 Ohms. Ports 1 and 6 may be loaded with an input impedance of, for example, 50 Ohms. Optional ports 3 and 4 may be loaded with, for example, a high input impedance, and may be used for signal monitoring. Other input impedances may be employed.

The package leads W1-W3 electrically coupling the ports may be modeled as separate segments. The modeling of the package leads described with respect to FIG. 5 above, for example, may be employed. The doubled sided arrows $k_1$ through $k_8$, show coupling between the parts of the chains, and can be modeled as coupling coefficients. A micro-strip line trace 4430 having a length L and a width w couples the package lead W1 to a capacitor C1 4432 on the PCB 4402, which is modeled with an associated parasitic resistance RC1 4436 coupled in series between the capacitor C1 4432 and a radio frequency ground on the PCB 4402. The micro-strip line trace 4430 also couples the package lead W1 to an inductor L1 4446 on the PCB 4002, which is modeled with an associated parasitic resistance RL1 4448 coupled in series between the inductor L1 4446 and the radio frequency ground on the PCB 4402. A short wire or line, modeled as a micro-strip line trace 4433 couples the package lead W1 to a capacitor CP4 4434 on the RFIC chip 4404, and is modeled with an associated parasitic resistance RP4 4438 coupled in series between the capacitor CP4 4434 and a radio frequency ground on the RFIC 4404. In some embodiments, an optional shunt 4447 may be coupled across the capacitor C2 4434. As mentioned above, the capacitance values may be selected first, and then the inductance of the inductor may be selected. If the optional shunt is present, it can be removed from the model during the selection of the inductor.

FIGS. 45 through 54 graphically illustrate example results of modeling the isolation between two ports under consideration for different configurations.

Figure 45:
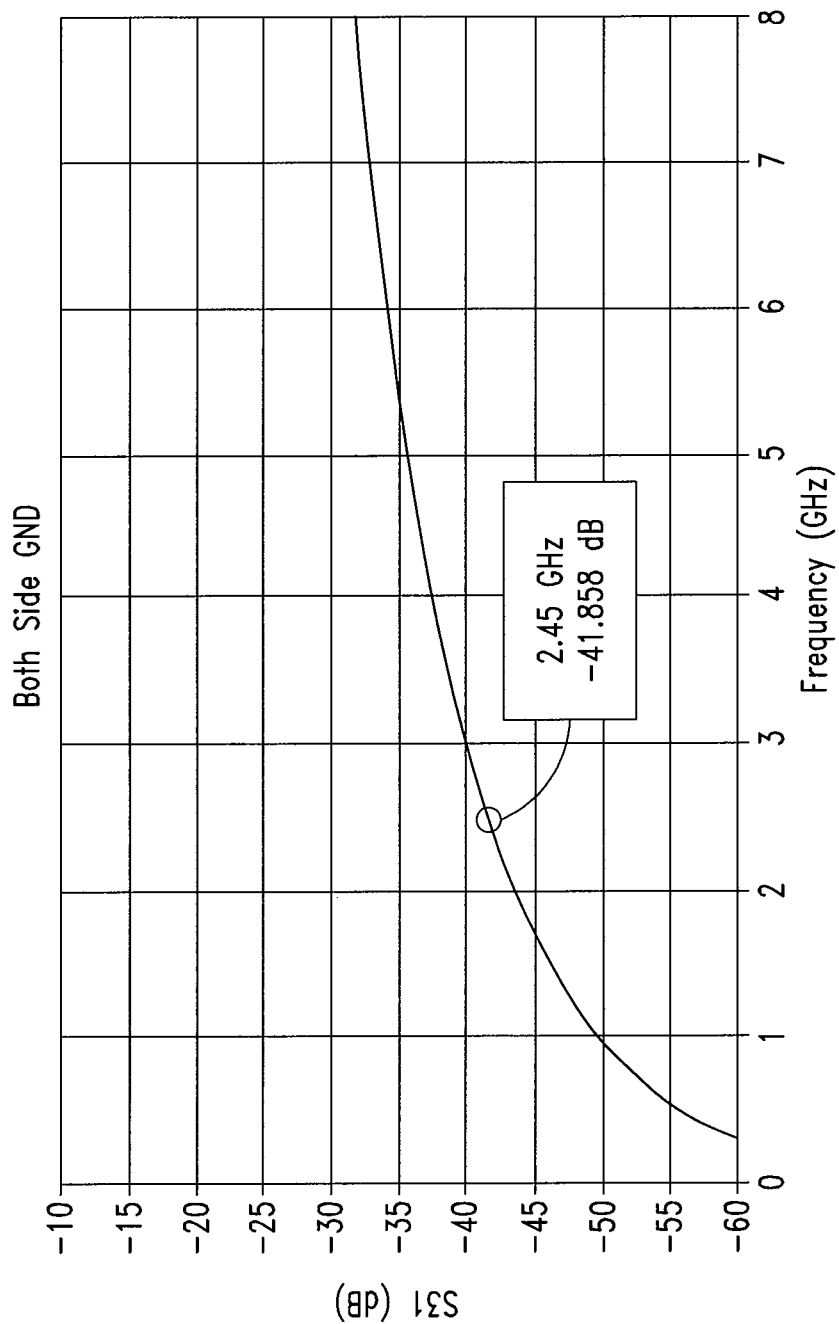
FIGS. 45 through 54 are graphical illustrations of the isolation of adjacent and non-adjacent ports of selected configurations of an RFIC package coupled to a PCB.

FIG. 45 graphically illustrates the isolation S31 between two non-adjacent ports under consideration against the operation frequency when the ports under consideration (see ports 3 and 1 of FIG. 5) are loaded at 50 Ohms and a package lead placed between the package leads of the ports under consideration is coupled through a wire or trace to a ground on the PCB and to a ground on the RFIC chip. At 2.45 GHz, the isolation is −41.858 dB.

Figure 46:
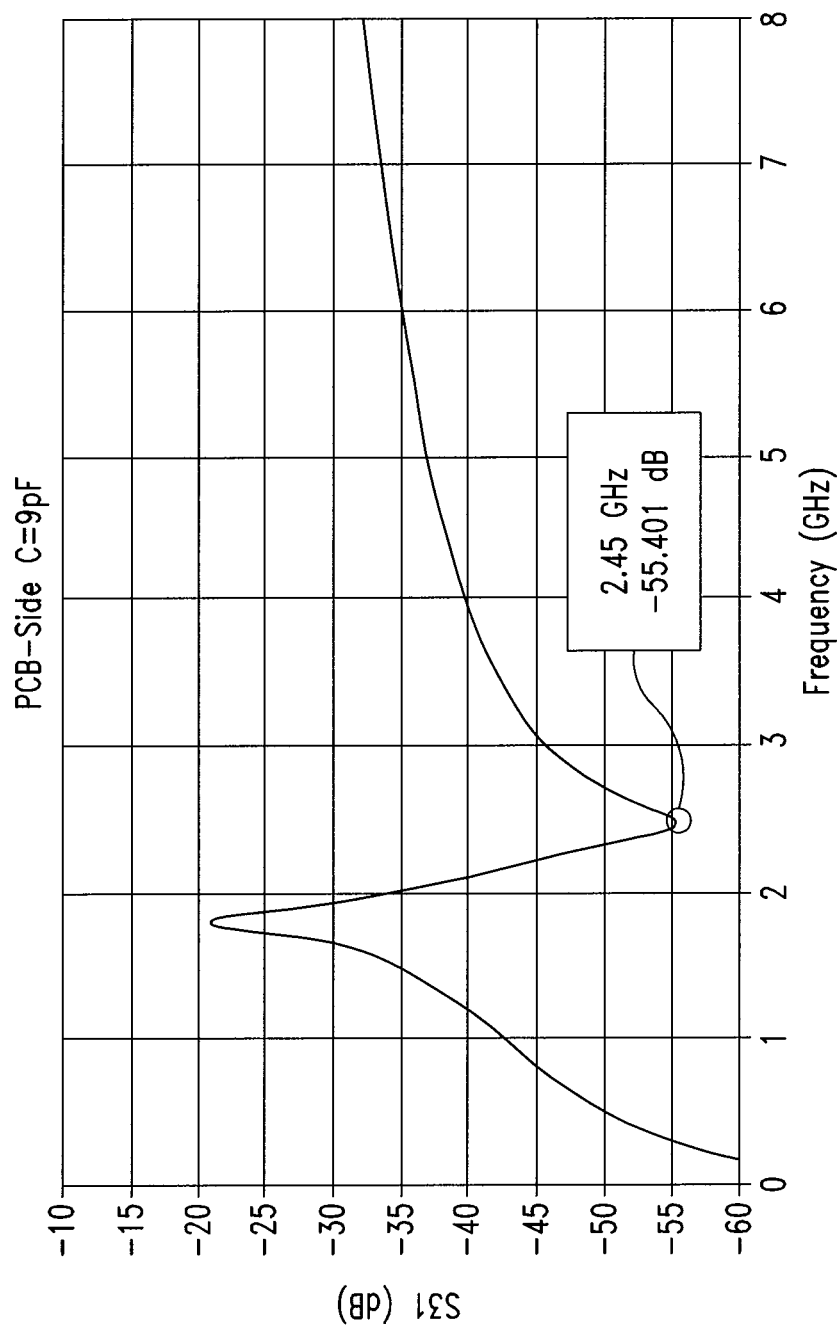

FIG. 46 graphically illustrates the isolation S31 in an embodiment between two non-adjacent ports under consideration (see ports 3 and 1 of FIGS. 3 and 10) when the ports under consideration are loaded at 50 Ohms and a package lead placed between the package leads of the ports under consideration is coupled to a radio frequency ground on the PCB through a capacitor having a capacitance of 9 pF, and directly to a radio frequency ground on the RFIC chip. At 2.45 GHz, the isolation is −55.401 dB.

Figure 47:
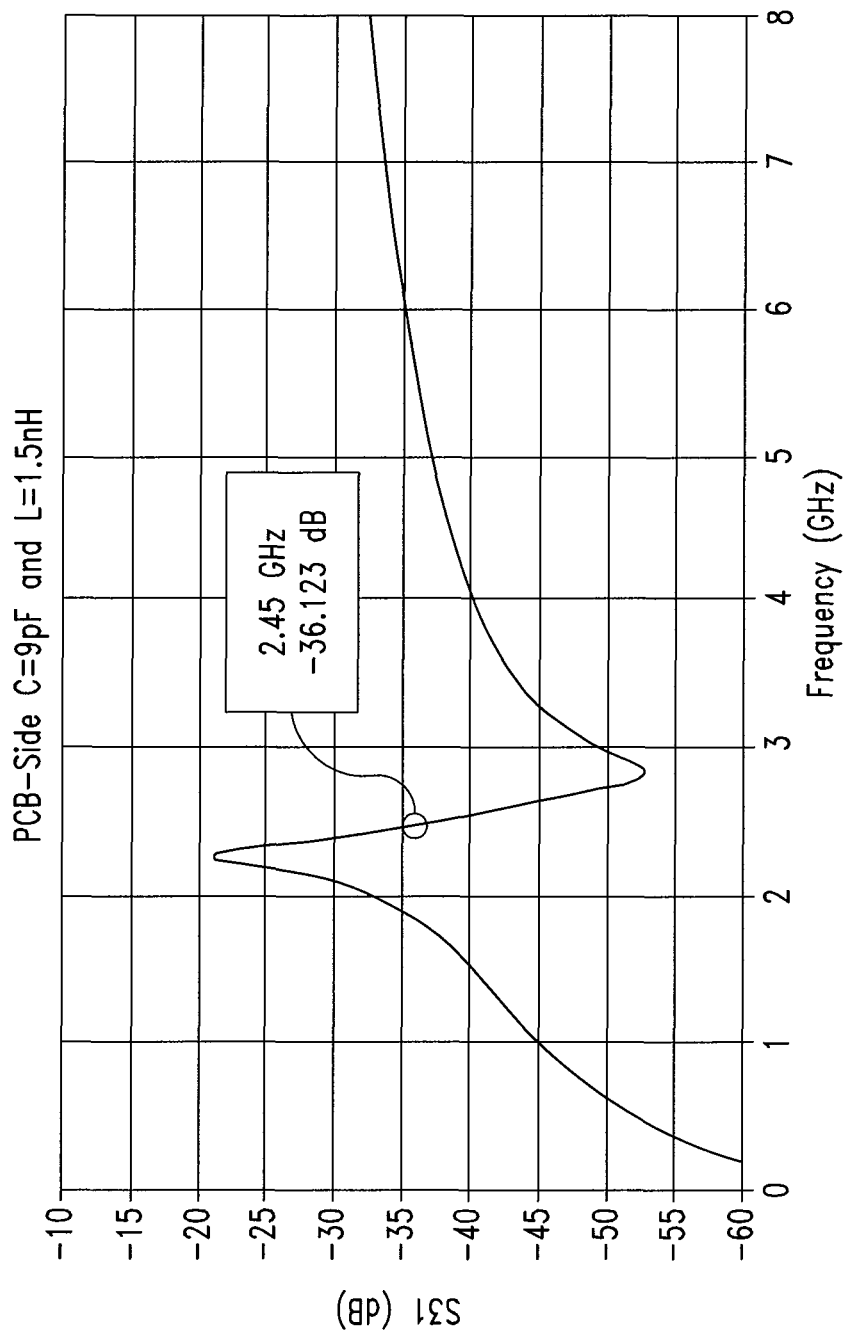

FIG. 47 graphically illustrates the isolation S31 in an embodiment between two non-adjacent ports under consideration (see ports 3 and 1 of FIGS. 37 and 38) when the ports under consideration are loaded at 50 Ohms and a package lead placed between the package leads of the ports under consideration is coupled to a radio frequency ground on the PCB through a capacitor having a capacitance of 9 pF in parallel with an inductor having an inductance of 1.5 nH, and directly to a radio frequency ground on the RFIC chip. At 2.45 GHz, the isolation is −36.123 dB.

Figure 48:
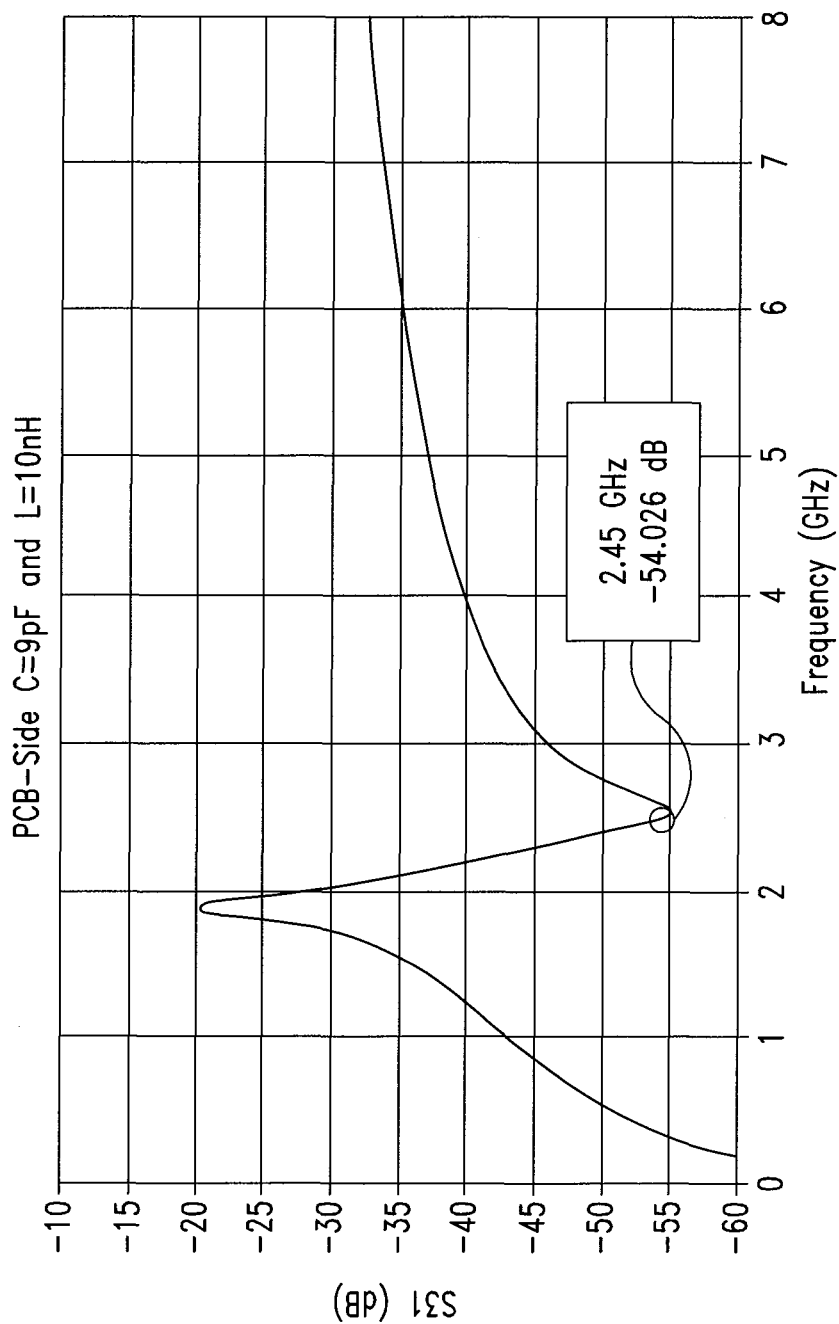

FIG. 48 graphically illustrates the isolation S31 in an embodiment between two non-adjacent ports under consideration (see ports 3 and 1 of FIGS. 37 and 38) when the ports under consideration are loaded at 50 Ohms and a package lead placed between the package leads of the ports under consideration is coupled to a radio frequency ground on the PCB through a capacitor having a capacitance of 9 pF in parallel with an inductor having an inductance of 10 nH, and directly to a radio frequency ground on the RFIC chip. At 2.45 GHz, the isolation is −54.026 dB. As can be seen from FIGS. 46 through 48, an appropriately selected inductance in a PCB-Side parallel capacitor and inductor configuration results in isolation properties similar to those for comparable PCB-Side capacitance configurations.

Figure 49:
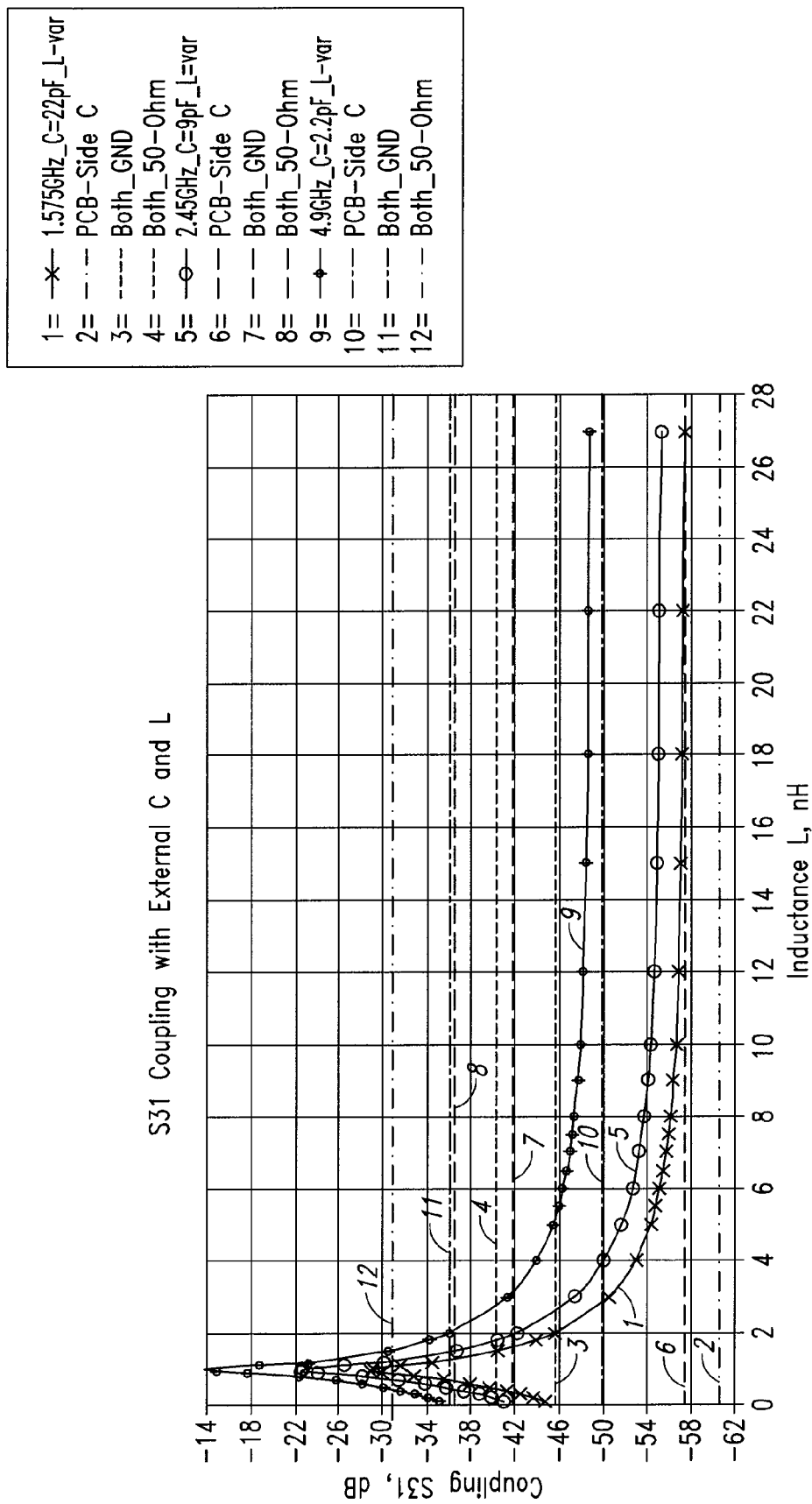

FIG. 49 graphically compares the isolation between two non-adjacent ports under consideration (see ports 3 and 1 of FIG. 5) when the ports under consideration are loaded at 50 Ohms and a package lead placed between the package leads of the ports under consideration is configured in various ways. A first line 1 shows the isolation when the center package lead is coupled directly to a ground on the RFIC chip and to a ground on the PCB through a capacitor in parallel with an inductor as the inductance of the inductor is varied, with the frequency fixed at 1.575 GHz and the capacitance fixed at 22 pF (see FIGS. 37 and 38). A second line 2 shows the isolation when the center package lead is coupled directly to a ground on the RFIC chip and to a ground on the PCB through a capacitor, with the frequency fixed at 1.575 GHz and the capacitance fixed at 22 pF (See FIGS. 3 and 10). A third line 3 shows the isolation when the center package lead is coupled directly to a ground on the RFIC chip and directly to a ground on the PCB, with the frequency fixed at 1.575 GHz (see FIG. 9). A fourth line 4 shows the isolation when the center package lead is loaded at 50 Ohms on both sides and the frequency is fixed at 1.575 GHz (see FIG. 5).

A fifth line 5 shows the isolation when the center package lead is coupled directly to a ground on the RFIC chip and to a ground on the PCB through a capacitor in parallel with an inductor as the inductance of the inductor is varied, with the frequency fixed at 2.45 GHz and the capacitance fixed at 9 pF (see FIGS. 37 and 38). A sixth line 6 shows the isolation when the center package lead is coupled directly to a ground on the RFIC chip and to a ground on the PCB through a capacitor, with the frequency fixed at 2.45 GHz and the capacitance fixed at 9 pF (See FIGS. 3 and 10). A seventh line 7 shows the isolation when the center package lead is coupled directly to a ground on the RFIC chip and directly to a ground on the PCB, with the frequency fixed at 2.45 GHz (see FIG. 9). An eighth line 8 shows the isolation when the center package lead is loaded at 50 Ohms on both sides and the frequency is fixed at 2.45 GHz (see FIG. 5).

A ninth line 9 shows the isolation when the center package lead is coupled directly to a ground on the RFIC chip and to a ground on the PCB through a capacitor in parallel with an inductor as the inductance of the inductor is varied, with the frequency fixed at 4.9 GHz and the capacitance fixed at 2.2 pF (see FIGS. 37 and 38). A tenth line 10 shows the isolation when the center package lead is coupled directly to a ground on the RFIC chip and to a ground on the PCB through a capacitor, with the frequency fixed at 4.9 GHz and the capacitance fixed at 2.2 pF (See FIGS. 3 and 10). An eleventh line 11 shows the isolation when the center package lead is coupled directly to a ground on the RFIC chip and directly to a ground on the PCB, with the frequency fixed at 4.9 GHz (see FIG. 9). A twelfth line 12 shows the isolation when the center package lead is loaded at 50 Ohms on both sides and the frequency is fixed at 4.9 GHz (see FIG. 5).

As can be seen from FIG. 49, there is an inductance value of about 1 nH for the chosen dimensions of an embodiment, which roughly correspond to an SOT 363 type case, where the isolation is minimal over a wide frequency range. For the chosen dimensions, inductance values above 2 nH result in improved isolation as compared to configurations where both sides of the center package lead are directly coupled to a ground, and inductance values above 10 nH produce results similar to those where the center package lead is coupled to the PCB through a capacitor.

Figure 50:
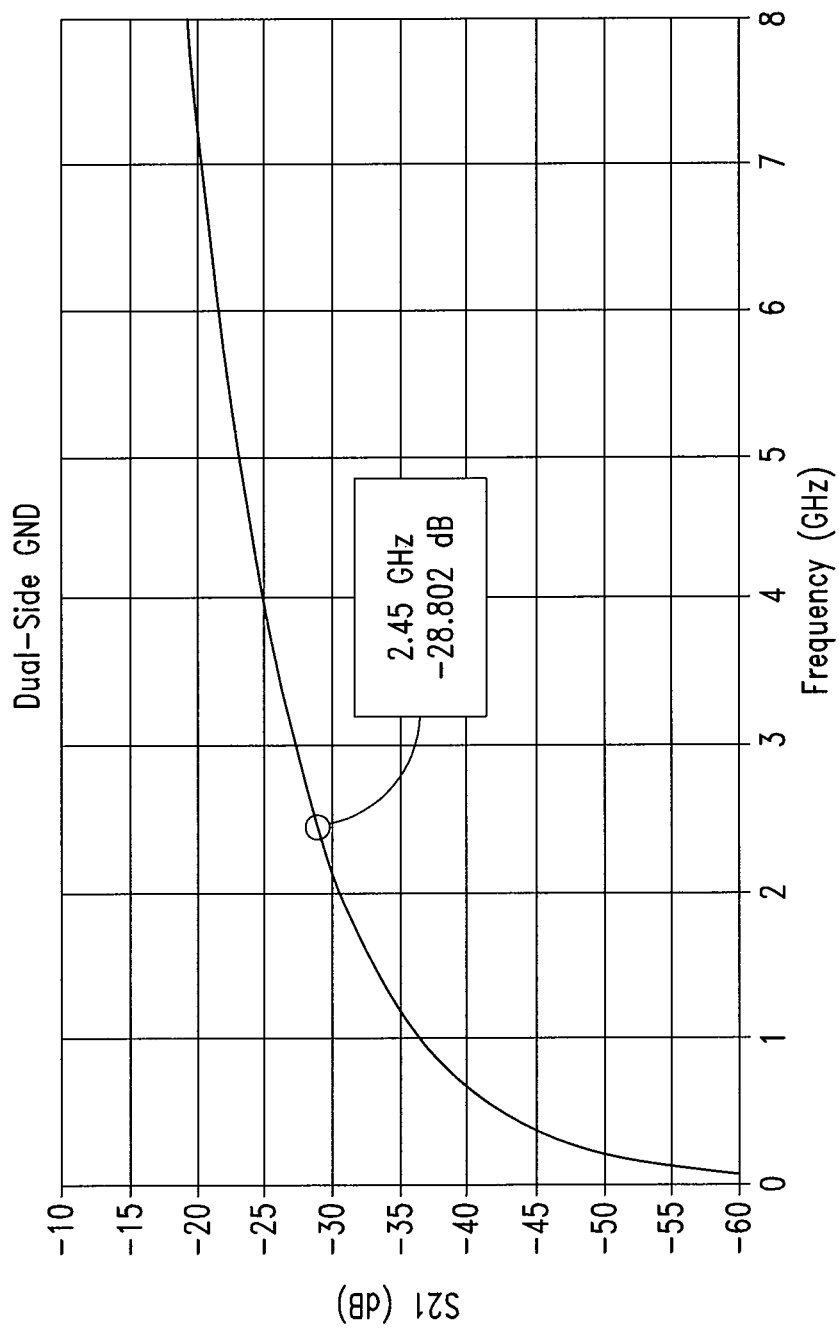

FIG. 50 graphically illustrates the isolation S21 between two adjacent ports under consideration against the operation frequency when the ports under consideration (see ports 2 and 1 of FIG. 5) are loaded at 50 Ohms and a package lead neighboring the package leads of the ports under consideration is coupled through a wire or trace to a ground on the PCB and to a ground on the RFIC chip. At 2.45 GHz, the isolation is −28.802 dB.

Figure 51:
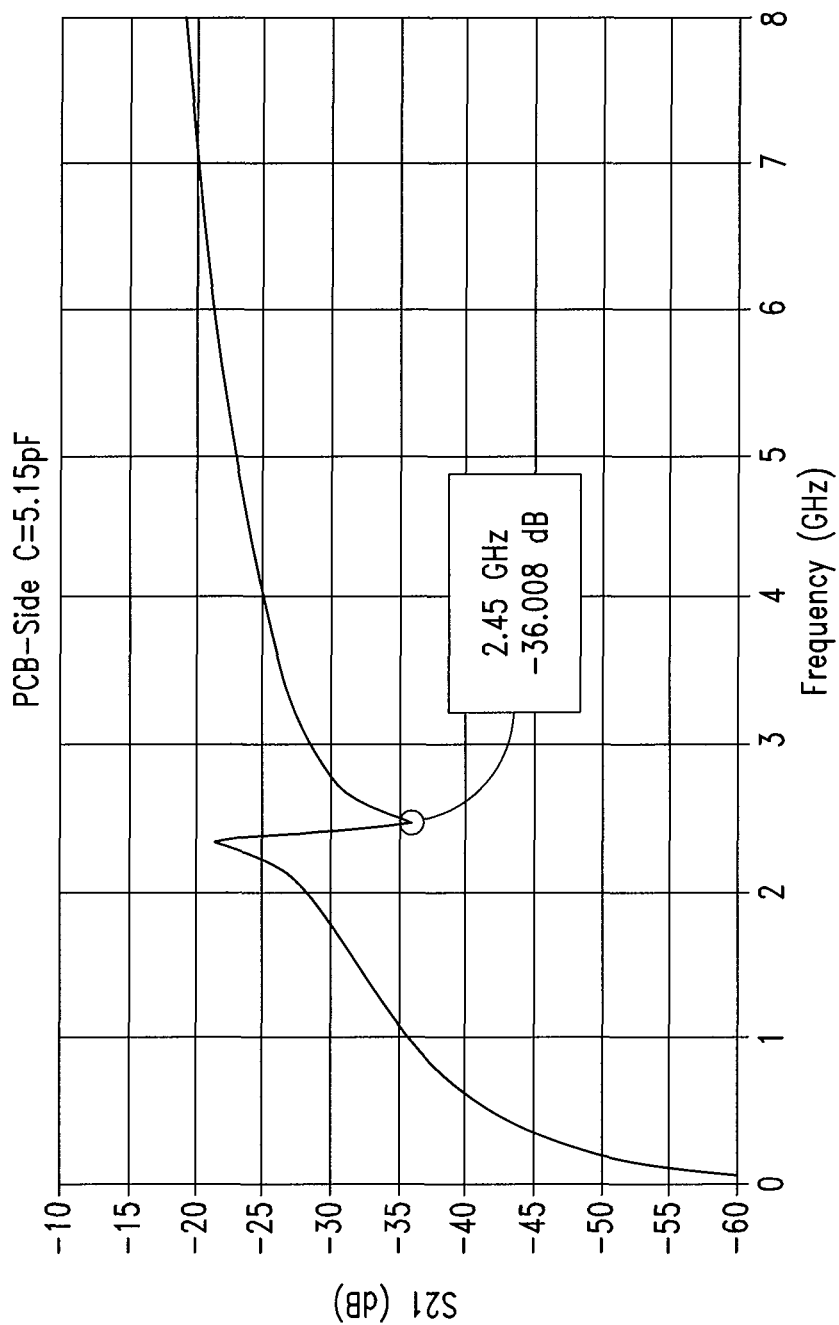

FIG. 51 graphically illustrates the isolation S21 in an embodiment between two adjacent ports under consideration (see ports 2 and 1 of FIGS. 23 and 24) when the ports under consideration are loaded at 50 Ohms and a package lead neighboring the package leads of the ports under consideration is coupled to a radio frequency ground on the PCB through a capacitor having a capacitance of 5.15 pF, and directly to a radio frequency ground on the RFIC chip. At 2.45 GHz, the isolation is −36.008 dB.

Figure 52:
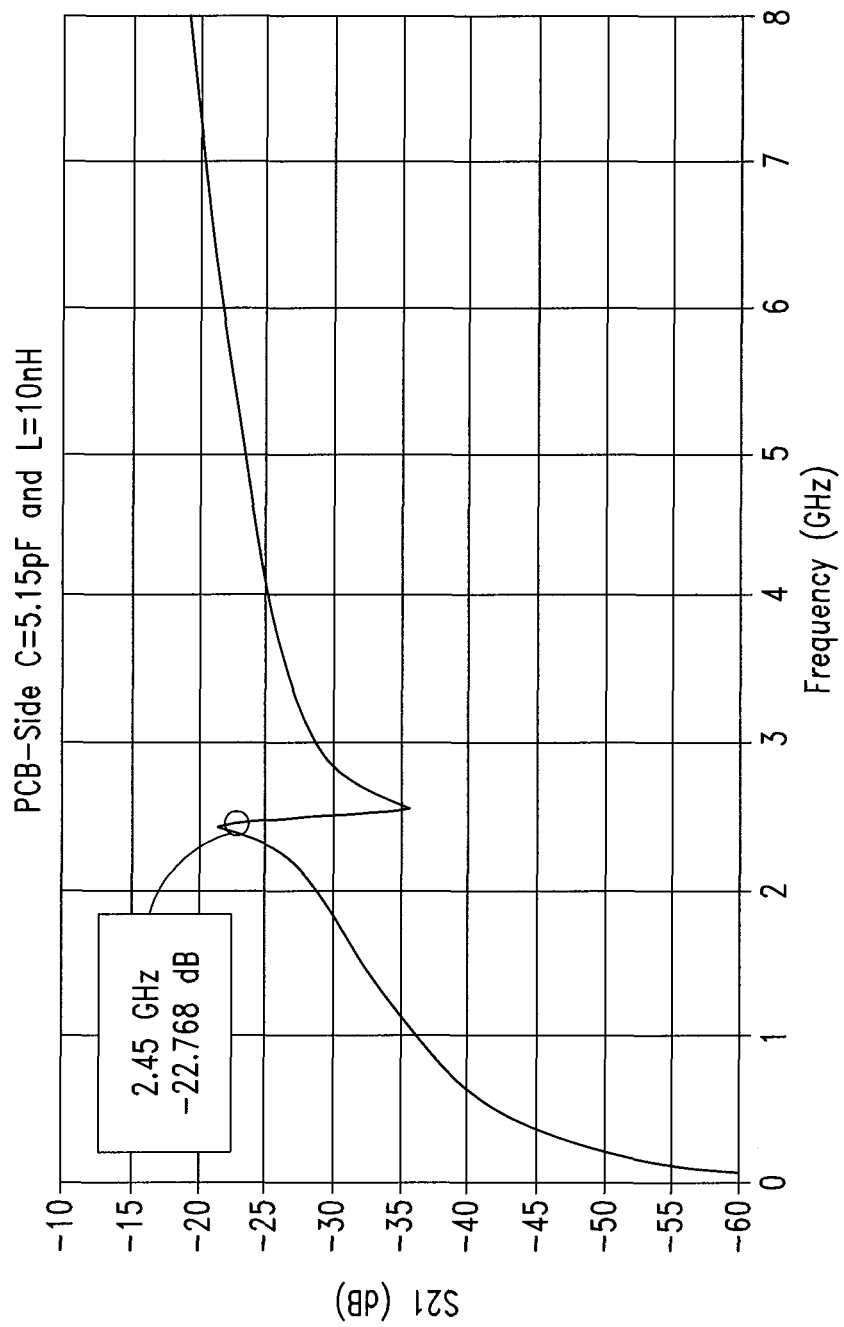

FIG. 52 graphically illustrates the isolation S21 in an embodiment between two adjacent ports under consideration (see ports 2 and 1 of FIGS. 41 and 42) when the ports under consideration are loaded at 50 Ohms and a package lead neighboring the package leads of the ports under consideration is coupled to a radio frequency ground on the PCB through a capacitor having a capacitance of 5.15 pF in parallel with an inductor having an inductance of 10 nH, and directly to a radio frequency ground on the RFIC chip. At 2.45 GHz, the isolation is −22.768 dB.

Figure 53:
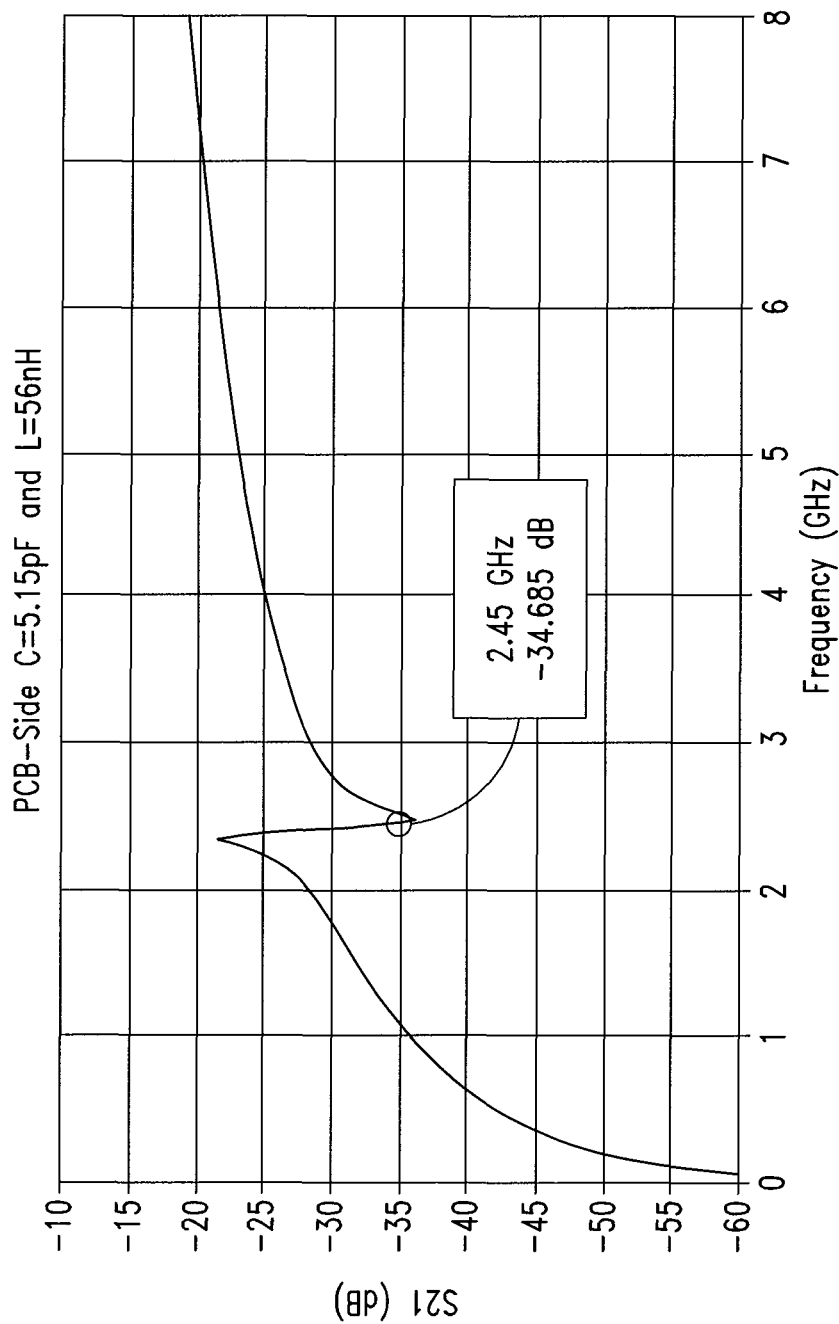

FIG. 53 graphically illustrates the isolation S21 in an embodiment between two adjacent ports under consideration (see ports 2 and 1 of FIGS. 41 and 42) when the ports under consideration are loaded at 50 Ohms and a package lead neighboring the package leads of the ports under consideration is coupled to a radio frequency ground on the PCB through a capacitor having a capacitance of 5.15 pF in parallel with an inductor having an inductance of 56 nH, and directly to a radio frequency ground on the RFIC chip. At 2.45 GHz, the isolation is −34.685 dB. As can be seen from FIGS. 51 through 53, an appropriately selected inductance in a PCB-Side parallel capacitor and inductor configuration results in isolation properties similar to those for comparable PCB-Side capacitance configurations.

Figure 54:
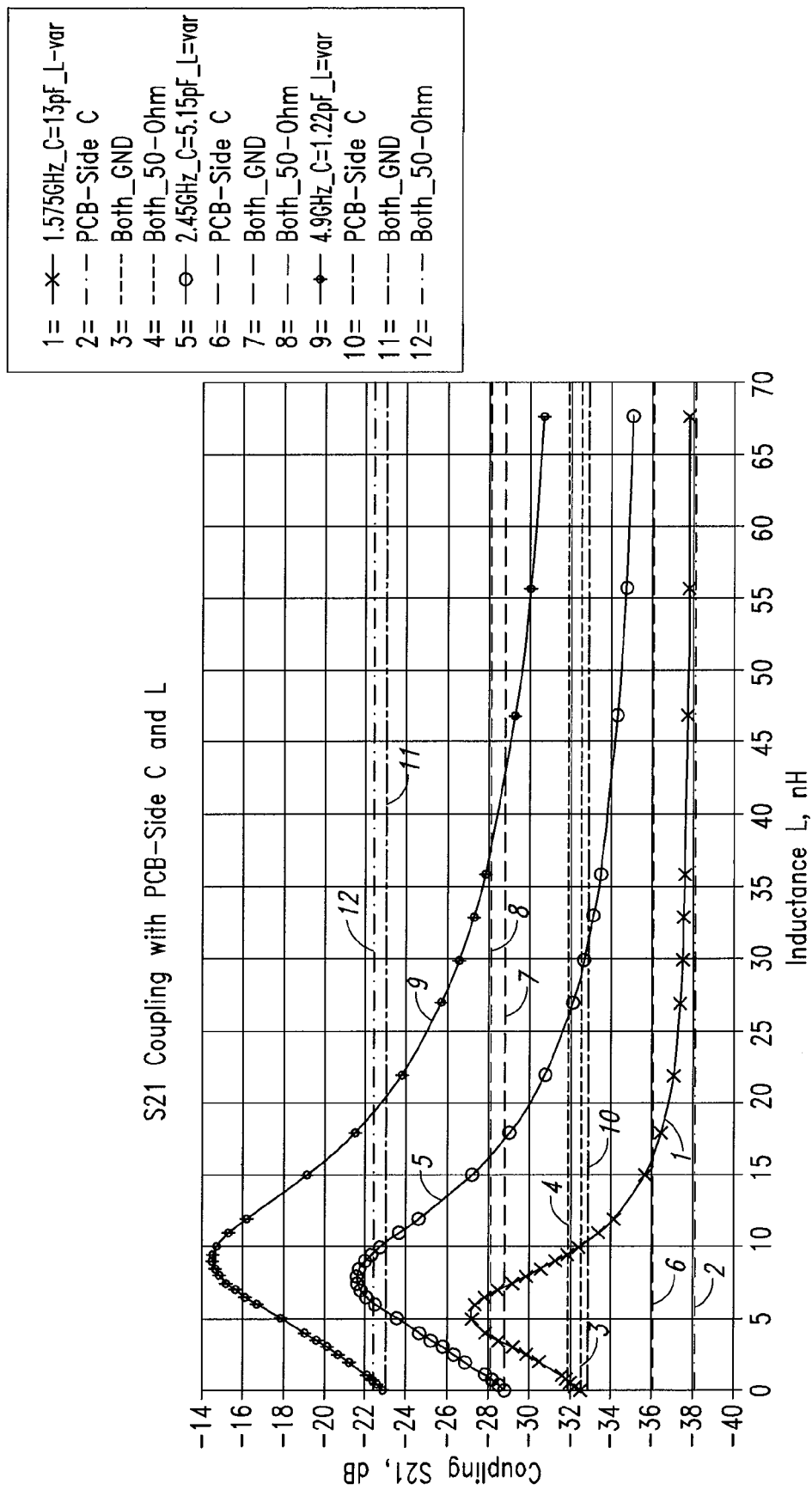

FIG. 54 graphically compares the isolation between two adjacent ports under consideration (see ports 2 and 1 of FIG. 5) when the ports under consideration are loaded at 50 Ohms and a package lead neighboring the package leads of the ports under consideration is configured in various ways. A first line 1 shows the isolation when the neighboring package lead is coupled directly to a ground on the RFIC chip and to a ground on the PCB through a capacitor in parallel with an inductor as the inductance of the inductor is varied, with the frequency fixed at 1.575 GHz and the capacitance fixed at 13 pF (see FIGS. 41 and 42). A second line 2 shows the isolation when the neighboring package lead is coupled directly to a ground on the RFIC chip and to a ground on the PCB through a capacitor, with the frequency fixed at 1.575 GHz and the capacitance fixed at 13 pF (See FIGS. 23 and 24). A third line 3 shows the isolation when the neighboring package lead is coupled directly to a ground on the RFIC chip and directly to a ground on the PCB, with the frequency fixed at 1.575 GHz. A fourth line 4 shows the isolation when the neighboring package lead is loaded at 50 Ohms on both sides and the frequency is fixed at 1.575 GHz (see FIG. 5).

A fifth line 5 shows the isolation when the neighboring package lead is coupled directly to a ground on the RFIC chip and to a ground on the PCB through a capacitor in parallel with an inductor as the inductance of the inductor is varied, with the frequency fixed at 2.45 GHz and the capacitance fixed at 5.15 pF (see FIGS. 41 and 42). A sixth line 6 shows the isolation when the neighboring package lead is coupled directly to a ground on the RFIC chip and to a ground on the PCB through a capacitor, with the frequency fixed at 2.45

GHz and the capacitance fixed at 5.15 pF (See FIGS. 23 and 24). A seventh line 7 shows the isolation when the neighboring package lead is coupled directly to a ground on the RFIC chip and directly to a ground on the PCB, with the frequency fixed at 2.45 GHz. An eighth line 8 shows the isolation when the neighboring package lead is loaded at 50 Ohms on both sides and the frequency is fixed at 2.45 GHz (see FIG. 5).

A ninth line 9 shows the isolation when the neighboring package lead is coupled directly to a ground on the RFIC chip and to a ground on the PCB through a capacitor in parallel with an inductor as the inductance of the inductor is varied, with the frequency fixed at 4.9 GHz and the capacitance fixed at 1.22 pF (see FIGS. 41 and 42). A tenth line 10 shows the isolation when the neighboring package lead is coupled directly to a ground on the RFIC chip and to a ground on the PCB through a capacitor, with the frequency fixed at 4.9 GHz and the capacitance fixed at 1.22 pF (See FIGS. 23 and 24). An eleventh line 11 shows the isolation when the neighboring package lead is coupled directly to a ground on the RFIC chip and directly to a ground on the PCB, with the frequency fixed at 4.9 GHz. A twelfth line 12 shows the isolation when the neighboring package lead is loaded at 50 Ohms on both sides and the frequency is fixed at 4.9 GHz (see FIG. 5).

As can be seen from FIG. 54, for the chosen dimensions of an embodiment, inductance values above approximately 20 nH will result in improved isolation as compared to as compared to configurations where both sides of the neighboring package lead are directly coupled to a ground, and inductance values above 50 nH produce results similar to those where the neighboring package lead is coupled to the PCB through a capacitor.

Figure 55:
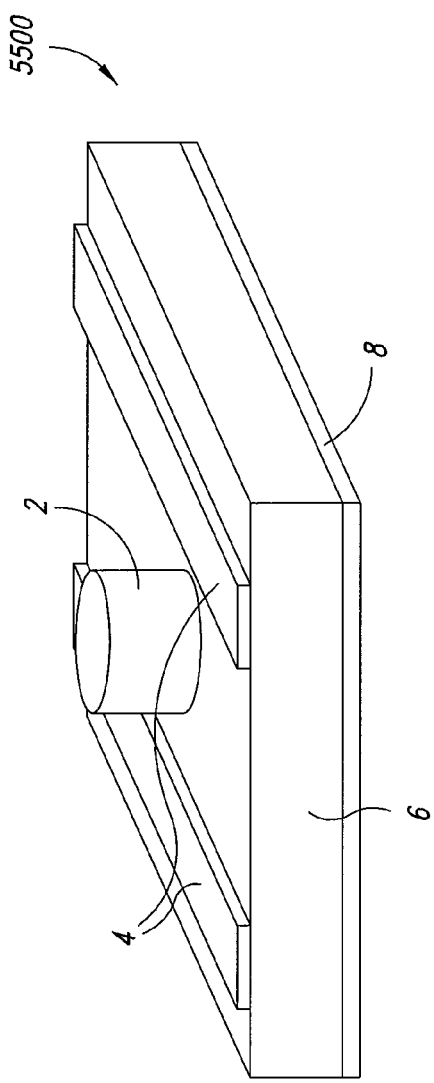
FIG. 55 is an isometric projection of a microwave circuit with band-pass or band-reject feature.
Figure 55:
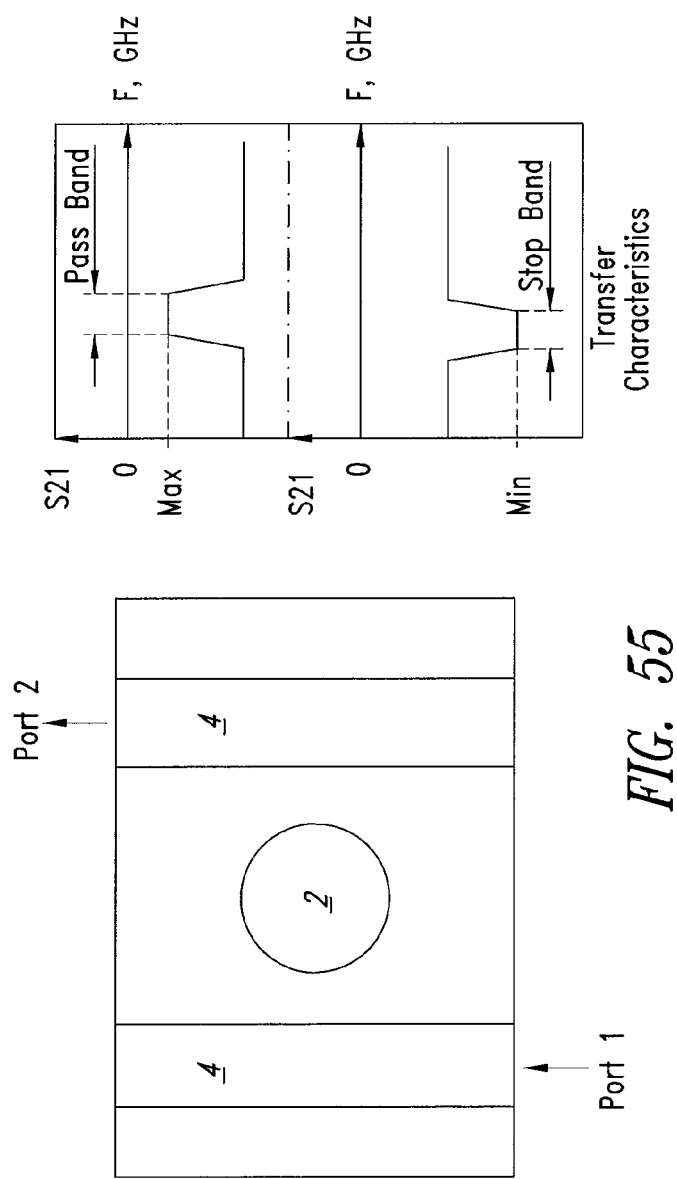

FIG. 55 shows an isometric projection view, a top view, and transfer characteristics of system 5500 employing a dielectric resonator 2 in microwave band-pass or band-reject applications. The dielectric resonator 2 is placed on a substrate 6 between two micro-strip lines 4 associated with respective microwave ports. The substrate 6 is placed on a metal ground plane 8. Band-pass or band-reject performance can be achieved by selecting the mode of excitation of the resonator and the coupling with the micro-strip lines. The band-pass or band-reject band width is typically narrow due to high Q-factors of the resonators. This configuration is typical for microwave circuits. The embodiments described above instead use a capacitor coupled to package leads, which resemble an inductance and results in a wide-band resonance circuit.

FIGS. 56 through 59 illustrate simplified equivalent circuits of several described above embodiments.

Figure 56:
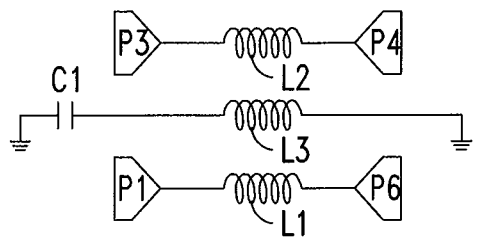
FIGS. 56-59 are equivalent circuit diagrams of embodiments of a system configured to isolate ports of an RFIC package.

FIG. 56 shows a simplified equivalent circuit of the embodiment shown in FIG. 3. The package pin coupling Port 1 of the PCB to port 6 of the RFIC chip is represented as an inductor L1. The package pin coupling Port 3 of the PCB to port 4 of the RFIC chip is represented as an inductor L2. The package pin placed between the package pins of the ports of interest is represented as an inductor L3, and is coupled directly to a ground on the RFIC chip and to a ground on the PCB through a capacitor C1. The resonance circuit associated with the inductors 1-3 and the capacitor C1 changes the electro-magnetic field distribution in the coupling area, which can be viewed as a phase change in a schematic level simulation. Selecting the appropriate capacitance can be viewed as selecting a capacitance to artificially decrease coupling coefficients between the inductors at selected frequencies.

Figure 57:
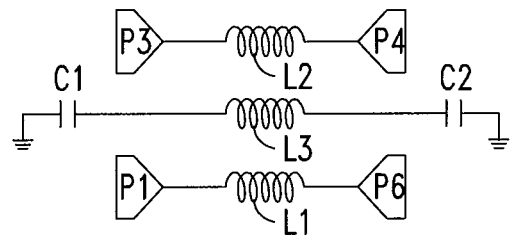

FIG. 57 shows a simplified equivalent circuit of the embodiment shown in FIG. 17. The package pin coupling Port 1 of the PCB to port 6 of the RFIC chip is represented as an inductor L1. The package pin coupling Port 3 of the PCB to port 4 of the RFIC chip is represented as an inductor L2. The package pin placed between the package pins of the ports of interest is represented as an inductor L3, and is coupled to a ground on the PCB through a capacitor C1 and to a ground on the RFIC chip through a capacitor C2. The resonance circuit associated with the inductors 1-3 and the capacitors C1 and C2 changes the electro-magnetic field distribution in the coupling area, which can be viewed as a phase change in a schematic level simulation. Selecting the appropriate capacitances can be viewed as selecting capacitances to artificially decrease coupling coefficients between the inductors at selected frequencies.

Figure 58:
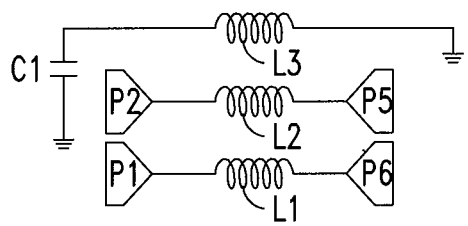

FIG. 58 shows a simplified equivalent circuit of the embodiment shown in FIG. 23. The package pin coupling Port 1 of the PCB to port 6 of the RFIC chip is represented as an inductor L1. The package pin coupling Port 2 of the PCB to port 5 of the RFIC chip is represented as an inductor L2. The neighboring package pin of the pair of package pins of the ports of interest is represented as an inductor L3, and is coupled to a ground on the PCB through a capacitor C1 and to directly to a ground on the RFIC chip. The resonance circuit associated with the inductors 1-3 and the capacitor C1 changes the electro-magnetic field distribution in the coupling area, which can be viewed as a phase change in a schematic level simulation. Selecting the appropriate capacitance can be viewed as selecting a capacitance to artificially decrease coupling coefficients between the inductors at selected frequencies.

Figure 59:
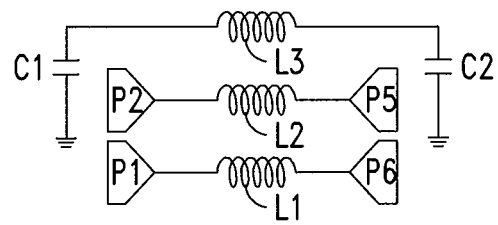

FIG. 59 shows a simplified equivalent circuit of the embodiment shown in FIG. 25. The package pin coupling Port 1 of the PCB to port 6 of the RFIC chip is represented as an inductor L1. The package pin coupling Port 2 of the PCB to port 5 of the RFIC chip is represented as an inductor L2. The neighboring package pin of the pair of package pins of the ports of interest is represented as an inductor L3, and is coupled to a ground on the PCB through a capacitor C1 and to a ground on the RFIC chip through a capacitor C2. The resonance circuit associated with the inductors 1-3 and the capacitors C1 and C2 changes the electro-magnetic field distribution in the coupling area, which can be viewed as a phase change in a schematic level simulation. Selecting the appropriate capacitances can be viewed as selecting capacitances to artificially decrease coupling coefficients between the inductors at selected frequencies.

Some embodiments may take the form of or comprise computer program products. For example, according to one embodiment there is provided a computer readable medium comprising a computer program adapted to perform one or more of the methods or functions described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

Figure 60:
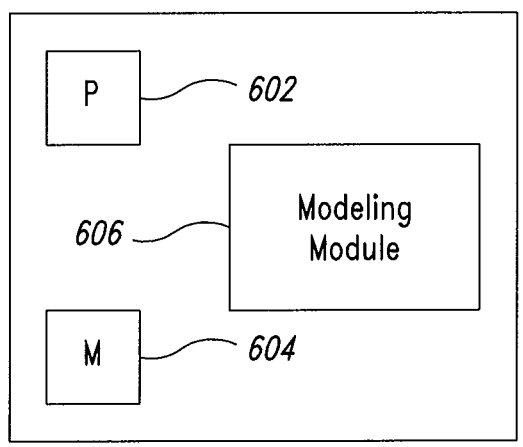
FIG. 60 is a functional block diagram of an embodiment of a system for modeling a coupling of an RFIC package to a PCB.

FIG. 60 illustrates an embodiment of a system 600 that can be used to model a coupling of an RFIC package to a PCB board. The system 600 comprises at least one processor 602 and a memory 604. The system 600 comprises a modeling module 606 configured to model an RFIC package mounted to a PCB board. The modeling module may be configured to model the RFIC package and PCB board by modeling components, such as package pins of the RFIC package, as separate micro-strip lines or as sets of inductors. This may be done, for example, by storing modeling data in a data file retrieved and used by the modeling module to model the RFIC package and PCB board. For example, the modeling data may cause the modeling module to employ one or more models, such as embodiments of the models described above, to model the RFIC package and PCB board.

Figure 61:
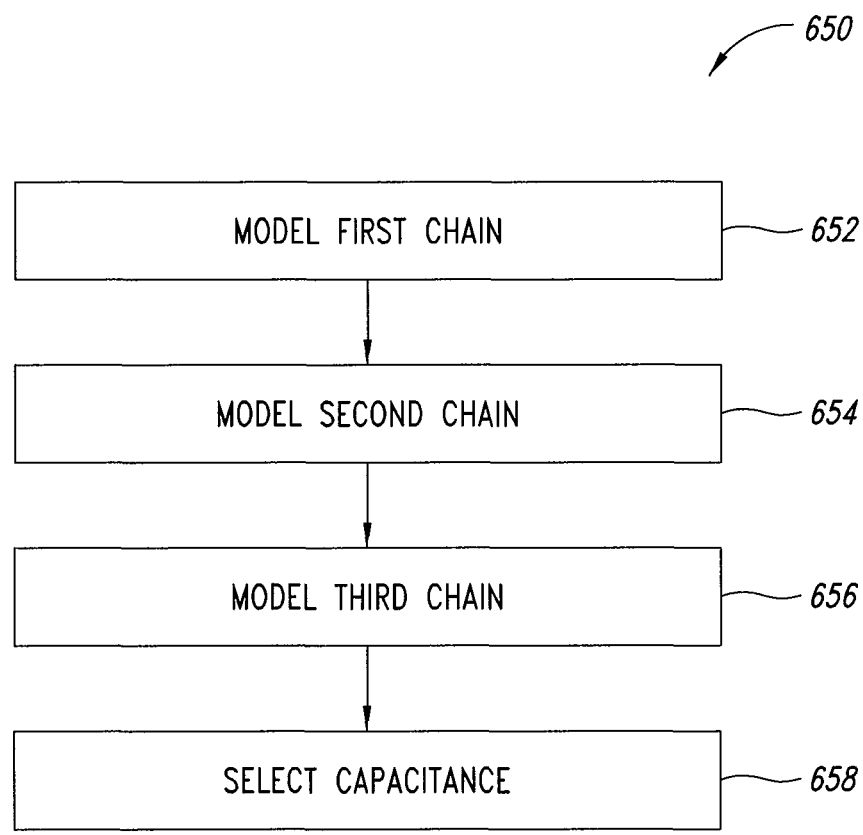
FIG. 61 illustrates an embodiment of a method of coupling an RFIC package to a PCB.

FIG. 61 illustrates an embodiment of a method 650 of coupling an RFIC package to a PCB board. At 652, a first connection chain configured to carry RF signals between an RFIC package and a PCB is modeled. The chain includes a first pin of the RFIC package. At 654, a second connection chain configured to carry RF signals between the RFIC package and the PCB is modeled. The chain includes a second pin of the PCB. At 656, a third connection chain between the RFIC package and the PCB is modeled. The third connection chain includes a third package pin of the RFIC package in a vicinity of the first and second package pins and a capacitor coupled between the third package pin and a reference voltage of the PCB. The modeling includes modeling parasitic elements of the third connection chain. At 658, a capacitance of the capacitor is selected based on the modeling.

The acts of the method 650 may be combined in some embodiments. For example, the modeling acts may occur simultaneously. The acts may occur iteratively. The third connection chain may include additional elements, such as additional capacitors and inductors, such as those discussed above. Additional acts may be performed, such as selecting the value of additional capacitors and inductors.

The use of simplified electro-magnetic or circuit schematic models or simulations may result in substantial improvement of isolation while consuming minimal design resources. The extent of simplification may impact the amount of isolation improvement achieved. The embodiments of models described above model, for example, the micro-strip lines between the package leads and the capacitors and the bonding wires and pads. However, only a limited number of package leads and associated circuitry need to be considered in the models and simulations to obtain significant improvements in isolation. High-Q resonant circuits are not required.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    modeling a first connection chain configured to carry radio-frequency signals between a first port of a radio-frequency integrated circuit package (RFIC package) and a first port of a printed circuit board (PCB), the first connection chain including a first package pin of the RFIC package;
    modeling a second connection chain configured to carry radio-frequency signals between a second port of the RFIC package and a second port of the PCB, the second connection chain including a second package pin of the RFIC package;
    modeling a third connection chain between the RFIC package and the PCB, the third connection chain including:
        a third package pin of the RFIC package in a vicinity of the first and second package pins; and
        a capacitor of the PCB coupled between the third package pin and a reference voltage of the PCB; and
    selecting a capacitance of the capacitor of the PCB based on the modeling.

2. The method of claim 1 wherein the third connection chain includes a micro-strip line trace on the PCB coupled between the third package pin and the capacitor of the PCB and the modeling of the third connection chain includes modeling a length and a width of the micro-strip line trace on the PCB.

3. The method of claim 2 wherein the modeling of the third connection chain includes modeling a parasitic resistance associated with the capacitor of the PCB.

4. The method of claim 3 wherein the third connection chain includes a coupling of the third package pin to a radio-frequency ground of the RFIC package and the modeling of the third connection chain includes modeling the coupling of the third package pin to the radio-frequency ground of the RFIC package as a micro-strip line trace and a parasitic resistance.

5. The method of claim 3 wherein the third connection chain includes an inductor of the PCB coupled in parallel across the capacitor of the PCB and the method further comprises:
    selecting an inductance of the inductor based on the modeling and the selection of the capacitance of the capacitor of the PCB.

6. The method of claim 5 wherein the third connection chain further comprises a capacitor of the RFIC package coupled between the third package pin and a radio-frequency ground of the RFIC package.

7. The method of claim 2 wherein the length of the micro-strip line trace is less than 1.0 mm.

8. The method of claim 1 wherein the third package pin is placed between the first and second package pins.

9. The method of claim 1 wherein the second package pin is positioned on a first side of the first package pin and the third package pin is on a second side of the first package pin opposite from the first side of the first package pin.

10. The method of claim 1 wherein the third connection chain includes a capacitor of the RFIC package coupled between the third package pin and a reference voltage of the RFIC package, the method further comprising:
    selecting a capacitance of the capacitor of the RFIC package based on the modeling.

11. The method of claim 10 wherein the reference voltage of the PCB is a radio-frequency ground of the PCB and the reference voltage of the RFIC package is a radio-frequency ground of the RFIC package.

12. The method of claim 11 wherein the modeling of the third connection chain includes:
- modeling a micro-strip line trace on the PCB coupled between the third package pin and the capacitor of the PCB;
- modeling a parasitic resistance associated with the capacitor of the PCB;
- modeling a coupling of the third package pin to the capacitor of the RFIC package; and
- modeling a parasitic resistance associated with the capacitor of the PCB.

13. The method of claim 12 wherein the third connection chain further comprises a shunt across the capacitor of the RFIC package.

14. The method of claim 12 wherein the selected capacitance of the capacitor of the RFIC package is equal to the selected capacitance of the capacitor of the PCB.

15. The method of claim 1 wherein the modeling includes modeling parasitic elements of the third connection chain.

16. The method of claim 1 wherein the capacitance of the capacitor of the PCB is selected so as to maximize isolation between the first and second connection chains above a selected frequency of operation of the first and second connection chains.

17. The method of claim 1 wherein the capacitance of the capacitor of the PCB is selected so as to minimize isolation between the first and second connection chains.

18. The method of claim 1 wherein the first, second and third package pins of the RFIC package are each modeled as a series of segments of the respective package pin.

19. A computer-readable memory medium whose contents cause at least one processor to perform a method, the method comprising:
- modeling a first connection chain configured to carry radio-frequency signals between a first port of a radio-frequency integrated circuit package (RFIC package) and a first port of a printed circuit board (PCB), the first connection chain including a first package pin of the RFIC package;
- modeling a second connection chain configured to carry radio-frequency signals between a second port of the RFIC package and a second port of the PCB, the second connection chain including a second package pin of the RFIC package;
- modeling a third connection chain between the RFIC package and the PCB, the third connection chain including:
  - a third package pin of the RFIC package in a vicinity of the first and second package pins; and
  - a capacitor of the PCB coupled between the third package pin and a radio-frequency ground of the PCB, wherein the modeling of the third connection chain includes modeling at least one parasitic element associated with the third connection chain; and
- selecting a capacitance of the capacitor of the PCB based on the modeling.

20. The computer-readable memory medium of claim 19 wherein the third connection chain includes a capacitor of the RFIC package coupled between the third package pin and a radio-frequency ground of the RFIC package.

21. The computer-readable memory medium of claim 20 wherein the third connection chain includes an inductor of the PCB coupled in parallel with the capacitor of the PCB.

22. The computer-readable memory medium of claim 21 wherein the at least one parasitic element comprises:
- a parasitic resistance of the capacitor of the PCB;
- a parasitic resistance of the capacitor of the RFIC package; and
- a parasitic resistance of the inductor of the PCB.

23. The computer-readable memory medium of claim 19 wherein the third connection chain includes an inductor of the PCB coupled in parallel with the capacitor of the PCB.

24. The computer-readable memory medium of claim 19 wherein the selecting is based on the modeling and an operating frequency range of the RFIC package.

25. The computer-readable memory medium of claim 19 wherein the third package pin is placed between the first and second package pins.

26. The computer-readable memory medium of claim 19 wherein the third package pin is placed to one side of the first and second package pins.

27. The computer-readable memory medium of claim 19 wherein the capacitance is selected so as to maximize an isolation between the first connection chain and the second connection chain at a selected frequency of operation.

28. The computer-readable memory medium of claim 19 wherein the capacitance is selected so as to minimize an isolation between the first connection chain and the second connection chain at a selected frequency of operation.

29. A device, comprising:
- a first connection chain configured to carry radio-frequency signals between a first port of a radio-frequency integrated circuit package (RFIC package) and a first port of a printed circuit board (PCB), the first connection chain including a first package pin of the RFIC package;
- a second connection chain configured to carry radio-frequency signals between a second port of the RFIC package and a second port of the PCB, the second connection chain including a second package pin of the RFIC package; and
- a third connection chain between the RFIC package and the PCB, the third connection chain including:
  - a third package pin of the RFIC package in a vicinity of the first and second package pins; and
  - a capacitor coupled between the third package pin and a reference voltage of the PCB, wherein the third connection chain is configured to modify an electro-magnetic field distribution in an area of the first and second package pins.

30. The device of claim 29 wherein the third connection chain is configured to maximize an isolation between the first connection chain and the second connection chain at a selected frequency.

31. The device of claim 29 wherein the capacitor is configured to interact with at least one parasitic element of the third connection chain.

32. The device of claim 29 wherein the third package pin is placed between the first package pin and the second package pin.

33. The device of claim 29 wherein the third package pin is placed to one side of the first package pin and the second package pin.

34. The device of claim 29 wherein the third connection chain further comprises another capacitor, which is coupled between the third package pin and a reference voltage of the RFIC package.

35. The device of claim 29 wherein the third connection chain further comprises an inductor coupled in parallel with the capacitor coupled between the third package pin and the reference voltage of the PCB.

36. The device of claim 35 wherein the third connection chain further comprises another capacitor, which is coupled between the third package pin and a reference voltage on the RFIC package.

37. The device of claim 29 wherein the capacitor coupled between the third package pin and the reference voltage of the PCB is coupled to a micro-strip line trace coupled to the third package pin and a length of the micro-strip line trace is less than 1.5 mm.

38. The device of claim 29 wherein the third connection chain is configured to minimize isolation between the first connection chain and the second connection chain at a selected frequency.

39. A system, comprising:
a radio-frequency integrated chip (RFIC);
a printed circuit board (PCB);
means for coupling the RFIC chip to the PCB configured to:
couple a first radio-frequency port of the RFIC to a first radio-frequency port of the PCB;
couple a second radio-frequency port of the RFIC to a second radio-frequency port of the PCB;
modify a radio-frequency coupling between the first and second radio-frequency ports of the PCB using a capacitance in conjunction with parasitic elements of the means for coupling.

40. The system of claim 39 wherein the means for coupling comprises:
a first pin configured to couple the first radio-frequency port of the RFIC to the first radio-frequency port of the PCB;
a second pin configured to couple the second radio-frequency port of the RFIC to the second radio-frequency port of the PCB; and
a third pin coupled to a radio-frequency ground on the PCB through a capacitor and coupled directly to a radio-frequency ground on the RFIC.

41. The system of claim 40 wherein the third pin is located between the first and second pins.

42. The system of claim 41 wherein an inductor is coupled in parallel across the capacitor.

43. The system of claim 40 wherein the third pin is located to one side of the first and second pins.

44. The system of claim 43 wherein an inductor is coupled in parallel across the capacitor.

45. The system of claim 39 wherein the means for coupling comprises:
a first pin configured to couple the first radio-frequency port of the RFIC to the first radio-frequency port of the PCB;
a second pin configured to couple the second radio-frequency port of the RFIC to the second radio-frequency port of the PCB; and
a third pin coupled to a radio-frequency ground on the PCB through a first capacitor and coupled to a radio-frequency ground on the RFIC through a second capacitor.

46. The system of claim 45 wherein the third pin is located between the first and second pins.

47. The system of claim 46 wherein an inductor is coupled in parallel across the first capacitor.

48. The system of claim 47 wherein a shunt is coupled across the second capacitor.

49. The system of claim 45 wherein the third pin is located to one side of the first and second pins.

50. The system of clam 49 wherein an inductor is coupled in parallel across the first capacitor.

51. The system of claim 50 wherein a shunt is coupled across the second capacitor.

52. The system of claim 39 wherein the means for coupling is configured to minimize an isolation between the first and second radio frequency ports of the RFIC at a selected frequency of operation.

53. The system of claim 39 wherein the means for coupling is configured to maximize an isolation between the first and second radio frequency ports of the RFIC at a selected frequency of operation.

* * * * *